(12) United States Patent
Tietzen et al.

(10) Patent No.: US 11,682,053 B2
(45) Date of Patent: Jun. 20, 2023

(54) BLOCKCHAIN TRACKING AND MANAGING OF A TRANSACTION INCENTED BY A MERCHANT DONATION TO A CONSUMER AFFINITY

(71) Applicant: Edatanetworks, Inc., Calgary (CA)

(72) Inventors: Terrance Patrick Tietzen, Edmonton (CA); Matthew Arnold Macpherson Bates, Beaumont (CA); Michael J. Kimball, Santa Ana, CA (US)

(73) Assignee: EDATANETWORKS INC., Calgary (CA)

( * ) Notice: Subject to any disclaimer, the term of this patent is extended or adjusted under 35 U.S.C. 154(b) by 916 days.

(21) Appl. No.: 16/446,728

(22) Filed: Jun. 20, 2019

(65) Prior Publication Data

US 2019/0392489 A1 Dec. 26, 2019

Related U.S. Application Data

(60) Provisional application No. 62/688,814, filed on Jun. 22, 2018.

(51) Int. Cl.
*G06Q 30/0279* (2023.01)
*G06Q 20/40* (2012.01)
(Continued)

(52) U.S. Cl.
CPC ....... *G06Q 30/0279* (2013.01); *G06Q 20/389* (2013.01); *G06Q 20/405* (2013.01); *H04L 9/0637* (2013.01); *G06Q 2220/00* (2013.01)

(58) Field of Classification Search
CPC .. G06Q 30/027; G06Q 20/389; G06Q 20/405; G06Q 2220/00
See application file for complete search history.

(56) References Cited

U.S. PATENT DOCUMENTS

| | | | |
|---|---|---|---|
| 2008/0281690 A1* | 11/2008 | Tietzen | G06Q 30/02 705/14.27 |
| 2014/0278861 A1* | 9/2014 | Bush | G06Q 30/0214 705/14.16 |

(Continued)

OTHER PUBLICATIONS

Duffy, "Charity Miles (for iPhone) Review," PCMag.com [online], published on May 19, 2015, available at: < https://www.pcmag.com/reviews/charity-miles-for-iphone > (Year: 2015).*

*Primary Examiner* — Richard W. Crandall
(74) *Attorney, Agent, or Firm* — Bradley K. DeSandro; Desandro Law Group PLLC

(57) ABSTRACT

Merchants provide incentives for customer transactions on accounts issued to them by issuers. Incentives include a merchant making a donation to entities with whom the merchants and/or the consumers have an affinity such as residence in the community. Each merchant can define the donation to be percentage of the transaction amount. Cryptographically secure chains are provided for uniquely labeling each such transaction and each such donation by way of incorporating role-based digital wallets and multiple synchronized transactional blockchains. Where the donations are used to purchase an Internet-of-Things (IOT) enabled system, real and/or near-real time usage information can be received and transmitted to the logical addresses of the customers and or the merchants so as to confirm efficacy of the donations.

3 Claims, 7 Drawing Sheets

(51) Int. Cl.
*G06Q 20/38* (2012.01)
*H04L 9/06* (2006.01)

(56) References Cited

U.S. PATENT DOCUMENTS

| | | | |
|---|---|---|---|
| 2015/0006426 A1* | 1/2015 | Sobhani | G06Q 30/0279 |
| | | | 705/329 |
| 2016/0012424 A1* | 1/2016 | Simon | G06Q 20/308 |
| | | | 705/67 |
| 2017/0140408 A1* | 5/2017 | Wuehler | G06Q 30/0207 |
| 2017/0300876 A1* | 10/2017 | Musiala, Jr. | H04L 9/50 |
| 2018/0075536 A1* | 3/2018 | Jayaram | G06Q 40/06 |

* cited by examiner

BLOCKCHAIN TRACKING AND MANAGING OF A TRANSACTION INCENTED BY A MERCHANT DONATION TO A CONSUMER AFFINITY

CROSS REFERENCE TO RELATED APPLICATIONS

This patent application claims priority to U.S. Provisional Application Ser. No. 62/688,814, titled "Blockchain Tracking and Managing of A Transaction Incented By A Merchant Donation To A Consumer Affinity", filed on Jun. 22, 2018, which is incorporated herein by reference.

FIELD

Implementations generally relate to incentives offered by merchants to encourage purchases by consumers by conducting transactions on accounts issued to them by issuers in exchange for the merchants making donations to entities with whom the merchants and/or the consumers have an affinity. Implementations more particularly relate to systems and methods for providing cryptographically secure chains for uniquely labeling each such transaction and each such donation by way of incorporating role-based digital wallets and multiple synchronized transactional blockchains.

BACKGROUND

A merchant may use a technique to prompt a consumer into making a purchase, such as agreeing to make a donation to a beneficiary of the consumer's choice. Tracking each such transaction, each such promise from each such merchant to make each such donation, and each such donation to each such beneficiary of the consumer's choice can be challenging if the goal is to be able to make an auditable demonstration that there is a one hundred percent (100%) passthrough of each merchant's donation to each beneficiary of the consumer's choice. It would be an advance in the relevant arts to provide an auditable demonstration of such a one hundred percent (100%) passthrough of each such donation by the use of blockchain technology and its inherent ability to rapidly validate transactions without mediation by a trusted third party. Moreover, it would also be an advance in the relevant arts to provide such an auditable demonstration by the use of blockchain linked time-stamping, which provides an inalterable archival record of transactions in temporal order, thereby providing blockchain's cryptographic safeguards of high transparency to each merchant, consumer, and the beneficiary of the consumer's choice.

BRIEF DESCRIPTION OF THE DRAWINGS

In the drawings, like reference characters generally refer to the same parts throughout the different views. In the following description, various implementations are described with reference to the following drawings, in which.

Figure 1:
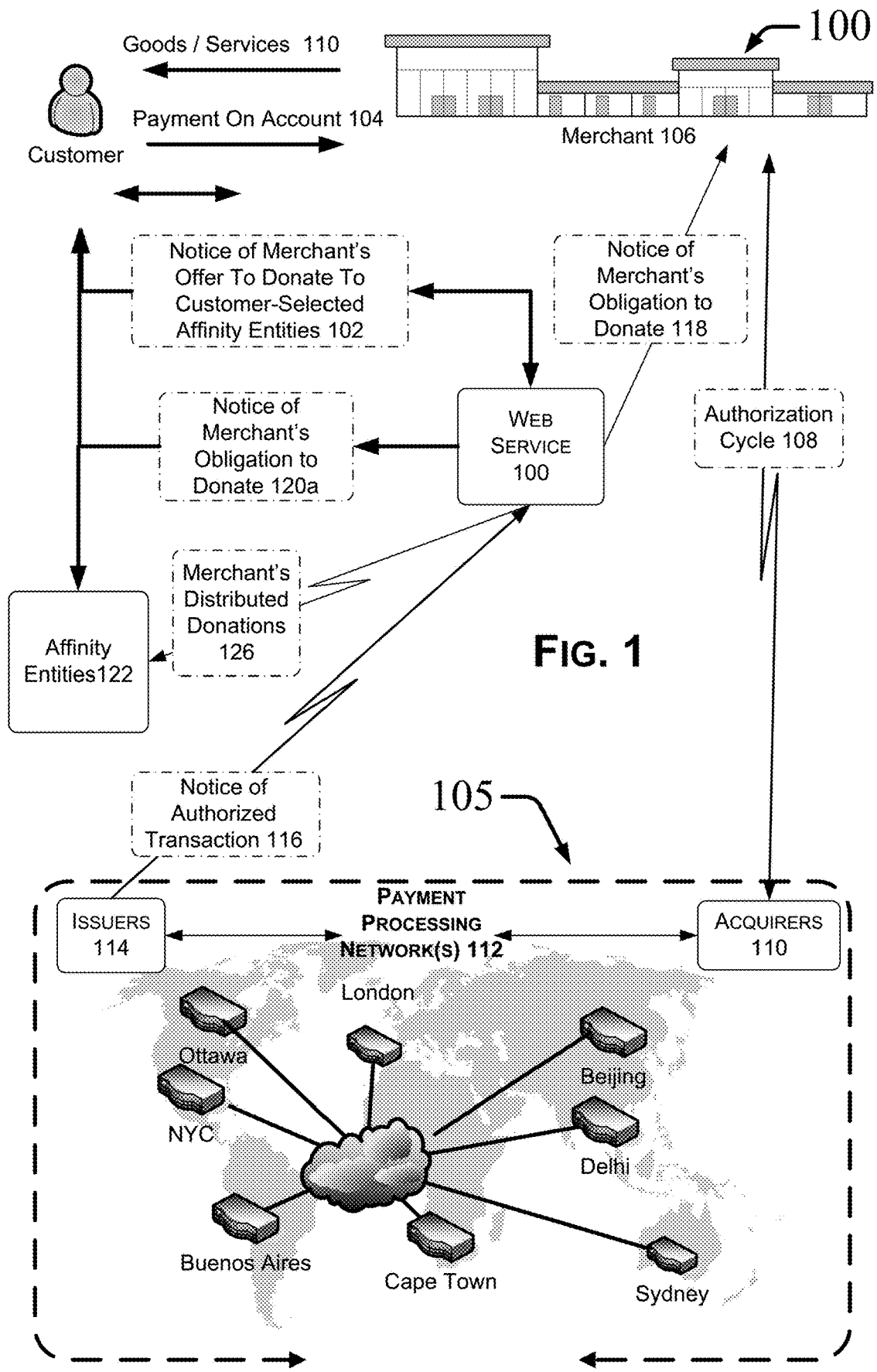
FIGS. 1-2 are flowcharts illustrating respective exemplary processes that allow an account holder to conduct a transaction to purchase of goods and/or services from a merchant, where the account holder's transaction obligates the merchant to make a donation to an affinity entity (e.g., a charity) designated by the account holder (e.g., consumer).

Implementations will become more apparent from the detailed description set forth below when taken in conjunction with the drawings.

DETAILED DESCRIPTION

Implementations are presented to provide a methodology in which a merchant incents an account holder (e.g., consumer) to conduct a transaction on an account issued to the account holder by an issuer in exchange for the merchant making a donation to entity with whom the consumer has an affinity (e.g., the consumer's favorite charity). Each such implementation provide methodologies for cryptographically secure chains that uniquely labels each such transaction and each such donation by way of incorporating role-based digital wallets and multiple synchronized transactional blockchains.

Implementations track a transaction, and a donation resulting from the transaction, where the transaction is conducted between a merchant and an account holder, and where the transaction was incented by the merchant offering to the account holder a commitment by the merchant to make a donation to a charity of the account holder's choice. Such tracking implementations are provided by methodologies based on a decentralized, distributed database having a blockchain structure that maintains a growing list of data records. Each block in the blockchain may hold individual transactions and the results of any blockchain executables, and each block may contain a timestamp and a link to a previous block. Each block will be linked so as to include a hash of the prior block in the blockchain. As such, the linked blocks form a chain, with only one successor block allowed to link to one other predecessor block.

A non-limiting exemplary implementation to track a transaction, and a donation resulting from the transaction, is now presented. The transaction is between a merchant and an account holder for a purchase, where the transaction was conducted on an account issued to the account holder by an issuer, and where the merchant is obligated to make a donation to a charity predetermined by the account holder as a condition of the account holder having conducted the transaction with the merchant. In this non-limiting exemplary implementation data fields derived from the transaction are received. These data fields include a first data for the transaction defined using a first merchant account and a second, different data for the same transaction defined using a second merchant account. In various alternative of such implementations, the first merchant account will be used for transaction information between the merchant and the account holder (e.g., the consumer) and as well as in other contexts for the transaction (offer redemption, etc.), and the second merchant account will be used for transaction data related to the merchant's obligation to make a donation to a charity predetermined by the account holder as a condition of the account holder having conducted the transaction with the merchant.

A first block is created from the first data for the transaction and defined using the first merchant account. The first block is added to a first blockchain that uses the first merchant account to track the transaction. A second block is created from the second data for the transaction defined using the second merchant account without including the first data for the transaction which is defined using the first merchant account. The second block is added to a second, separate blockchain that uses the second merchant account to track the transaction, wherein the first and second blockchains each track different transaction data fields. The transaction between the merchant and the account holder is validated by receiving a Globally Unique IDentifer (GUID) for the transaction, and using the GUID to identify indices in the first and second blockchains. The encrypted blocks are retrieved from the first and second blockchains of the identified indices, and a hash associated with the encrypted blocks is verified. At least one of the encrypted blocks is decrypted using a private key.

In yet another implementation, two (2) blockchains are combined together, where a first blockchain tracks a consumer conducting a transaction with a merchant who has made a promise to make a donation to the consumer's preferred charitable entity, and a second blockchain tracks the merchant's donation to the customer's preferred charitable entity. As such, the charitable entity will be able to leverage each merchant donation as facilitated by the second blockchain so as to track each donation to each specific charitable project that is within the mission of the charitable entity. By way of example of the second blockchain, a donation made by a merchant, as a result of a transaction with a customer, will be tracked by the second blockchain. If the customer had made a predetermined selection of a particular charitable entity to which the merchant's donation is to be directed, and has further made a predetermined selection of a particular charitable project that is being undertaken by the charitable entity, then the delivery of the merchant's donation to the customer-selected charitable entity and its particular charitable project will be tracked by the second blockchain. In practice, a customer may choose to conduct a transaction with a merchant because of the merchant's promise to make a donation to a fund designated by a local children's hospital to acquire, use, and maintain an Magnetic Resonance Imaging (MRI) service to local children. As such, linkage of a second blockchain to a first blockchain will allow for the tracking of the merchant's donation to each local child who receives MRI services delivered by the local children's hospital.

Figure 2:
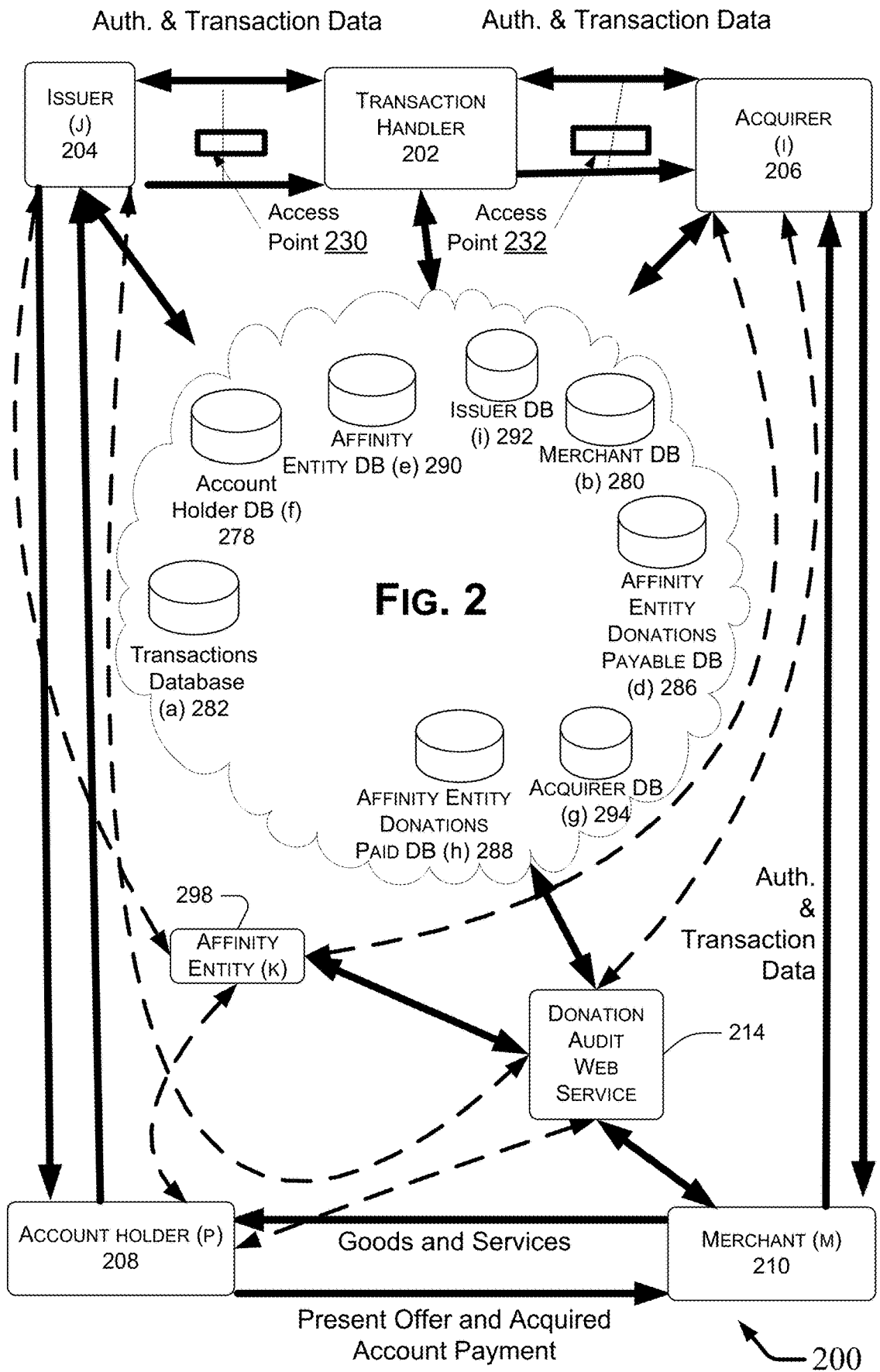

With respect to the methodologies in which a merchant incents an account holder (e.g., consumer) to conduct a transaction on an account issued to the account holder by an issuer in exchange for the merchant making a donation to entity with whom the consumer has an affinity (e.g., the consumer's favorite charity), reference is now made to FIGS. 1-2.

FIGS. 1-2 depict exemplary environments for the use of technologies disclosed in "Acquired Transactions Are Incented By Customer Directed Merchant Donations" hereinafter, the "Merchant Donor Technologies". The Merchant Donor Technologies are more particularly described in U.S. patent application Ser. No. 13/834,984, filed on Jan. 15, 2013, titled "Proximal customer transaction incented by donation of auto-boarded merchant, and in U.S. patent application Ser. No. 13/748,459 filed on Jan. 23, 2013, titled Authorized transaction incented by merchant donation, both of which are hereby incorporated by reference.

FIG. 1 shows a global Acquired Account Payment Processing System 105 in which a community resident is incentivized to transact by way of a merchant's offer 102 to a make a donation in exchange for the community resident purchasing goods and services 110 by the community resident's payment on an account 104 that was issued by an issuer 114 to the community resident. Note that, in some implementations, the merchant sets terms and conditions under which the merchant's donation will be made, while the community resident selects those affinities entities to which the merchant's donations are to be made.

The merchant, who may be operating a brick and mortar store in the community where the community resident resides, inputs data about the transaction on the community resident's account into a Point of Service terminal (POS) 106. The POS, for example, can be a cash register, a web-enabled mobile device (e.g., a tablet computing device), etc. The POS 106 transmits the input data, as part of an authorization request in an authorization cycle for the transaction, to an acquirer 110 for the merchant. Acquirer 110, who can be just one of many entities in the global Acquired Account Payment Processing System 105, sends the authorization request through a payment-processing network 112, as facilitated by one or more transaction handlers, for example Visa Net, to the issuer 112 who issued the account to the community resident. In response to the authorization request, the issuer 112 sends an authorization response at least of portion of which is ultimately sent for delivery back to the merchant's POS 106 by transmissions made in backward directions through the payment-processing network 112 via the merchant's acquirer 110.

If the transaction is authorized by issuer 114, an entity in the global Acquired Account Payment Processing System 105, such as the issuer 114, sends a message 116 containing particulars of the transaction to a Web Service 100 indicating that a transaction on the community resident's account was approved for being conducted by the community resident with the merchant whose offer to donate may have been previously selected by the community resident.

Optionally, the data input into POS 106 can include additional monies received from the customer by the merchant that are also to be donated, via the merchant, to a designated affinity entity 122 (e.g., a charity). In that case, message 116 would also contain these particulars.

Upon receipt of message 116, a donation to the affinity entity 122 by the user's selected merchant is calculated according terms and conditions specified by the merchant.

Web Service 100 retains the derived donation for subsequent audit purposes to insure compliance by each community merchant in its donation commitments to each of the one or more affinity entities or charities. The Web Service 100 may transmit a message containing notice of a donation, or the particularly derived donation, as shown at reference numerals 118-120 to respective logical addresses of the obligated merchant 106, one of more community resident/ account holder designed affinity entities 122, and the community resident/account holder—and/or to respective agents thereof. The terms and conditions that obligate the merchant-offeror to make a donation may, but need not, include discounts, rebates, or other monetary or non-monetary incentives. As such, the community resident/account holder is incentivized to purchase from the merchant's store, inter alia, by the merchant's agreement to donate to one of more community resident/account holder designed affinity entities 122.

The affinity entity or charity, which may be selected at the discretion of the community resident/account holder, may be any entity to which the community resident has an affinity, regardless of where it is located or whom it serves. Alternatively, the affinity entity or charity may be limited to those organizations that provide a good and/or service to a community in which both community residences and merchants have an affinity—such as by their common geographic location, as by its geographic location being within a computed commuting time, by one more modes of transportation, that is below a predetermined time threshold. This affinity entity may provide food and clothing to underprivileged families in their common community. This affinity entity, for example, may provide teaching and demonstrations of entrepreneurial skills to community's unemployed or under employed. Another affinity entity may provide venues where sports education can be provided to local competing youth. Yet another affinity entity may provide care and feeding to abandoned domesticated animals, such as pets. The affinity entity may also cultivate desirable citizenship and public policy through offerings of education and entertainment services—whether in person, on-line, or both. Given the foregoing, the reader will understand that the affinity entity can be either a for-profit or a non-profit organization, and may optionally be required to provide a good or a service to a local community to which both merchants and customers in the same community have an affinity, by their common location, to advance and/or promote the community.

In some implementations, as disclosed in the Merchant Donor Technologies, each merchant will identify the affinity entity to whom the merchant-offer will make a donation. To identify the affinity entity, a customer identifier, as received by Web Service 100 in message 116, can be used to look up or access information from which can be derived a geographic address in a community where the customer resides. Alternatively, the customer's geographic address can be an address that is associated with an account issued by an issuer to the customer upon which the transaction with the merchant is being conducted. As a still further alternative, the customer's geographic address can be an address specified by the customer as being the address that is to be used for the purpose of determining the customer's community, whereby the customer can self-select their own community by specifying a geographic address in the customer's self-selected community. Similarly, a merchant identifier, also received by Web Service 100 in message 116, can be used to look up or access information from which can be derived a geographic address in a community where the merchant-offer has a brick and mortar store. Alternatively, the merchant's geographic address can be an address that is associated with a merchant acquirer account issued by the merchant's acquirer to the merchant that will receive proceeds from the transaction with the customer that is being conducted. As a still further alternative, the merchant's geographic address can be an address specified by the merchant as being the address that is to be used for the purpose of determining the merchant's community, whereby the merchant can self-select its own community by specifying a geographic address in the merchant's self-selected community. These respective geographic addresses of customer and merchant, whether self-selected or otherwise, when retrieved from one or more network accessible databases, can be compared, using processes, procedures, and methodologies enabled herein, by Web Service 100, from information in or derived from message 116, to determine whether the merchant and its customer have the same local community. By way of example, data in message 116 can include an identifier for the customer, and a database of merchants and their respective merchant-offers can include geographic location information. This geographic location information is matched against the geographic location information for the residence of the customer. Merchant and customer identifiers can be assigned to the merchant and its customer during or prior to any transaction, such as when each are registered with or otherwise sign up for participation with Web Service 100. This registration process can include the collection of physical and logical addresses for each or for their respective agents.

Once physical address information for the merchant-offeror and its customer are known, the local community of each of the merchant and its customer can be determined—in some implementations. Studies show that a significant portion of spending by a consumer is restricted to a region that is proximal to where the consumer resides. Accordingly, it is desirable for a merchant to attract those consumers who reside within the restricted region corresponding to the merchant's geographic location so that the customer can use a mode of transportation to travel from a geographic address of the customer's residence to the merchant's geographic location within a travel time that less than a threshold. As such, any such travel time that is less than the threshold might be understood to mean that the merchant-offeror and the customer who is traveling to the merchant-offeror are in the considered to be within the same community or the 'Merchant-Community'.

Alternatively, the local community determination can be made on any of other different methods, or combinations thereof. Once such method is a political or legal division, that is, the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same, or within a predetermined proximity, as that of its customer's residence.

Yet another such comparison can be whether the merchant's place of business and its customer's residence are physically proximate within a predetermined factor by any of a variety of measures or combinations thereof. For example, latitude and longitude coordinates might be known for both the merchant's place of business and the residence of its customer. These coordinates can be used to determine whether the linear distance there between is within a predetermined distance to ascertain whether or not the merchant and its customer share the same local community.

A calculated navigation time algorithm, using any of various different travel methods (e.g., walking, automobile, bicycle, mass transit, etc.), can be used to determine whether the time, using any of one or more modes of transportation, is within a predetermined time limit to ascertain whether or not the merchant and its customer share the same local community, 'neighborhood', or Merchant-Community. By way of example, the merchant and its customer might be determined to be within the same local community if the automobile drive time, as determined from one or more databases of contemporary cartographic road system information, to navigate from a geographic address attributed to the attributed to the customer and a geographic address attributed to the merchant is less than a predetermined time threshold (e.g., 17 minutes), with yet another threshold that may be used to weight the navigation time calculations with real time traffic conditions data.

A further alternative implementation will identify the population density of both the merchant's brick and mortar store and the customer's residence. If the population density exceeds a predetermined density, then the merchant and its customer might be determined to be within the same local community if the time to walk, bicycle or take public transportation between the merchant's brick and mortar store and the customer's residence, as determined from one or more databases of contemporary topographic, mass transit, and/or pedestrian cartographic system information, is less than a predetermined time threshold (e.g., 55 minutes). Such implementations may also access databases to consider real time traffic conditions. Rural, industrial, city, and suburban environments will have different population densities, and likely modes of transportation, that correspondingly may have an effect on a travel time from a customer's resident to a merchant's geographic location. A merchant may provide an incentive to customers living close by in exchange for traveling to, and transacting at, a merchant's store.

Still another such comparison can be whether the merchant's place of business and its customer's residence are proximate or are the same according to voting, electoral, or political districts. The district can be determined by an official method, an unofficial method, or a combination of methods. By way of example, measurements known within the political gerrymander sciences can be used, including but not limited to a minimum district to convex polygon ratio, shortest split line algorithm, minimum isoperimetric quotient, etc.

The local community corresponding to that of the merchant and its customer, and separations there between (if any), can be determined from any combination of linear distance, mode-specific navigational transportation travel time, political separation, postal designation, and/or hybrid algorithm that takes into considers geographic barrier features such as rivers, cliffs, and highways, cultural features such as boundaries of identified people groups (e.g., tribes, first nation people, etc.), land ownership such as subdivisions, housing projects, cooperatives, planned communities, military installations, governmental owned and leased properties, etc. Given the foregoing, an algorithm might find that the merchant and its customer are members of the same community, not members of the same community, or are both members of more than one of the same communities as determined by the algorithm.

Similar or different algorithms that are used to determine the respective local community of the merchant and its customer can also be used to determine the local community of an affinity entity such as that shown on FIG. 1 at reference numeral 122, or as that shown as an Affinity Entity (k) 398 in FIG. 2, and an Affinity Entity (f) 484 in FIG. 4, as discussed herein below.

In some implementations, if the local community of the merchant, its customer, and an affinity entity that has been selected by the customer or by other methods are the same, then the business rule selected by the merchant will determine the amount of the donation that the merchant will make to the selected affinity entity. In some implementations, the affinity entity to whom a merchant is to make a donation can only be selected by the customer, and not the merchant. In such implementations, the goals or purposes of an affinity entity will not cause tension between the goals or purposes of the merchant or the goals or purposes of customer in that the identity of the affinity entity is unknown to the merchant through its being selected anonymously by the customer. As such, the merchant need not be told or be given any notice, directly or indirectly, as to the identity of the affinity, entity or charity selected the customer with whom the merchant is conducting a transaction. Rather, the merchant might only be told or be given notice to make a single payment of, or period payments to, a single affinity entity who, as trustee or agent, will thereafter make respective disbursements for all registered merchants accordingly to those affinity entities that had been selected by those customers with whom those merchants had conducted transactions.

Various implementations can ensure that a merchant who, by force of reason or conscience, does not want to make a donation to a particular affinity entity or charity, need not do so directly, as any and all merchant donations are made blindly through other avenues or collection points that make all merchant donation disbursements to all affinity entities or charities. Accordingly, each merchant will have notice of its total periodic donations without knowing the identity of the intended recipients, thereby leaving the direction of donations fully within the discretion of the merchants' customers. Note that a limitation can optionally be placed upon the customer's choice of affinity entity or charity such that the choice must be made only among those affinity entities or charities that serve the local community of the merchant, its customer, or both. Such implementations may leave the currency amount of the merchant's donation fully within the discretion of the merchant. Yet another limitation can optionally be placed upon the customer's choice of affinity entity or charity such that the choice must be made only among those affinity entities or charities that are on a pre-designated list of those organizations that are pre-approved by a third party as being available for such selection according to an approval process.

Web Service 100 can use respective identifiers for the merchant and its customer (e.g., account holder) to access and retrieve geographic information for each, and then apply an algorithm to the retrieved geographic information to determine the respective local communities of the merchant and its customer, as discussed above. By way of example, the local community can be progressively granular in nature, such as: 1st the United States of America; 2nd the state of New York; 3rd the portion of New York called "Long Island"; 4th the county of Nassau within the state of New York; 5th a portion of the Nassau County called North Hempstead; and then 6th the specific geographic location of "Port Washington". This final level of geographic granularity indicates a community in which both merchant and customer are members, neighbors, residents, and/or the like.

The final level of geographic granularity can be used to perform a look-up against one or more databases to which Web Service 100 has access. This access and lookup is used by Web Service 100 to identify: (i) the affinity entity or charity for that community which, in this example, might be the Port Washington Food Bank located in Port Washington, N.Y., which charity might have been specified by the customer; and (ii) the respective identifier of the merchant's business rule (and/or the customer's business rule) that is to be used to make a calculation of the currency amount of the donation that the merchant is to make to the affinity entity or charity for that community. Business rule(s) is/are used with the currency amount of the customer's payment in order to calculate the currency amount of the donation that is to be made by the merchant to the affinity entity or charity for that community. Note that the donation can be directed to a plurality of affinity entities for the local community according to directions that had been previously specified by the customer. For example, the customer may have specified that each merchant donation is to be split evenly, or in specified portions totaling one hundred percent (100%), between five (5) local community affinity entities, for example: (i) a local youth sports team cooperative; (ii) a local charter junior high school; (iii) a local house of worship; (iv) a local political party; and (v) a local for-profit college specializing business entrepreneurialism.

Referring now to FIG. 1, the community resident can take the merchant's conditional offer 102 to the local merchant's brick and mortar store POS 106. After receiving the offer 102 from the merchant 106, the community resident conducts a transaction on an account 104 issued by an issuer to the community resident to pay of the transaction and buy goods and/or services 110 received by the community resident.

Note that terms and conditions of the transaction may differ from that of the offer presented by the community resident at the local merchant's brick and mortar store. As such, the merchant's offer to donate might not be specific to a particular good or service, but can be specific as to the entire transaction between the merchant and its customer. By way of example as to this type of offer specificity, the offer may obligate the merchant to make a donation of a certain percentage of the entire currency amount of transaction, or the offer may obligate the merchant to make a donation only if the transaction is conducted at a certain time of day or on a particular day of the week, or only if the currency amount of the transaction exceeds a predetermined amount, or a combination of the foregoing. Other conditions are also permissible.

Although some terms of the offer may differ from some terms of subsequent transactions between the merchant and its customer, nevertheless, the merchant's offer to make a donation to an affinity entity (e.g., a local charity) fundamentally provides an incentive that causes, at least in part, the local community resident to navigate to the local merchant's brick and mortar store, come into the store, shop, and ultimately conduct a transaction that will bring revenue to the local merchant and its community. Advantageously, the absence of specificity in the offer as to a particular good or service allows many implementations to operate without modification to the merchant's input of data about the transaction at the POS 106, without modifications to the POS 106 itself or procedures for its operation, and without modifications to software executing on POS 106.

Optionally, a community resident (e.g., customer) may accept the merchant's offer 102 in advance of going to the POS 106. Such advance acceptance may take place electronically, such as in response to the community resident's electronic receipt of offer 102. Such an electronic acceptance to offer 102 can be by way of a transmission of information from the community resident to the merchant. The transmitted information can include: (i) an identifier for the registered customer who intends to accept the merchant's offer 102; (ii) the calculated distance and/or time for the customer to navigate, using a known mode of transportation, from a geographic location associated with the customer (e.g., home location, work location, vacation location, etc.) to the merchant's brick and mortar store of the POS 106, for instance, by walking, bicycling, automobile and/or mass transit; (iii) the terms and conditions of the offer including any expiration thereof; (iv) optionally any other information already conveyed to the customer, such as a statement about the donation that the merchant will make to the Affinity Entity(ies) 122 when the customer conducts a timely transaction with merchant; and (v) other unexpired offers or advertisements that may or may not have been conveyed to the customer, terms and conditions of such other offer(s), etc.

Referring now to FIG. 2, an exemplary process 200 is depicted of a particular financial transaction system, such as may be described as an open loop system, in which an account holder (p) 208 conducts a financial transaction with a Merchant (m) 210. By way of example, the Account Holder (p) 208's financial transaction with the Merchant (m) 210 may have been incentivized by the Merchant (m) 210's agreement to make a donation to an Affinity Entity (k) 295 in the local community as defined by the Merchant (m) 210 through an ad incentive which, optionally, can be communicated to Account Holder (p) 208, whether requested or not.

In FIG. 2, by way of explanation for the nomenclature of reference numerals used and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 204-210 and 278-294, and 298 in FIG. 2 are illustrated with a block, but indicate one or more elements can be present. For example, Issuer (j) 204 is one of a possible plurality of issuers, where j may range from 1 to a large integer T.

Account Holder (p) 208 presents an account bearing payment device to a Merchant (m) 210 as tender for a financial transaction such as a purchase of goods and services. As part of the transaction, the Account Holder (p)'s 208 payment device can be a credit card, debit card, prepaid card, cellular telephone, Personal Digital Assistant (PDA), etc. Those of skill in the art will recognize that other financial transactions and instruments other than credit cards may also be used, including, but not limited to, a prepaid card, a gift card, a debit card, a token equivalent of an account as communicated via cellular telephony, near field communications, and the like. In various implementations, deposits to and withdrawals from each said account may be any and all forms of currency, including cash, cryptocurrency (e.g., 'bitcoin'), frequent flyer miles, cellular telephone usage units (e.g., airtime, data transmission units), loyalty program points, etc. For purposes of illustration and explanation, however, reference will be made to a credit card.

The payment device can be manually keyed into a POS or can be read by a reader operated by the Merchant (m) 210, whereupon account information is read from the payment device and a request for authorization is transmitted to the Merchant (m) 210's Acquirer (i) 206. Each Acquirer (i) 206 is a financial organization that processes credit card transactions for businesses, for example merchants, and is licensed as a member of a Transaction Handler 202 such as a credit card association (i.e., Visa Inc., MasterCard, etc.) As such, each Acquirer (i) 206 establishes a financial relationship with one or more Merchants (n) 210.

The Acquirer (i) 206 transmits the account information to the Transaction Handler 202, who in turn routes the authorization request to the account holder's issuing bank, or Issuer (j) 204. The Issuer (j) 204 returns information via an authorization response to the Transaction Handler 202 who returns the information to the Merchant (m) 210 through the Acquirer (i) 206. The Merchant (m) 210, now knowing whether the Account Holder (p) 208's credit card account is valid and supports a sufficient credit balance, may complete the transaction and the Account holder (p) 208 in turn receives goods and/or services in exchange. Most credit card associations instruct merchants that, after receiving an affirmative authorization response, the detailed credit card account information obtained by a point of service terminal (e.g., such as via a magnetic stripe scanner) must be deleted.

To reconcile the financial transactions and provide for remuneration, information about the transaction is provided by the Merchant (m) 210 to Acquirer (i) 206, who in turn routes the transaction data to the Transaction Handler 202 who then provides the transaction data to the appropriate Issuer (j) 204. The Issuer (j) 204 then provides funding for the transaction to the Transaction Handler 202 through a settlement bank. The funds are then forwarded to the Merchant's (n) 210 Acquirer (i) 206 who in turn pays the Merchant (m) 210 for the transaction less a merchant discount, if applicable. The Issuer (j) 204 then bills the Account holder (p) 208, and the Account holder (p) 208 pays the Issuer 204 with possible interest or fees.

Also shown in FIG. 2 are one or more Affinity Entities (k) 298 and a Donation Audit Web Service 214 that implement processes by which donations to the one or more Affinity Entities (k) 298 from various donors, for instance, any Issuer (j) 204, an Merchant (m) 210, any Acquirer (i) 206, and the Transaction Handler 202. Donation Audit Web Service 214 implements processes for the auditing of donations to the one or more Affinity Entities (k) 298. The Donation Audit Web Service 214 has access to information resources within the following databases: Account Holder databases 278; Merchant databases 280; Transaction databases 282; Affinity Entity Donations Payable databases 286; Affinity Entity Donations Paid databases 288; Affinity Entity databases 290, Issuer Bank databases 292, and Acquirer Bank databases 294.

As shown in FIG. 2, Databases 278-294 can be connected by one or more private or public networks, virtual private networks, the Internet, or by other means known to those skilled in the art. Moreover, not every entity seen in FIG. 2 at reference numerals 208, 210, 214 and 298 must necessarily have real time, uninterrupted access to any or all of the Databases 278-294. Each such Database 278-294 can assign, read, write, and query permissions as appropriate to the various entities. For example, a Merchant (m) 210 may have read access to the one or more Transactions Databases 282.

Each Transactions Database (a) 282 can be designed to store some or all of the transaction data originating at the Merchants (n) 210 that use a payment device for each transaction conducted between an Account holder (p) 208 and the Merchant (m) 210. The transaction data can include information associated with the account of an Account holder (p) 208, date, time, and an identifier sufficient to determine a physical geographic location where the transaction took place, among other more specific information including the amount of the transaction. The database can be searched using account information, date and time (or within proximity thereof), or by any other field stored in the database.

The Transactions Database (a) 282 is also designed to store information about each Merchant (m) 210, where the information can include a unique identification of each Merchant (m) 210, an identifier for each point of sale device in use by the Merchant (m) 210, and a physical geographic location of each store of the Merchant (m) 210.

Also included in the Transactions Database (a) 282 is account information for payment devices associated with Account holder (p) 208, such as part or all of an account number, unique encryption key, account information, and account name of an account holder who is registered to participate in a system in which donations can be made to each Affinity Entity (k) 298 as per rules stored in Merchant Database (b) 280. After registering to participate in the donation system, an Account holder (p) 208 initiates a qualifying purchase transaction with a Merchant (m) 210 by presenting a payment device (not shown) to the Merchant (m) 210. The payment device is typically presented at the Point Of Service terminal (POS) at which data thereon is read. Certain transaction information is transmitted from the POS (e.g., card track data) in route to the Merchant's (n) 210 Acquirer (i) 206. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (m) 210, and the ultimate destination, such as the Acquirer (i) 206. These points can include, without limitation, from the reader at the POS, the POS at the Merchant (m) 210 and a network router or computer that is connected to a network but is housed and maintained by the Merchant (m) 210 and between the Merchant (m) 210 and the Acquirer (i) 206. The communication channel could be Ethernet, wireless internet, satellite, infrared transmission, or other known communication protocols. Some or all of the transmission may also be stored for record keeping, archival or data mining purposes with little or no encryption. For example, the Merchant (m) 210 may store transaction data, including certain account information in the Merchant's (n) 210 accounts on file database for reuse later.

During a transaction conducted by Merchant (m) 206 on an account issued by Issuer (j) 204 to Account Holder (p) 208, information relating to the qualifying purchase is retrieved from the POS at Merchant (m) 206. The transaction information is comprised of account information together with other information about the transaction itself: time, date, location, value, etc. Certain parts of the transaction information are considered sensitive information including, without limitation, account number, credit card verification number, and account name.

For the Account Holder (p) 208 to donate to each Affinity Entity (k) 298 as may have been previously specified, the Account Holder (p) 208's Issuer (j) 204 can pay the Affinity Entity (k) 286 and apply a debit in that currency amount on the Account Holder (p) 208's periodic revolving credit statement. The Account Holder (p) 208, upon receipt of the statement, can thereafter make a total payment to the Issuer (j) 204 of the currency amount of the donation that appears as a debit on the statement along with the other credit charges that also appear on the Account Holder (p) 208's statement.

Both the Account Holder (p) 208 and the Merchant (m) 210 can change or disable a donation commitment at any time by accessing a server that serves web pages where respective user interfaces are provided. Thus, charitable donation commitments can be enabled or disabled using near real-time user interfaces. By way of example, and not by way of limitation, such servers can be hosted by the Donation Audit Web Service 214 seen in FIG. 2.

In various implementations, Donation Audit Web Service 214 seen in FIG. 2 receives information that confirms such a timely transaction between the customer and the merchant by way of receiving information derived from an authorization response for the transaction. As more fully described elsewhere herein with respect to FIG. 2, the information in the authorization response is typically generated by an Issuer (j) 204 who issued an account to the Account Holder (p) 208 (e.g., the customer or mobile device user) on which the timely transaction with the Merchant (m) 210 was conducted. A positive authorization response reflects the Issuer (j) 204's approval of the transaction on the account issued to Account Holder (p) 208. Stated otherwise, and as shown in FIG. 2 and discussion herein below, Donation Audit Web Service 214 receives the information derived from an authorization response from an acquired account payment processing system (i.e., see Ref. Num. 105 in FIG. 1), where each of the Issuer (j) 204, the Account Holder (p) 208, and the Merchant (m) 210 operate in the acquired account payment processing system.

Once confirmation has been received by Donation Audit Web Service 214 that a timely transaction has taken place been the merchant who made the offer and the customer who selected and confirmed that offer, a calculation is made of an amount of a donation that is to be made by the merchant-offeror according to terms of the offer.

In summary, process 200 permits the Account Holder (p) 208 to transact with community Merchants 210 by way of incentives from the community Merchants 210 that they will donate to the Account Holder (p) 208's favorite charity (e.g., Affinity Entity 298), though the charity may not be the Merchant (m) 210's favorite charity, or even a desirable charity, in that community. Nevertheless, the Merchant (m) 210 has received the benefit of customers' foot traffic inside the merchant's local brick and mortar store, as well as the benefit of transactions with some of those customer who enter the merchant's brick and mortar store, where each such benefit is realized by the merchant's offer to make a donation to the customer's favorite charity(ies) if a timely transaction occurs subsequent to the merchant's offer.

Referring now to FIGS. 3-7, there are depicted various implementation referred to herein after as the "Blockchain Implementations", and are described for a blockchain-based system that provides cryptographically secure tracking of each transaction between each merchant and each consumer by way of multiple synchronized transactional blockchains, where the consumer was incented to transact with the merchant by the merchant's offer to make a donation to a charity designated by the consumer, and where the blockchain-based system further provides cryptographically secure tracking of the donation by the merchant to the charity designated by the consumer by way of multiple synchronized transactional blockchains.

In general, blockchains can include sequences of individual blocks that each memorialize transactions (individual events). A single block accounts for a single transaction by an account holder for a purchase of goods and/or services from a merchant. In one implementation, a blockchain-based system employs sponsor-defined, sponsor-assigned, sponsor-managed privileges to tiers of users or individual users having associated digital wallets. The permissioning sponsor can assign a set of privileges (also referred to herein as permissions) appropriate to each user at the account level. The privileges can be packaged in bundles for participants to accomplish specific roles, so that different participants have differing permissions to transact and access data. These privileges are referred to herein as "role-based privileges" or "role-based wallets." In specific implementations, only the sponsor or its designated administrator can add, modify, or delete privileges.

In another implementation, the blockchain-based system includes customized role-based wallets which can generate transactions accompanied by transaction-related data. For instance, other aspects of each transaction can be included within these blockchains, both to carry critical information about a transaction as well as extensions to further safeguard and authenticate the transaction. As used herein, transaction authentication can refer to the process of determining whether a particular user and associated wallet or application is permitted to participate in a transaction.

Figure 3:
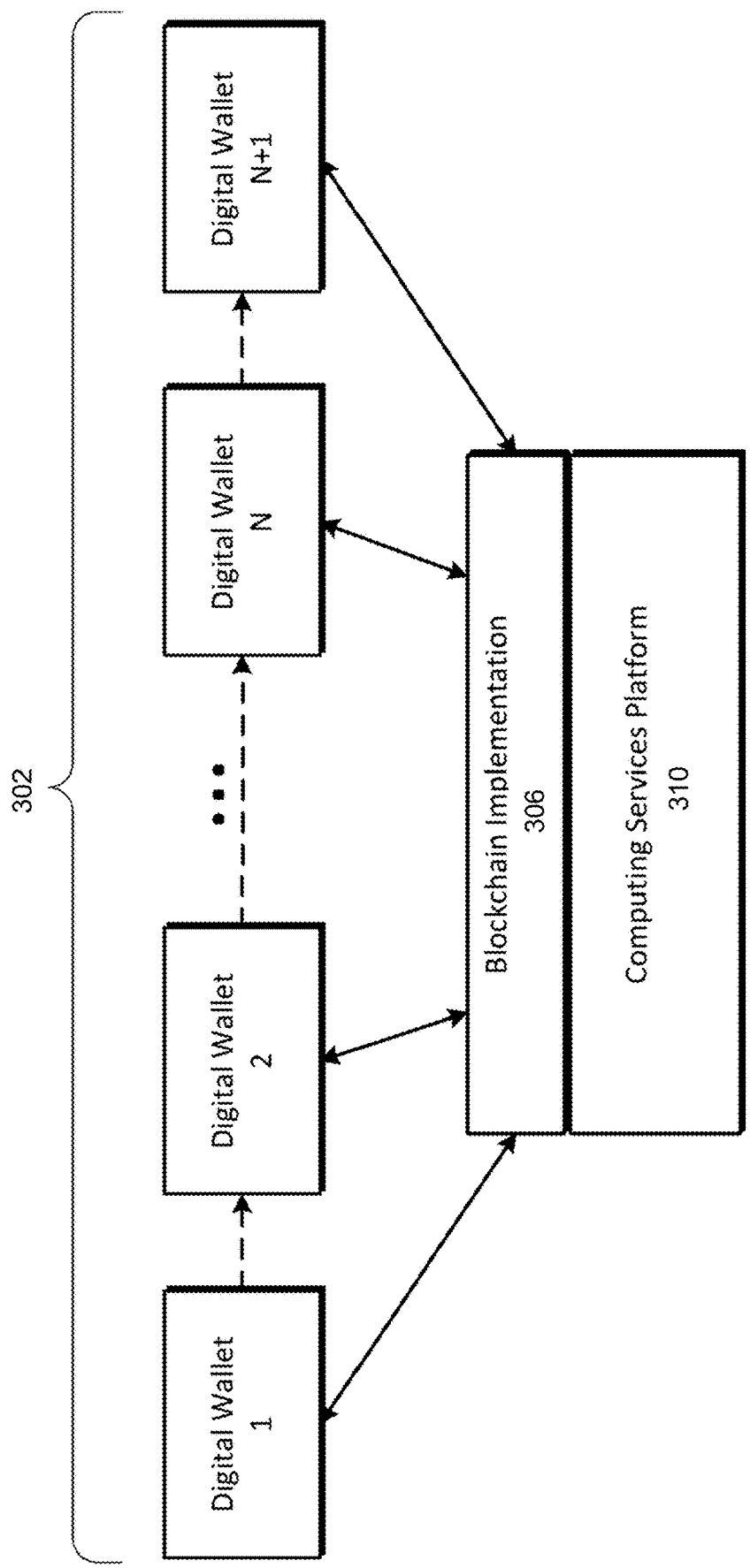
FIG. 3 depicts a high-level architecture of a block-chain based system according to an implementation that incorporates one or more of the exemplary processes seen in FIGS. 1-2.

FIG. 3 depicts, as a high-level architectural overview, one implementation of a blockchain-based system that provides the features described herein. As shown, multiple digital wallets 302 associated with different users having different roles can be used to perform the operations and transactions described herein (e.g., digitally signing data using a key). Each digital wallet 302 can operate on a suitable user device, such as smartphone, tablet computer, desktop computer, laptop computer, smart watch, smart glasses, smart television, smart appliance, workstation, and/or other computing device. In some implementations, the digital wallets 302 take the form of mobile applications, such as iPhone or Android wallet apps.

To perform transactions, digital wallets 302 can interface with a blockchain implementation 306 that maintains the one or more blockchains or similar digital ledgers utilized in the present system. Blockchain implementation 306 can include, for example, Hyperledger Fabric made available by the Hyperledger Project. Blockchain implementation 306 executes on computing services platform 310, which can provide the necessary processing and storage functionality for blockchain implementation 306. Computing services platform 310 can be provided by a cloud computing services vendor and can include a platform such as Amazon Web Services, Microsoft Azure, and Google Cloud Compute. Cloud computing services platform 310 can also include a private cloud implementation in which only certain parties have access to the network. Other types of computing platforms are contemplated.

A suitable communications network can connect the devices on which the digital wallets 302 operate with blockchain implementation 106 and computing services platform 310. Communication can be achieved over media such as standard telephone lines, LAN or WAN links (e.g., T1, T3, 56 kb, X.25), broadband connections (ISDN, Frame Relay, ATM), and wireless links (802.11 (Wi-Fi), Bluetooth, GSM, CDMA, etc.), for example. In one implementation, the network carries TCP/IP protocol communications and HTTP/HTTPS requests made by a web browser, and the connections between devices and servers are communicated over such TCP/IP networks.

Referring in further detail to role-based wallets, privileges can be differentiated not only by the permissions granted, but also the frequency of access to use and transact on the system and the authentications required to access and transact. In this manner, stronger forms of authentication (beyond a baseline digital signature) can be employed selectively for larger transactions and for those participants carrying larger balances or with less experience. This blockchain and wallet system can be configured to strengthen authentication and achieve segregation of roles or duties through the further implementation of multi-factor authentication, challenge questions, multiple signatures, extra keys and/or special smart contracts to generate a transaction. Such additional forms of authentication are useful as protections to make humans aware of the transactions, thereby preventing usurpation via theft or other means.

This implementation can incorporate smart contracts and similar concepts which enable individual users to add pre-defined and/or custom contingencies to individual transactions, and can enhance the security and usability of the system for the benefit of all users. By way of example, and not by way of limitation, smart contracts can be used by merchants to define incentives. Restrictions and qualifications for the merchant's incentive can be components of the smart contract, such as an incentive where: (i) the account holder is offered a savings on future purchase from the merchant (i.e., the incentive has attributes such as the particulars for a certain percentage off the total transaction amount, such as in the form of a fifty percent (50%) off coupon, when certain conditions are met at the time when the account holder conducts a future transaction with the merchant); (ii) the account holder is offered an entry in a sweepstake contest (e.g., a prizing opportunity) having various rules and conditions; (iii) the account holder is offered the benefit of a contribution being made to the account holder's predetermined charity in a community where the merchant is located and where the account holder resides, where the incentive is triggered when the account holder conducts a future transaction with the merchant, and where the merchant's donation will be a merchant-designated percentage of the currency amount of the transaction (e.g., two percent (2%) of the transaction total will be donated by the merchant to a charity in the local community).

In this manner, participants in the permissioned blockchain are granted access that is consistent not only with their individual expertise, but the role that they are playing for a given account. Pre-defining these privileges and roles allows transactions to proceed quickly and seamlessly. This approach moves away from the traditional blockchain paradigm of the egalitarian one-size-fits-all model to one that balances the benefit and risk of each user's participation, which in turn maximizes the utility of the system and enhances trust.

Wallet privileges can be defined using one or more techniques. For example, the user's role can be governed by the client software (wallet) on the user device, or by a central database that manages specific user privilege. In another example, user identities can be grouped into tiers or roles. Some combination of these techniques can be used to enhance security and optimize system performance. These permissions at the user (client) level include tiered wallets and role-based wallets.

Permissions can also incorporate geo-fencing, in which certain permissions are extended to local participants, for example, those consumers transacting with merchants in the same community, where the community is defined by a geographic area and/or by travel time as discussed elsewhere herein. Similarly, capturing the geographic location of the user and geo-fencing of the privileges can also be used as part of an authentication check. In further implementations, geographic information can be used to determine which policy, rules, or regulations should apply to the transaction between the consumer and the merchant, such as the date, time, and amount of the transaction being a condition of the merchant being obligated to make a donation to a charity of the consumer's choice.

In some implementations, roles, tiers or permissions are transparent to the entire network, whereas, in other instances, only the sponsor and the user will know their respective statuses.

Referring now in further detail to multiple-blockchain implementations, these implementations provide for multiple blockchains which form multiple archives conserving the integrity of different data fields from the superset of all transactions. Whereas, traditionally, blockchain technology has been focused on ensuring a financial component, such as bitcoin, is neither lost nor double-spent, the present system repurposes these safeguards to ensure the integrity of other transaction-related data including, but not limited to, verifying that a transaction was conducted by an account holder with a merchant on an account issued by an issuer to the account holder, the date, time and amount of the transaction, the obligation resulting from the transaction that the merchant will make a donation to a charity of the account holder's choice, and the completion of the donation by the merchant to the charity. The techniques implemented in this system allow for the record to be generated in a transparent and near real-time fashion.

In certain implementations, blockchains can be linked by the common timestamps of the transactions so that all the data would be available if all the blockchains were available to the viewer. In other instances, the blockchains can be segregated from one another, enhancing privacy and anonymity. One such technique is to introduce noise into transaction timestamps in one of the blockchains to foil attempts to merge the data back together.

The blockchain-based systems described herein can use standard elements, such as virtual wallets for each system user and peer to peer interactions, and can include some combination of role-based wallets, specialized validation techniques and tiered permissions to access data. The validation process can use a third-party computation to create blocks, and geographic coordinates associated with digital wallets and/or discrete products can be driven by multilateration techniques supported by GPS, GLONASS, Wi-Fi position, or active or passive elements attached to user devices and/or products themselves. In some instances, such location techniques can also be used to ensure that a transaction makes sense (e.g., by determining if a current geographic location of a digital wallet matches a location in a previous transaction or some other expected location). This can be particularly important at the point of entry into the system. The validation of external data points, such as geo-fencing, are difficult to enforce in a permissionless blockchain, but in implementations of the blockchain-based systems described herein, the system sponsor can adjudicate as part of the genesis process Generally, as described herein, validation refers to the process of determining the validity of data received for each transaction. Third-party validation can be performed by competing validators, such as the Satoshi method employed by Bitcoin; by trusted validators; by peer-to-peer protocols; or by the public agency sponsor and their designated contractor(s). Geometric information, for example, can be embedded directly into the blockchain (e.g., included in the notarized description of a transaction), or it can logically map onto a separate database or lookup table. System sponsors can host multiple blockchains instantiations to segregate viewing, lower complexity and enhance system performance.

Other privileges associated with digital wallets can include limitations on frequency of access to use and transact on the system, requirements for authentications to access and transact on the system (e.g., require stronger forms of authentication for larger transactions and for those participants carrying larger balances or with less experience), ability to maintain a negative (short) balance, ability to enter into larger purchases and sales, ability to purchase on credit, and ability to transact outside market hours. In some implementations, location information (from GPS or other location techniques) is used in conjunction with a geo-fence to determine whether a transaction is permitted. In general, such information external to the blockchain (e.g., location, time, wallet balance, wallet age, etc.) is fundamentally qualitative. Accordingly, it should be noted that, so long as this information is used to defer transactions and does not cause a modification of the blockchain, possible states cannot be contradictory, where "possible" includes states that can only be reached by falsifying outside information.

Figure 4:
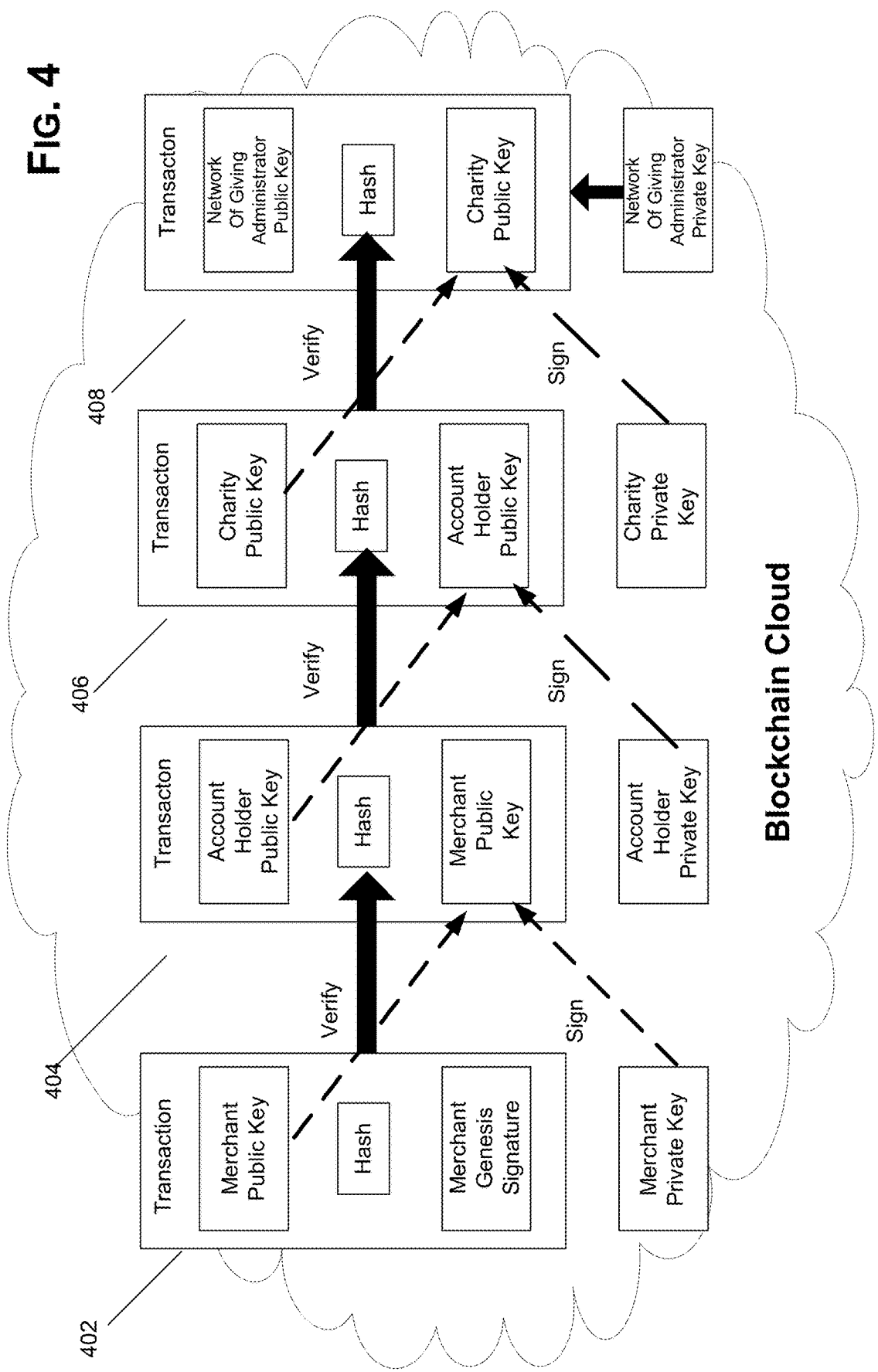
FIG. 4 depicts example transactions between merchants and account holders in a blockchain using role-based wallets, where each such transaction incorporates one or more of the exemplary processes seen in FIGS. 1-2.

FIG. 4 depicts an example data transfer flow as seen at reference numerals 402 through 408 for data pertaining to a transaction between a merchant and an account holder for which the merchant agrees to make donation to a charity of the account holder's choice. The flow begins with the merchant, continues to the account holder, then to the charity, and the flow ends with an administer of the merchant donations. The administer, as used herein, is referred to as the Network of Giving Administrator. Each transaction is recorded in one or more blockchains.

The transaction data flow begins at its creation shown at reference numeral 402 in which a merchant uses its digital wallet to provide a description of the transaction and a genesis signature for the transaction. The transaction can include a Globally Unique IDentifier (GUID). The merchant digitally signs the assignment of the GUID to the transaction. To avoid the introduction of falsified and/or erroneous data, this signing can be performed using, for example, unique private keys generated for each item or for regular time intervals (e.g., for each day).

In some implementations, one or more notary computing systems can be used to verify the signing of the merchant's identity. To achieve this, the merchant can provide a reference to a block in which their approval of the transaction is granted and can provide the decrypted contents of that block. The notary (or notaries) has access to the public key information for the Merchant Public Key and for the referenced cryptographic block. The public key can be applied to the Merchant Genesis Signature to verify that the merchant is who they claim to be. Likewise, the referenced block can be verified to have been notarized, and the associated public key can be applied to the provided unencrypted data to verify that the merchant is in fact able to decrypt the block contents. Other transaction-related data also can be added to one or more blockchains such as: (i) the percentage of the transaction amount that the merchant will donate to a local charity; (ii) data pertaining to account holder related demographics; and (iii) data referencing other blockchains that involve the merchant and/or the account holder.

In the transaction data flow 404, transaction-related data moves from the merchant to the account holder using their respective digital wallets, resulting in an event in the blockchain. In the transaction data flow 404, the private cryptographic key of the merchant (Merchant Private Key) is used to digitally sign a hash of the previous transaction in the respective blockchain (i.e., transaction creation data flow 402) and the public cryptographic key of the account holder (Account Holder Public Key), and this information is stored as part of a new block added to the one or more blockchains. As shown, the merchant's public cryptographic key can further be used to determine the validity of the transaction.

In one implementation, the data flow for the transaction incorporates validation by one or more notary parties. In this implementation, in transaction data flow 404, the merchant designates the account holder and by way of a cryptographic signature. To avoid unauthorized transaction events, the signing can be performed using a unique private key for the transaction. Each notary verifies that the transaction is valid and reviews any permissions associated with the transaction. If a request to make the transaction is denied, it may indicate the arrival of new information in the blockchain (or an error in or attempted circumvention of the system). The account holder can be notified of the denial. If, however, permissions permit the transaction, the notary can participate in finding a valid representation to add to the blockchain. Of note, the right of validation is a part of the transaction. Consequently, the result of a transaction is that the account holder acquires a right of validation for the transaction. In general, the merchant loses the right of validation, but may still be able to assess validity of the transaction due to other granted rights.

Still referring to FIG. 4, and continuing in the same manner, data flow for the transaction is transferred by way of a notation that an obligation has arisen with the respect to a donation that is to made by the merchant to a charity of the account holder's choice. That is, in the transaction data flow 406, the private cryptographic key of the account holder's designated charity (Charity Private Key) is used to digitally sign a hash of the previous transaction data flow 404 in the respective blockchain and the public cryptographic key of the charity (Charity Public Key). Again, this information is stored as part of a new block added to the respective blockchains. The process continues in the same manner, in the transaction data flow 408, to transfer data pertaining to the transaction from the charity to an administration of donations by merchants to charities. As seen in FIG. 4, the administrator is shown as being the Network Of Giving Administrator in transaction 408.

In the transaction data flow 408, the private cryptographic key of the Network Of Giving Administrator (Network Of Giving Administrator Private Key) is used to digitally sign a hash of the previous transaction in the respective blockchain (i.e., transaction data flow 406) and the public cryptographic key of the charity (Charity Public Key), and this information is stored as part of a new block added to the one or more blockchains. As shown, the Network Of Giving Administrator's public cryptographic key can further be used to determine the validity of the transaction.

Notarization, as generally used herein, refers to the process of entering validated transactions from authenticated users into a blockchain. Notarization can occur when one or more parties requests a particular transaction, and completes when a block describing the transaction is added to the blockchain ledger. Notary systems have two responsibilities: to verify that all requirements for a transaction are satisfied, and to perform the work necessary to notarize the addition of the transaction to the block chain.

Notaries can be implemented on secured servers. These servers can send notarization results to parties that are encrypted using public keys of the authorized parties. Any party can receive results of a query, but only the authorized party can decrypt them. To avoid a single point of failure, multiple independent secured servers can be used. These servers can all participate in the process of notarization, so that even if one server were exploited to validate non-compliant transactions, all other servers would be able to identify the conflict. Since various agencies require insight into aspects of the distribution and consumption mediated by the block chain, those agencies should retain replicas of the relevant portions of the database, and should participate in notarization of transactions within their purview.

Figure 5:
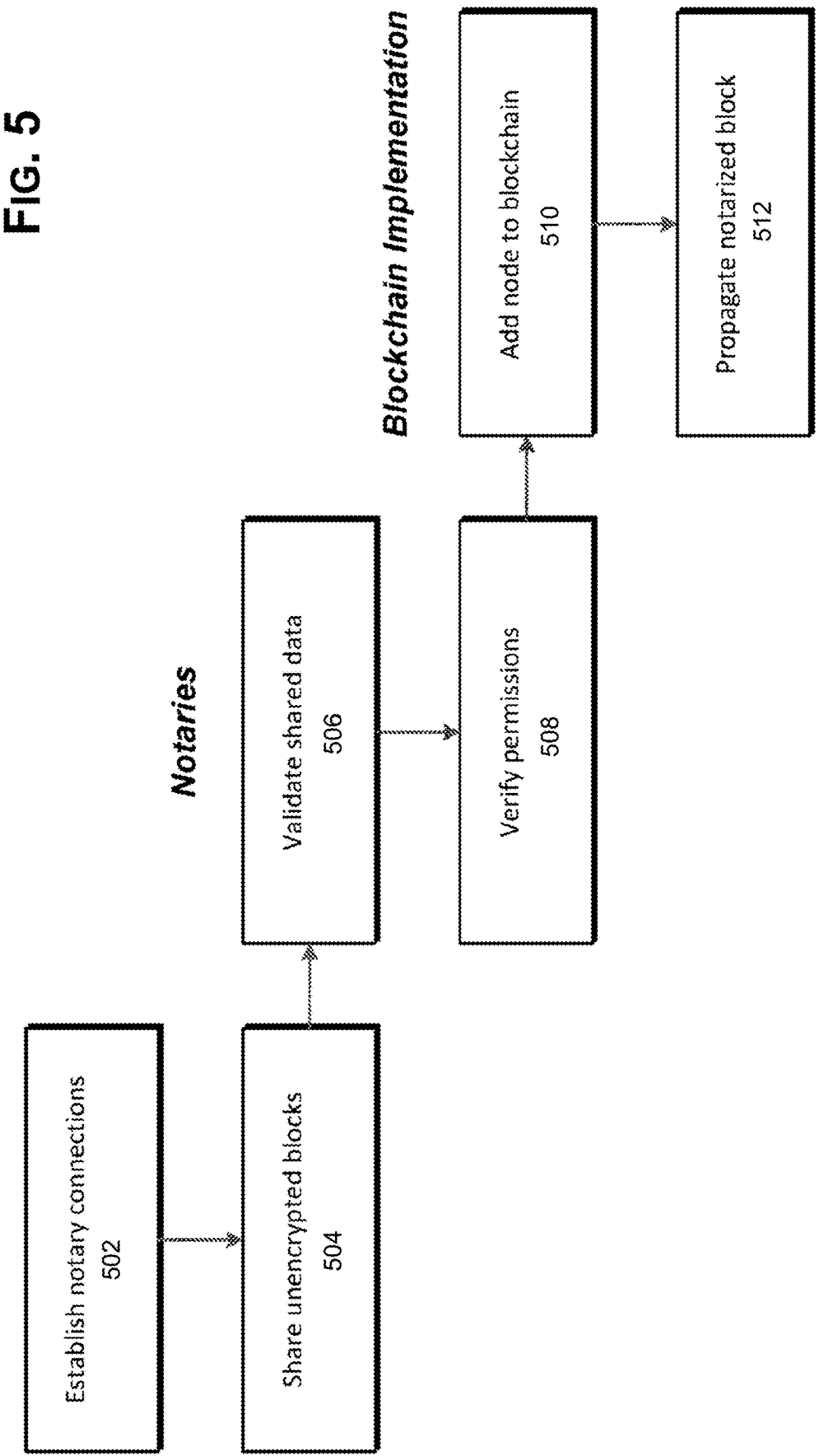
FIG. 5 depicts an example method for notarizing a transaction according to an implementation, where the transaction incorporates one or more of the exemplary processes seen in FIGS. 1-2.

FIG. 5 depicts an example method for performing notarization of a blockchain for a transaction. In Step 502, the parties involved in the transaction (e.g., the merchant selling goods and/or services to an account holder) establish secure network connections with the same set of one or more notary computing systems, or notaries. Each party securely shares with the notary set the data in blocks, in unencrypted form, needed to validate the transaction (Step 504). The information can be shared by providing a reference to a block in the blockchain that contains the information. In some implementations, if any additional party is required to be able to view the transaction (e.g., the charity designated by the account holder, the Network of Giving Administrator), that party must also provide proof of presence.

In Step 506, each notary validates the shared data by first verifying the notarizing hash on the referenced block (the hash created when the referenced block was added to the blockchain), and, then, by encrypting the data using the public key associated with that block. Each notary assesses the rights demonstrated by each party in the transaction and verifies that the rights grant permission to perform the requested transaction (Step 508). These rights can be defined by the privileges associated with each user's role-based wallet. Other actions (e.g., item genesis) might require verification of a cryptographic signature identifying a party.

The data describing the transaction is encrypted using a public key shared by the parties in the transaction. In some implementations, the data describing the transaction includes references to blocks used to validate the transaction and/or any requirements for the transaction to proceed.

The encrypted data and the public key together constitute a block. The transaction is complete when the block chain, with the addition of the new block, has been cryptographically notarized (Step 510). The addition of a notarized block can then be propagated to all relevant notaries (Step 512). Advantageously, the notarization can be verified and other notaries can validate transactions without requiring that the contents of the notarized block be decrypted. An important consequence of this approach is that the data stored in the block chain is fully encrypted. If a server participating in notarization were compromised, the only private data that would be exposed would be the data provided to validate new transactions.

More generally, in the case where multiple parties need to be able to read the block, a key can be generated and shared by those parties. Alternatively, a copy of the block data can be encrypted using public keys provided by each party. The block would then consist of multiple copies of the data encrypted using a public key, as well as the public keys used for the encryption. By re-encrypting using any public key, any party could then verify that the other parties see the same information when they decrypt their copy of the data from the block.

Public data can also be included in a particular block. For example, it might be desirable for a notary to be able to verify that a block establishing ownership of an item has not been used more than once to validate a change of ownership. In this case, the notary would need to be able to determine that an existing transaction block has referenced the ownership block, despite being unable to decrypt the existing transaction block. An alternative to public custody referencing is to have entire chains of custody be included in the encrypted data, which is subject to frequent auditing by an authorized party—such as by the Network of Giving Administrator who may have audit responsibility to ensure that donations by merchants to account holder designated charities are made with one hundred percent (100%) pass through from the merchant to the charity.

One method of referencing a block to validate a transaction is to provide the block index and the unencrypted block contents. The notary then verifies that the known public key yields the same encryption as is in the block specified by the index, and further verifies the hash on that block. However, this process does not require that the "encryption" process be lossless—it could just be a hashing function with the property that strings yielding the hashed result are difficult to determine.

Figure 6:
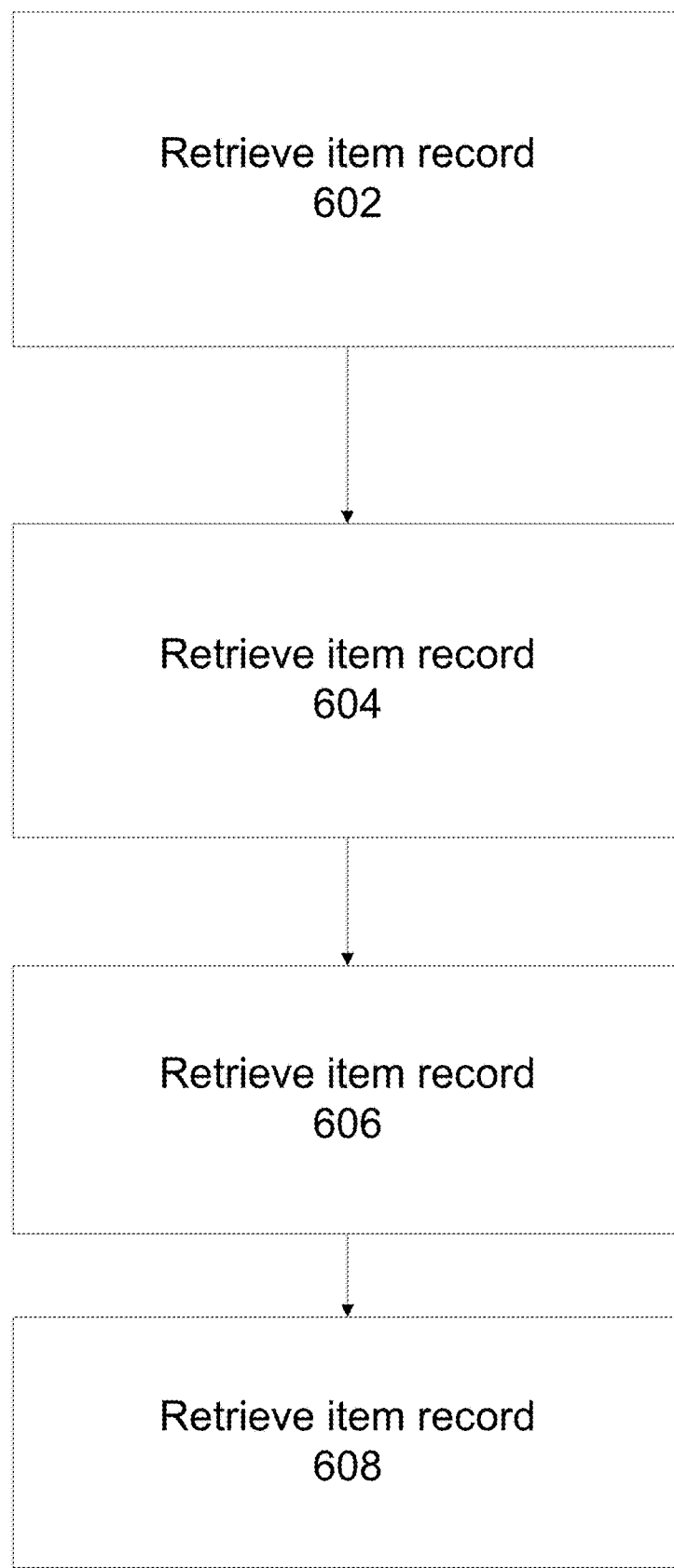
FIG. 6 depicts an example method for validating a transaction between a merchant and an account holder according to an implementation, where the transaction incorporates one or more of the exemplary processes seen in FIGS. 1-2.

Referring now to FIG. 6, validation of a block in a blockchain tracking a transaction between a merchant and an account holder may verifying accuracy of the transaction, which can be accomplished in one implementation as follows. In Step 602, a record associated with the transaction is retrieved using the GUID for the transaction. Data pertaining to the transaction, including acknowledgement of the obligation by the merchant to make a specified type and kind of donation to a charity of the account holder's choosing, is validated up to the requested block in the blockchain (Step 604), and an evaluation is made to determine if there is any conflicting history (Step 606).

Various techniques can be used to achieve the foregoing steps. For example, a participant in the blockchain can have a wallet that can include a table containing transaction-related data mapped to indices of blocks that demonstrate the veracity of the transaction. The participant in the blockchain then contacts any notary to request the indexed block, and on receiving the encrypted block (and any additional blocks used for the hashing), verifies the hash and decrypts the contents of their block using their private key. These steps are sufficient to verify the status of the transaction at the time the transaction-related date was obtained.

Still referring to FIG. 6, as part of notarizing the transaction, the results of the validation can then be encrypted using the public keys declared for the transaction and block, and the encrypted result returned (Step 608).

In some implementations, as part of effecting the validation of a block, a party involved in a transaction should know the blockchain index associated with the transaction. For example, such parties can be responsible for maintaining a database mapping product identifiers with blocks. In order to reconstruct the history of a transaction, a user should then have the ability to decrypt each referenced prior transaction block (which is generally a subset of the total referenced blocks). Further, in order to validate an item, the user need only have permission to view any single blockchain block in the item's history.

Advantageously, in addition to the blockchain capturing each transaction, the total number of units are conserved by blocking any transactions that double-count. This failsafe can be applied to additional units of account (e.g., number of units) in additional blockchains, such that no double counting occurs, nor are dollars or additional units lost. Each blockchain decrements and increments an equal amount for every block, and each blockchain conserves the total numbers of units of that unit of account. In some implementations, the accuracy of the number of units and the accounting of other tracked values within blockchains relies on auditing of the transactions by an authorized party.

Figure 7:
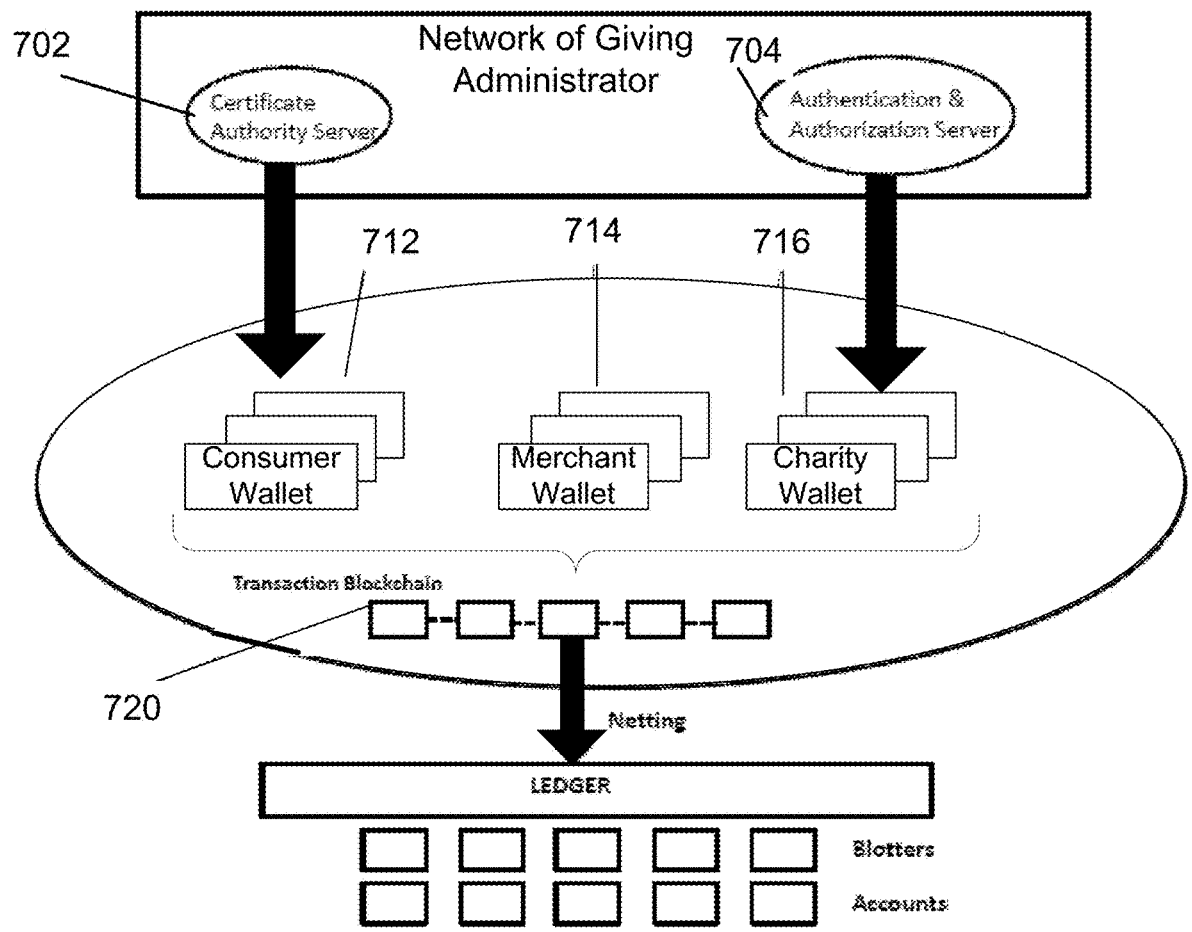
FIG. 7 depicts an example implementation of a blockchain-based system in transactions between merchants and account holders that incorporates one or more of the exemplary processes seen in FIGS. 1-2.

Referring now to FIG. 7, there is depicted a system configured for making use of role-based wallets in which a netting system is employed prior to notarization. In one example of a blockchain-based system using role-based wallets, as depicted in FIG. 7, the netting system tracks each transaction that results in a donation, where the transaction is conducted between a merchant and an account holder, and where the transaction was incented by the merchant offering to the account holder the merchant's commitment to make the donation to a charity of the account holder's choice.

Each participant in the blockchain system has been issued a certificate by a certificate authority server 702. Each participant is issued a wallet which must be re-authenticated and re-set prior to connecting with an authentication server 704. These wallets, named after their associated participants, include a consumer (e.g., account holder) wallet 712, a merchant wallet 714, and a charity wallet 716. Each wallet can have settings which limit the type and kind of transaction that is permissible.

Transactions occur on a peer-to-peer basis and are captured in near-real time in the blockchain 720, which effectively serves as a master blotter. At the end of the process seen in FIG. 7, a back-office nets out the blockchain 720 and each merchant and/or charity receives an individual blotter and net positions for settlement of each donation that the merchant is obligated to make to each charity. Oversight of donations from merchants to charities designated by respective account holders can be performed by a Network of Giving Administrator seen at reference numeral 702-704 in FIG. 7.

Social Smart Contract Reverse Crowdfunding with Feedback Loop

In one implementation, a holder of an account issued by an issuing bank (e.g., a cardholder), or an agent or designate thereof, can set up a predetermined smart contract, such as a computer protocol, operated on the World Wide Web and intended to digitally facilitate, verify, or enforce the negotiation or performance of a contract. Preferably, the smart contract will allow the performance of credible transactions without third parties such that the transactions are trackable and optionally irreversible. Also preferably, various cryptocurrencies, via blockchain protocols, can be implemented with the smart contract as a funding mechanism for donations to be made to a reverse crowdfunding platform.

In one variation of this implementation, the smart contract facilitates the cardholder's direction to a merchant to make a merchant defined donation whenever the cardholder conducts a transaction with the merchant on the cardholder's account. The cardholder provides instructions to the merchant to make the merchant defined donation to the reverse crowdfunding platform via a blockchain mechanism that is targeted to a specific product or specific service. By way of example, and not by way of limitation, the merchant defined donation can be a percentage of the total purchase amount of the transaction conducted by the cardholder with the merchant.

The predetermined smart contract provides the terms and conditions for governance under which the merchant defined donation is funded to the reverse crowdfunding platform via the blockchain mechanism. Upon satisfaction of the terms and conditions that govern the predetermined smart contract, the sum total of one or more such merchant defined donation are paid out by the reverse crowdfunding platform so as to fund the targeted specific product or specific service according to the terms and conditions of the smart contract.

Preferably, the specific product or specific service is particularized by an identifier so as to be globally unique, such as by being associated with a Globally Unique IDentifier (GUID). By way of example, and not by way of limitation, the GUID can be a Vehicle Identification Number (VIN) when the specific product is a motor vehicle, a social security number when the specific product or specific service is to be provided on behalf of a human being, a unique identifier for a particular DNA sequence when the specific product or specific service is to be provided on behalf of a life form—whether or not alive, a serial number when the specific product has a unique serial number, a contract number for a specific service that is to be provided, a service order number when the specific service is to be provided on behalf of a person, entity, or thing, a unique number generated by a pseudo random number generator when the specific product or specific service is to be provided on behalf of a person, entity, or thing, etc.

For the donations to be made to the reverse crowdfunding platform, the cardholder, or agent or designate thereof, proposes a request for a specific product or service that is to be funded by each of the donations made to the reverse crowdfunding platform by each such transaction that the cardholder, or other cardholders, conducts with merchants who have agreed to a make each such merchant defined donation. Once the predetermined smart contract and its funding reverse crowdfunding platform have been setup and published, a crowd of cardholders conduct transactions with respective merchants on their respective cardholder accounts, where each such merchant has agreed to make a merchant defined donation to the reverse crowdfunding platform via the blockchain mechanism that is targeted to a specific product or specific service. As such, the crowd of cardholders 'vote with their respective wallets' for the good or benefit the charitable intent as defined by the smart contract. In some variations on this implementation, the reverse crowdfunding platform can receive a commission fee from funds raised for the specific product or specific service upon full satisfaction of the terms and conditions of the smart contract. Advantageously, when a cardholder, or agent or designate thereof, has a charitable intent for a specific product or specific service to be provided to a charity that is to be provided by operation of a reverse crowdfunded smart contract, without any obligation to the cardholder, when blockchain funding is collected (e.g., via a cryptocurrency such as bitcoin), without the sophistication of a complicated written contract, but rather via the moderation of a crowdfunding website administrator who provides a sufficient explanation of the charitable project, and without need for ID verification, the cardholder can remain anonymous. In various alternatives, the payout to the charity may not even be allowed until end of the charitable project as per the terms and conditions of the smart contract, which may provide for periodic measurements to stop any anonymous ill-intended cardholders from placing such charitable projects "on-hold".

By way of example, and not by way of limitation, the smart contract may facilitate the funding for a specific product or service via transaction initiated merchant defined donations of: (i) the purchase of a motor vehicle identified by a VIN that will be used to deliver meals to elderly or shut-in people in a particular community in which the cardholder resides; (ii) the purchase of one (1) four (4) dimensional (4D) ultrasound machine, that is uniquely identified by a serial number, for the purpose of capturing full motion video of a pre-born human in utero, where the 4D ultrasound machine is to be installed and used in a women's reproductive healthcare facility in a particular community in which the cardholder resides; (iii) providing funding for the care, feeding, and adoption of an animal in a pound that would otherwise be euthanized, where the animal is uniquely identified by its unique DNA sequence or by some other code sequence such as a registration number embedded in a microchip of the registry for the particular brand of chip; (iv) providing funding for a healthcare procedure for a human uniquely identified by the human's unique social security number or other government issued code; (v) etc. In each such example, the crowdfunding allows a project or venture to be paid for by raising small amounts of money from a large number of people each of which are cardholders incented to conduct transactions with respective merchants who will make the merchant defined donation to the crowdfunded charity as defined by the terms and conditions of a predetermined smart contract.

The crowdfunded charity, as provided by the smart contract, can employ a blockchain framework for funding via a cryptocurrency, such as 'Ethereum' which implements a nearly Turing-complete language on its blockchain. Alternatively, the funding cryptocurrency can be 'Bitcoin' which provides a Turing-incomplete Script language that allows the creation of various terms and conditions for custom smart contracts on top of Bitcoin, including, by way of example and not by way of limitation: (i) multi-signature accounts; (ii) payment channels; (iii) escrows; (iv) time locks; (v) atomic cross-chain trading that enables the exchange of one cryptocurrency for another without using centralized intermediaries (e.g., exchanges) and can take place directly between blockchains of different cryptocurrencies or they can be conducted off-chain and thus away from the main blockchain; (vi) the use of an oracle serving as an agent that locates and verifies data associated with real-world occurrences of transactions between cardholders and merchants and then submits the verified data to a blockchain for use by a predetermined smart contract; (vii) a multi-party lottery with no operator by which parties can jointly compute a function over their inputs while keeping those inputs private to thereby assure security and integrity of communication or storage and thereby avoid eavesdroppers on the sender and receiver so as to protect participants' privacy from each other for use of cryptography in the particularized cryptocurrency model; (viii) etc.

Advantageously, a blockchain-based smart contract will be visible to both cardholders and merchants as respective users of the blockchain—thereby providing total pass-through in a documented chain of custody of each merchant defined donation to the funding and provision the specific product or service as designed and controlled by the terms and conditions of the predetermined smart contract.

In yet another alternative to the foregoing implementations, a 'smart bond" can be used instead of a smart contract, wherein the terms and conditions of the smart bond call for the use of a cryptocurrency blockchain, such a bitcoin blockchain, in which payment streams are fully automated so as to create a self-paying instrument to crowdfund the chartable product or service via the merchant defined donations of each cardholder transaction.

In still another alternative of the foregoing implementations, a feedback loop is provided to each cardholder who is incentivized to conduct a transaction with a merchant who will make a merchant defined donation to the crowdfunded product or service. Upon placement, installation, and use of the uniquely identified product or service, the latter is enabled to produce data from the use thereof, which usage data is sent to a logical address associated with each such incentivized cardholder who conducted a transaction on their account with a merchant. Receipt of such usage data provides additional and on-going incentives to the cardholder via verifiable confirmations that are communicated, optionally in real or near-real time, to reinforce that the charitable intent of the reverse crowdfunded smart contact has been realized, is even now being realized, and will be realized going forward. Generation and transmission of the usage date can be by way of metering mechanisms coordinated with the use and operation of the unique identified product or service. By way of example, and not by way of limitation, the specific product may be: (i) a motor vehicle identified by a VIN, where the motor vehicle transmits mileage and operation data to the cardholders' respective email addresses such that the transmitted data provides on-going documentation of the success of the reverse crowdfunding project in which each such cardholder was a participants; (ii) the specific product may be an Internet-Of-Things (IOT) enabled 4D ultrasound machine uniquely identified by a serial number, where the machine communicates pregnancy usage data, such as the transmission of all or part of a 4D ultrasound video, to each of the cardholders' respective email addresses. Upon viewing a rendering of the transmitted 4D video, the incentivized cardholders are able to rewarded with assurance and confidence that their pregnancy resource focused charitable intent has been, is, and will be realized by their participation in the network of giving as provided by implementations, and variations thereof, as disclosed herein; (v) etc.

Merchants Care about Community Implementations

As disclosed in U.S. patent application Ser. No. 13/748,459, filed on Jan. 23, 2013, titled Authorized transaction incented by merchant donation, which is hereby incorporated by reference, in one computerized implementation, the Blockchain Implementations as depicted in FIGS. 3-7, can be operated in conjunction with a yet further implementation in which a merchant incentivizes an account holder to make an authorized transaction by terms and agreement to auditably donate to the account holder's affinity entity. To incent desirable commerce with locals, the merchant's terms may limit its donation by a derivation of navigation time between account holder and merchant, and/or by date and time of the transaction. The account holder can direct the donation to one of more affinity entities within their own community, and/or within a community where the transaction was physically conducted. An account holder can also donate at the time of transaction where the donation is paid by the account's issuer for reimbursement as a debit to the account holder's account statement. Other payment system participants may donate (the merchant's acquirer, issuer, and transaction handler for the issuer and acquirer), by way of favorable interchange rates, can also make auditable donations to account holder directed affinities entities.

One or more of the foregoing implementations relate to computer-implemented methods and server-implemented methods where, for each transaction between an account holder and a merchant, information is received that is derived from an authorization response for the transaction, where the information includes the date and the time, a currency amount, and an identifier for the merchant. For each transaction for which the date and time of the corresponding authorization response are within a predetermined time period, and for each identifier for the merchant, there is a deriving of the sum of the currency amounts by using the identifier for the merchant to access a database to retrieve (i) the logical address for the merchant, or its agent, corresponding to the identifier for the merchant and (ii) a business rule for making a donation corresponding to an identifier for an affinity entity or charity having a logical address, wherein in the currency amount of each donation is a function, at least in part, of the currency amount of each transaction. A transmission is made to the logical address for the merchant, or its agent, that includes the donation to the affinity entity or charity for the predetermined time-period. Within a predetermined audit time-period for and after the predetermined time-period, a plurality of donation receipts are received, each including (i) the respective identifiers for the affinity entity or charity and the merchant and (ii) a currency amount. For each identifier for the merchant, the sum of the currency amounts of the donation receipts for each identifier for the affinity entity or charity is derived.

After the predetermined audit time-period for the predetermined time, for each identifier for the merchant, and for each identifier corresponding to each affinity entity or charity to whom a donation was to be made as per the retrieved business rule, a determination is made of a difference between: (i) the donation for the predetermined time period that was transmitted to the logical address of the merchant, and (ii) the sum of the currency amounts of the donation receipts received for the affinity entity or charity for the predetermined time period. Then, the determined difference is transmitted to the logical address for the merchant, or its agent.

In several of the above implementations, an account issued by an issuer to an account holder can be a revolving credit account, a debit account, a charge account, an Automatic Teller Machine (AMT) account, a prepaid account, a gift account, etc. In various implementations, deposits to and withdrawals from each said account may be any and all forms of currency, including cash, crypto-currency (e.g., 'bitcoin'), frequent flyer miles, cellular telephone usage units (e.g., airtime, data transmission units), loyalty program points, etc.

In other of the above implementations, the affinity entities to which the merchant donates can be limited to those within the merchant's community, within the account holder's community, within both communities, or within neither community. In still further implementations, the account holders can designate those affinity entities to which the merchant is to make a donation, regardless of the location or charitable object or mission of the affinity entity. In yet other implementations, an acquirer for the merchant to a transaction can make the donation on the merchant's behalf incident to clearing and settling the transaction with the issuer that issued the account to the account holder, and where, optionally, the acquirer's donation can be in the form of an adjustment to exchange rate assessed to the merchant against the transaction amount for conducting the transaction on the account holder's account. Other participants in a payment processing system, including the issuer and the transaction handler, can similarly make donations as further incentives to the account holder to conduct a transaction on the account holder's account.

In still further of the above implementations, in an open loop cashless payment system for making charitable donations, the merchant funds and makes direct payment of all donations to the merchant's designated affinity entities or charities according to a merchant designated business rule, wherein, in a variation thereof, the merchant funds and makes direct payment of all donations to merchant's designated affinity entities or charities that are located in, and/or provide services to, the merchant's neighborhood, which may be defined geographically or by other definitions.

In yet further implementations, in an open loop cashless payment system for making charitable donations, the merchant funds and the merchant's acquirer makes direct payment, incident to a process of closing and settlement, of all donations to all affinity entities or charities for those transaction conducted by account holders with the merchant on respective accounts issued to the account holder by respective issuers.

In still further implementations, in an open loop cashless payment system for making charitable donations, the merchant funds the charitable donations and the merchant's acquirer makes direct payment, incident to a process of closing and settlement, of all donations to all charities for those transaction conducted by the account holders with the merchant on respective accounts issued to respective account holders by respective issuers, wherein, in a variation thereof, the donations are made to those affinity entities or charities having a physical location within the merchant's neighborhood, which may or may not be a geographically defined community.

In yet further implementations, the merchant funds and makes direct payment of donations to account holder-designated charities for those transactions conducted by the account holder with the merchant.

In still further implementations, in an open loop cashless payment system for making charitable donations, the merchant funds and makes direct payment of all donations to all account holder designated charities for those transactions conducted by the account holder with the merchant on an account issued to the account holder by an issuer, wherein, in a variation thereof, the donations are made to those charities having a physical location within the merchant geographically defined community.

In still further implementations, in an open loop cashless payment system for making charitable donations, both the merchant and its acquirer fund donations to charities, incident to a process of closing and settlement, of all donations to all account holder designated charities for those transaction conducted by the account holder with the merchant on an account issued to the account holder by an issuer, wherein, in a variation thereof, the donations are made to those charities designated by the account holder, which charities may have a physical location within a neighborhood where the account holder resides and the merchant's brick and mortar store is located. In a still further variation thereof, a downward adjustment is made to an exchange fee assessed to the merchant by the merchant's acquirer such that the merchant is able to pay a lower exchange fee to compensate for the merchant's charitable contribution, and, optionally, the acquirer for the transaction can also pay the same local charities a donation out of increased transaction volume due to the incentive.

In yet further implementations, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches at least a portion of the merchant's contribution to the affinity entity or charity by the account holder's issuer making direct payment to that affinity entity or charity incident to a process of closing and settlement such as by way of a charge for the account holder's charitable donation that is rendered as a statement debit on the account holder's periodic revolving credit account statement.

Variations on the foregoing implementations include allowing the customer to specify one or more affinity entities (e.g., charities) that provide goods and/or services in their local community to which donations are to made by merchants with whom the customer conducts transactions. In such implementations, each merchant is given notice of its total periodic obligatory donations. Such notice, however, is given without providing the merchant with any notice or knowledge as to the specific identity of those affinity entities that are to be its recipients. Such implementations leave the direction of merchant's donations fully within the discretion of the merchant's customers. In some implementations, the customer's discretion can be limited by the restriction that the customer can only select affinity entities from among those that serve the local community in common to both the merchant and the customer, while leaving the actual amount of the merchant's donation fully within the discretion of the merchant. Variations on such implementations include alternative definitions for the local community in common to both the merchant and the customer.

Still further variations on the foregoing implementations include deriving a donation to be made by the merchant to the affinity entity for a predetermined time-period by using a merchant donation business rule as well as a rule previously specified by the account holder who conducts the transaction with the merchant. By way of example, and not by way of limitation, the merchant's donation business rule might choose the amount of the donation, whereas the account holder's rule might choose the affinity entity that is not located in the same community or either the merchant or the account holder.

AllRewards Implementations

As disclosed in U.S. patent application Ser. No. 11/283,856, filed on Nov. 22, 2005, titled Method, system and computer program for providing a loyalty engine enabling dynamic administration of loyalty programs, which is hereby incorporated by reference, in one computerized implementation, the Blockchain Implementations as depicted in FIGS. 3-7, can be operated in conjunction with a yet further implementation in which there are provided methods, computer systems, and computer program products for encouraging customer loyalty. At least some of the methods include the steps of: (1) one or more partners defining a loyalty program, the loyalty program defining loyalty rewards, cross-promotional partner rewards and prizes associated with one or more activities; (2) registering one or more members with the loyalty program, whereby their registration includes the provision of registered form of payment data for one or more registered form of payment types of each of the one or more participants; (3) collecting financial data corresponding to transactions of the one or more members associated with the one or more partners, and providing said financial data to a loyalty engine; (4) providing access to the loyalty engine to the one or more members, the loyalty engine permitting the one or more partners: (a) to define the rules defining the loyalty program, including special partner rewards including cross-promotional rewards between partners, loyalty rewards, and chances to win prizes; (b) to monitor the effectiveness of the loyalty program; and (c) to modify the loyalty program to enhance its effectiveness. The computer system includes implementations of the loyalty engine. The computer program product consists of a server application that includes implementation of the loyalty engine. Partners access a number of software utilities linked to the loyalty engine to assess the effectiveness of the loyalty programs and customize the attributes of the loyalty programs to improve effectiveness. Members access the loyalty engine real time and use loyalty reward actions for prize opportunities.

One aspect of this implementation is a method of encouraging customer loyalty, including the steps of: (1) One or more merchants (e.g. partners) defining a loyalty program, the loyalty program defining loyalty rewards associated with one or more activities; (2) Registering one or more members with the loyalty program, whereby their registration includes the provision of registered form of payment data for one or more registered form of payments of each of the one or more members; (3) Collecting financial data corresponding to transactions of the one or more members associated with the one or more partners, and providing said financial data to a loyalty engine; (4) Providing access to the loyalty engine to the one or more partners, the loyalty engine permitting the one or more partners: (a) To define the rules defining the loyalty program, including accumulation of loyalty rewards, chances to win prizes, redemption of loyalty rewards from the partner and combined offers with other participating partners to cross promote products/services and provide rewards and/or discount offers to customer-selected benefit programs; (b) Monitoring the effectiveness of the loyalty program; and (c) Modifying the loyalty program to enhance its effectiveness.

Another aspect of this implementation is a computer system that includes the described loyalty engine. Another aspect is a computer program product consisting of the loyalty engine.

In a particular aspect of this implementation, the completion of a survey is linked to an opportunity to win prizes.

In yet another particular aspect of this implementation, members make a reservation for special partner rewards through the loyalty engine, and rewards are collected from the partner by the member presenting the member reward number at a location of the applicable partner.

In a still other aspect of this implementation, there are provided a method, computer system, and computer program product is provided that enables a plurality of partners to co-operate to provide loyalty benefits jointly, by operation of the loyalty engine.

Other Implementations of Merchants Care about Community

As disclosed in U.S. patent application Ser. No. 13/748,459, filed on Jan. 23, 2013, titled Authorized transaction incented by merchant donation, which is hereby incorporated by reference, in one computerized implementation, the Blockchain Implementations as depicted in FIGS. 3-7, can be operated in conjunction with a yet further implementation in which a merchant incentivizes an account holder to make an authorized transaction by terms and agreement to auditably donate to the account holder's affinity entity. To incent desirable commerce with locals, the merchant's terms may limit its donation by a derivation of navigation time between account holder and merchant, and/or by date and time of the transaction. The account holder can direct the donation to one of more affinity entities within their own community, and/or within a community where the transaction was physically conducted. An account holder can also donate at the time of transaction where the donation is paid by the account's issuer for reimbursement as a debit to the account holder's account statement. Other payment system participants may donate (the merchant's acquirer, issuer, and transaction handler for the issuer and acquirer), by way of favorable interchange rates, can also make auditable donations to account holder directed affinities entities.

One or more such implementations relate to computer-implemented methods and server-implemented methods where, for each transaction between an account holder and a merchant, information is received that is derived from an authorization response for the transaction, where the information includes the date and the time, a currency amount, and an identifier for the merchant. For each transaction for which the date and time of the corresponding authorization response are within a predetermined time period, and for each identifier for the merchant, there is a deriving of the sum of the currency amounts by using the identifier for the merchant to access a database to retrieve (i) the logical address for the merchant, or its agent, corresponding to the identifier for the merchant and (ii) a business rule for making a donation corresponding to an identifier for an affinity entity or charity having a logical address, wherein in the currency amount of each donation is a function, at least in part, of the currency amount of each transaction. A transmission is made to the logical address for the merchant, or its agent, that includes the donation to the affinity entity or charity for the predetermined time-period. Within a predetermined audit time-period for and after the predetermined time-period, a plurality of donation receipts are received, each including (i) the respective identifiers for the affinity entity or charity and the merchant and (ii) a currency amount. For each identifier for the merchant, the sum of the currency amounts of the donation receipts for each identifier for the affinity entity or charity is derived.

After the predetermined audit time-period for the predetermined time, for each identifier for the merchant, and for each identifier corresponding to each affinity entity or charity to whom a donation was to be made as per the retrieved business rule, a determination is made of a difference between: (i) the donation for the predetermined time period that was transmitted to the logical address of the merchant, and (ii) the sum of the currency amounts of the donation receipts received for the affinity entity or charity for the predetermined time period. Then, the determined difference is transmitted to the logical address for the merchant, or its agent.

In various implementations, an account issued by an issuer to an account holder can be a revolving credit account, a debit account, a charge account, an Automatic Teller Machine (AMT) account, a prepaid account, a gift account, etc. In various implementations, deposits to and withdrawals from each said account may be any and all forms of currency, including cash, crypto-currency (e.g., 'bitcoin'), frequent flyer miles, cellular telephone usage units (e.g., air time, data transmission units), loyalty program points, etc.

In other implementations, the affinity entities to which the merchant donates can be limited to those within the merchant's community, within the account holder's community, within both communities, or within neither community. In still further implementations, the account holders can designate those affinity entities to which the merchant is to make a donation, regardless of the location or charitable object or mission of the affinity entity. In yet other implementations, an acquirer for the merchant to a transaction can make the donation on the merchant's behalf incident to clearing and settling the transaction with the issuer that issued the account to the account holder, and where, optionally, the acquirer's donation can be in the form of an adjustment to exchange rate assessed to the merchant against the transaction amount for conducting the transaction on the account holder's account. Other participants in a payment processing system, including the issuer and the transaction handler, can similarly make donations as further incentives to the account holder to conduct a transaction on the account holder's account.

In still further implementations, in an open loop cashless payment system for making charitable donations, the merchant funds and makes direct payment of all donations to the merchant's designated affinity entities or charities according to a merchant designated business rule, wherein, in a variation thereof, the merchant funds and makes direct payment of all donations to merchant's designated affinity entities or charities that are located in, and/or provide services to, the merchant's neighborhood, which may be defined geographically or by other definitions.

In yet further implementations, in an open loop cashless payment system for making charitable donations, the merchant funds and the merchant's acquirer makes direct payment, incident to a process of closing and settlement, of all donations to all affinity entities or charities for those transaction conducted by account holders with the merchant on respective accounts issued to the account holder by respective issuers.

In still further implementations, in an open loop cashless payment system for making charitable donations, the merchant funds the charitable donations and the merchant's acquirer makes direct payment, incident to a process of closing and settlement, of all donations to all charities for those transaction conducted by the account holders with the merchant on respective accounts issued to respective account holders by respective issuers, wherein, in a variation thereof, the donations are made to those affinity entities or charities having a physical location within the merchant's neighborhood, which may or may not be a geographically defined community.

In yet further implementations, the merchant funds and makes direct payment of donations to account holder-designated charities for those transactions conducted by the account holder with the merchant.

In still further implementations, in an open loop cashless payment system for making charitable donations, the merchant funds and makes direct payment of all donations to all account holder designated charities for those transactions conducted by the account holder with the merchant on an account issued to the account holder by an issuer, wherein, in a variation thereof, the donations are made to those charities having a physical location within the merchant geographically defined community.

In still further implementations, in an open loop cashless payment system for making charitable donations, both the merchant and its acquirer fund donations to charities, incident to a process of closing and settlement, of all donations to all account holder designated charities for those transaction conducted by the account holder with the merchant on an account issued to the account holder by an issuer, wherein, in a variation thereof, the donations are made to those charities designated by the account holder, which charities may have a physical location within a neighborhood where the account holder resides and the merchant's brick and mortar store is located. In a still further variation thereof, a downward adjustment is made to an exchange fee assessed to the merchant by the merchant's acquirer such that the merchant is able to pay a lower exchange fee to compensate for the merchant's charitable contribution, and, optionally, the acquirer for the transaction can also pay the same local charities a donation out of increased transaction volume due to the incentive.

In yet further implementations, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches at least a portion of the merchant's contribution to the affinity entity or charity by the account holder's issuer making direct payment to that affinity entity or charity incident to a process of closing and settlement such as by way of a charge for the account holder's charitable donation that is rendered as a statement debit on the account holder's periodic revolving credit account statement.

Variations on the foregoing implementations include allowing the customer to specify one or more affinity entities (e.g., charities) that provide goods and/or services in their local community to which donations are to made by merchants with whom the customer conducts transactions. In such implementations, each merchant is given notice of its total periodic obligatory donations. Such notice, however, is given without providing the merchant with any notice or knowledge as to the specific identity of those affinity entities that are to be its recipients. Such implementations leave the direction of merchant's donations fully within the discretion of the merchant's customers. In some implementations, the customer's discretion can be limited by the restriction that the customer can only select affinity entities from among those that serve the local community in common to both the merchant and the customer, while leaving the actual amount of the merchant's donation fully within the discretion of the merchant. Variations on such implementations include alternative definitions for the local community in common to both the merchant and the customer.

Still further variations on the foregoing implementations include deriving a donation to be made by the merchant to the affinity entity for a predetermined time-period by using a merchant donation business rule as well as a rule previously specified by the account holder who conducts the transaction with the merchant. By way of example, and not by way of limitation, the merchant's donation business rule might choose the amount of the donation, whereas the account holder's rule might choose the affinity entity that is not located in the same community of either the merchant or the account holder.

Proximal Customer Transaction Implementations

As disclosed in U.S. patent application Ser. No. 13/834,984, filed on Jan. 15, 2013, titled Proximal customer transaction incented by donation of auto-boarded merchant, which is hereby incorporated by reference, in one computerized implementation, the Blockchain Implementations as depicted in FIGS. 3-7, can be operated in conjunction with a yet further implementation in which address, time, and rules obligating donee donations are auto-populated for merchants whose authorization responses for transactions conducted on accounts are used to obtain account holders' travel time to the merchant's location. When travel time is proximal to the auto-populated time, the rule and the transaction currency amount are used to calculate the merchant's donee donation, which donation can be messaged for auditing of donations paid and payable. A predetermined time after each such transaction, the merchant is sent a notice as to the difference between obligatory donee donations and the donee donations received. Auto-populated addresses, times, and rules are amendable by the merchant, and the donee amendable by the account holder, whereby the merchant selects the donation, and the account holder selects the donee. Answers to account holder surveys, upon receipt, caused an increment to currencies for the account holder or the donee with greater increments for answers that are returned before a predetermined time threshold (e.g., the account holder gives fast answers to a survey).

In a computerized implementation, merchant data is auto-populated to include an address, duration, and a rule obligating the merchant to donate to a donee. Information from an authorization response for a transaction conducted by the merchant on an account of an account holder is used to obtain a travel time of the account holder from its address to the auto-populated address. When the obtained travel time is within a predetermined threshold of the auto-populated duration, a donation that the merchant is obligated to make to the auto-populated donee is derived by using the auto-populated rule and a currency amount of the trans action.

In another computerized implementation, there is obtained, from one or more databases, using information derived from a Globally Unique Identifier (GUID) for a merchant, merchant data for the merchant. The merchant data for the merchant includes: (i) a geographic address for the merchant; (ii) a default affinity entity or donee; (iii) a default maximum travel time to the geographic address for the merchant; and; (iv) a default business rule obligating the merchant to donate to the affinity entity. The merchant data for the merchant, now auto-populated, is stored in one or more databases. Information derived from an authorization response for a transaction conducted by the merchant on an account issued to an account holder is processed. This processing of the information includes (i): retrieving, using the identifier for the merchant, at least a portion of the stored merchant data for the merchant; (ii) accessing from one or more databases, using information derived from the identifier for the account holder, account holder data for the account holder that includes a geographic address for the account holder; (iii) inquiring, using the geographic addresses for the account holder and the merchant, the travel time from the geographic address of the account holder to the geographic address of the merchant; and (iv) if the retrieved travel time is within a predetermined tolerance of the default maximum travel time, deriving, using the default business rule and the currency amount of the transaction, the donation to be made by the merchant to the default affinity entity. Optionally, a message can be transmitted to a logical address of the merchant containing the donation to be made by the merchant to the default affinity entity.

In an alternative implementation of the foregoing implementation, the obtaining and storing are repeated for a plurality of the merchants and the processing for each of a plurality of the transactions is also repeated. Optionally, the processing can include transmitting a message to a logical address of the merchant containing the donation to be made by the merchant to the default affinity entity. As a further option, the logical address to which the message and the determined difference are transmitted can be any or all or a logical address for the merchant, the account holder, the affinity entity, an agent for at least one of the merchant, the account holder and the affinity entity, and combination of these.

In a further implementation, a predetermined time after the plurality of the transactions, a plurality of donation receipts can be received, each of which includes identifiers for the merchant and the default affinity entity, and a currency amount donated by the merchant to the default affinity entity. For each of the default affinity entities and for each of the merchants, a determination is made of the difference between the sum of the donations to be made by the merchant to the default affinity entity in the messages to the logical address of the merchant and the currency amount donated by the merchant to the default affinity entity in the donation receipts. The determined difference can then be transmitted to a logical address, for instance, which can be that of the logical address of the merchant, the account holder, the affinity entity, an agent for at least one of the merchant, the account holder and the affinity entity, and combination of these.

In a yet further implementation, each of the transactions occurs in a payment processing system that includes a plurality of the merchants each conducting each of the transactions on a respective account issued to a respective account holder by a respective issuer. Each transaction on each said account is acquired for clearing and settlement by an acquirer for each said merchant through a transaction handler in communication with both the issuer of the account and the acquirer for the merchant. The issuer sends a corresponding authorization response for the transaction to the merchant through the transaction handler and the acquirer in response to an authorization request sent to the issuer from the merchant through the transaction handler and the acquirer.

Prior to repeating the processing step for each of a plurality of the transactions, replacement changes to be default terms, conditions, and values can be received, on behalf of one or more of the merchants. By way of examples, there can be received changes for a merchant that can replace at least one these: (i) the default affinity entity corresponding to the geographic address for the merchant; (ii) the default maximum travel time to the geographic address for the merchant; (iii) and/or the default business rule obligating the merchant to make a donation to the affinity entity. Also, there can be received for one or more account holders' changes to the default affinity entity for the donation that is to be made by the merchant for each said transaction with said account holder, which default affinity entity that is replaced may have originally corresponded to, or be proximal of, the geographic address for the merchant.

After each transaction, in various alternative implementations, a message containing a question can be transmitted to a logical address of the account holder for the transaction. The message will contain one or more survey questions posed to the account holder or its agent. After receiving, in response to the survey, an answer, and as an incentive to the account holder to answer the survey, an increment is made in one or more databases to a loyalty currency attributed to the account holder. As acknowledgement that the incentive was awarded, a message can be transmitted to the logical address of the account holder that contains an acknowledgement of the increment to the loyalty currency. If the answer is received within a predetermined tolerance (e.g., quickly), the increment to the loyalty currency attributed to the account holder will be greater than the increment if the time lapse is not within the predetermined tolerance, which greater increment can be in the message that is transmitted to the logical address of the account holder.

Optionally, the survey answers by an account holder or its agent who transacted with a merchant can be sent, by batch or in real time, to a logical address of the merchant or its agent. As a still further option, a publication of a hyperlink can be made, or a facilitation of the network access can be made, to survey answers for the merchants and their account holders of all of a subset of the transactions. Third party requests can be received and responses thereto sent, by way of a user interface that provided third parties with a search engine to query and review survey answers for a particular merchant.

Incenting Community Resident In-Store Purchases Implementations

As disclosed in U.S. patent application Ser. No. 14/408, 199, filed on Dec. 15, 2014, titled Systems and method for incenting consumers, which is hereby incorporated by reference, in one computerized implementation, the Blockchain Implementations as depicted in FIGS. 3-7 can be operated in conjunction with a yet further implementation in which an open loop cashless payment system incents a consumer account holder to transact in a physical store with a merchant who agrees to make an auditable donation to a charity when the transaction is conducted on an account issued to the consumer account holder. The consumer account holder may direct the donation to a specific charity within a predetermined geographically determined community where the transaction was physically conducted. The consumer account holder can register an obligation to make a donation matching that of the merchant, where the consumer account holder's donation is initially paid by the consumer account's issuer for reimbursement by the consumer account holder to the issuer after the consumer account holder receives their account statement. The merchant's acquirer, the issuer, and a transaction handler for the issuer and acquirer may also make donations as directed by the consumer account holder. Various donor and consumer account holder directed business rules may limit the total currency amount of donations over specific calendar periods.

In a first aspect, implementations provide a method for incenting consumers to conduct in-store transactions with merchants, wherein the method is implemented using a processor and a memory coupled to the processor and configured to store instructions executable by the processor to perform the method comprising: receiving, at the processor, authorization data for a transaction on an account of a consumer account holder, wherein the account is issued by an issuer, wherein the transaction is acquired for clearing and settlement by an acquirer for a merchant account holder through a transaction handler in communication with both the issuer and the acquirer, wherein the authorization data is derived from at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determining, using the authorization data and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

In accordance other implementations, the authorization data may indicate whether a portable electronic storage device storing an identifier for the account was physically present with the merchant account holder.

In accordance with still other implementations, the authorization data may indicate whether the identifier for the account was electronically read from the portable electronic storage device by a reader co-located with the merchant account holder.

In accordance other implementations, the reader is selected from the group consisting of a magnetic stripe reader, a contact chip reader, a Near Field Communication (NFC) reader, a contactless payment card reader, and a wireless communication reader.

In accordance with other implementations, the authorization data indicates whether the transaction is not a Card Not Present (CNP) transaction.

In accordance with embodiments described herein, the authorization data indicates whether a card verification value was used for the transaction.

In accordance with embodiments described herein, the authorization data indicates whether signature identification was used for cardholder identification data.

In accordance with other implementations, the authorization data indicates whether a Personal Identification Number (PIN) was entered for the transaction.

In accordance with embodiments described herein, the authorization data indicates whether address verification information for the account holder was received by the merchant account holder.

In accordance with other implementations, the method may further comprise: receiving transaction data comprising a date and a time of the transaction, and an identifier for the merchant account holder, wherein the transaction data is derived from the authorization response; determining whether the date and time is within a predetermined time period; upon determining that the date and time is within a predetermined time period, determining, using the identifier for the merchant account holder and the processor, a geographic location for the merchant account holder, wherein the geographic location is within a predetermined geographical community; and selecting the charity from a plurality of potential charities, wherein the charity services the predetermined geographical community.

In accordance with other implementations, the geographic location for the merchant is determined using a logical address for the merchant.

In accordance with other implementations, the donation amount is transmitted to the logical address for the merchant.

In accordance with other implementations, the predetermined time period corresponds to an offer provided by the merchant account holder to the consumer account holder.

In accordance with other implementations, the method may further comprise: receiving an identifier for the consumer account holder, wherein the identifier is derived from the authorization request; determining, using the identifier for the consumer account holder and the processor, a geographic location for the consumer account holder, wherein the geographic location is within a predetermined geographical community; and selecting the charity from a plurality of potential charities, wherein the charity services the predetermined geographical community.

In accordance with other implementations, the method may further comprise: receiving a currency amount for the transaction; determining, using the identifier for the merchant account holder and the processor, whether there are additional transactions for the merchant account holder during the predetermined time period; receiving an additional currency amount for the additional transactions; and deriving a total currency amount as the sum of the currency amount for the transaction and the additional currency amount for the additional transactions, wherein the donation amount determined using the total currency amount.

In accordance with other implementations, the method may further comprise determining a difference between the donation amount and the total currency amount and transmitting the difference to the merchant account holder.

In accordance with other implementations, the method may further comprise: receiving a donation receipt within a predetermined audit time period relating to the predetermined time period, wherein the donation receipt includes the identifier for the merchant account holder, an identifier for the charity, and the donation amount.

In another aspect, other implementations may provide a non-transitory computer-readable medium storing one or more sequences of instructions which, when executed by one or more processors, causes the one or more processors to perform methods described herein.

In a further aspect, other implementations may provide a system for incenting consumers to conduct in-store transactions with merchants: an issuer for issuing an account to a consumer account holder; an acquirer for a merchant account holder, wherein the acquirer performs clearing and settlement through a transaction handler in communication with both the issuer and the acquirer; and a donation services server comprising a processor and a memory coupled to the processor and configured to store instructions executable by the processor to configure the donation services server to: receive authorization data for a transaction on the account, wherein the authorization data comprises at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determine, using the authorization data, a probability that the consumer account holder or agent thereof was physically present with the merchant account holder when conducting the transaction; and transmit a donation amount to a charity when the determined probability exceeds a predetermined threshold, wherein the donation amount is determined using the transaction, the consumer account holder, and the merchant account holder.

In further aspect, other implementations may provide a method for incenting consumers to conduct in-store transactions with merchants, wherein the method is implemented using a processor and a memory coupled to the processor and configured to store instructions executable by the processor to perform the method comprising: receiving, at the processor, authorization data for a transaction on an account of a consumer account holder, wherein the account is issued by an issuer, wherein the transaction is acquired for clearing and settlement by an acquirer for a merchant account holder through a transaction handler in communication with both the issuer and the acquirer, wherein the authorization data is derived from at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determining, using the authorization data and the processor, whether the consumer account holder or agent thereof was physically present with the merchant account holder when conducting the transaction; and upon determining that the consumer account holder was physically present with the merchant account holder when conducting the transaction, transmitting a donation amount to a charity, wherein the donation amount is determined using the transaction, the consumer account holder, and the merchant account holder.

In accordance with other implementations, the authorization data may comprise one or more members of the group consisting of: data indicating whether a portable electronic storage device storing an identifier for the account was physically present with the merchant account holder, data indicating whether an identifier for the account was electronically read from a portable electronic storage device by a reader co-located with the merchant, data indicating whether the transaction is not a Card Not Present (CNP) transaction, data indicating whether a card verification value was present, data indicating whether signature identification was used for cardholder identification data, data indicating whether a Personal Identification Number (PIN) was entered, and data indicating whether address verification information for the account holder was received.

In accordance with other implementations, the method may further comprise: receiving an identifier for the merchant account holder, wherein the identifier is derived from the authorization response; determining, using the identifier for the merchant account holder, a geographic location, wherein the geographic location is within a predetermined geographical community; and selecting the charity from a plurality of potential charities, wherein the charity services the predetermined geographical community.

In accordance with other implementations, the method may further comprise: receiving an identifier for the consumer account holder, wherein the identifier is derived from the authorization request; determining, using the identifier for the consumer account holder, a geographic location, wherein the geographic location is within a predetermined geographical community; and selecting the charity from a plurality of potential charities, wherein the charity services the predetermined geographical community.

In a further aspect other implementations, a method can be provided for incenting consumers to conduct in-store transactions with merchants, wherein the method is implemented using a processor and a memory coupled to the processor and configured to store instructions executable by the processor to perform the method comprising: receiving, at the processor, a status that an authorization for a transaction on an account of a consumer account holder is taking place, wherein the account is issued by an issuer, wherein the transaction is acquired for clearing and settlement by an acquirer for a merchant account holder through a transaction handler in communication with both the issuer and the acquirer; receiving, at the processor, a signal geolocating a mobile device identified to the consumer account holder; determining, using the status, the signal, and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

Other implementations may provide a method for incenting consumers to conduct in-store transactions with merchants, wherein the method is implemented using a processor and a memory coupled to the processor and configured to store instructions executable by the processor to perform the method comprising: receiving, at the processor, interchange data for setting an interchange rate for transaction on an account of a consumer account holder, wherein the account is issued by an issuer, wherein the transaction is acquired for clearing and settlement by an acquirer for a merchant account holder through a transaction handler in communication with both the issuer and the acquirer; determining, using the interchange data and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

In other implementations, the method may further comprise determining whether the transaction is an in-store debit transaction or an in-store credit transaction using the interchange data and the processor, and wherein the donation amount is determined based on whether the transaction is the in-store debit transaction or the in-store credit transaction.

In another aspect of other implementations, there is provided a computer-implemented method where, for each transaction between a consumer account holder and a merchant, information may be received that is derived from an authorization request and/or an authorization response for the transaction, where the information may include the date and the time, a currency amount, and an identifier for the merchant. For each transaction, there may be received information derived from authorization data indicative that the account holder or agent thereof was physically present with the merchant. A determination may be made using the received information, whether the portable electronic storage device storing an identifier for the account was physically present with the merchant. For each transaction for which the determination is affirmative, and for each transaction for which the date and time of the corresponding authorization response are within a predetermined time period, and for each identifier for the merchant, there may be a deriving of the sum of the currency amounts by using the identifier for the merchant to access a database to retrieve: (i) the logical address for the merchant corresponding to the identifier for the merchant and (ii) a business rule for making a donation corresponding to an identifier for a charity having a logical address, wherein in the donation may be a function, at least in part, of the sum of the currency amounts. There may also be a deriving, using the business rule and the sum of the currency amounts, of the donation. A transmission may be made to the logical address for the merchant that includes the donation to the charity for the predetermined time period. Within a predetermined audit time period for and after the predetermined time period, a plurality of donation receipts are received, each including (i) the respective identifiers for the charity and the merchant and (ii) a currency amount. For each identifier for the merchant, the sum of the currency amounts of the donation receipts for each said identifier for the charity may be derived.

After the predetermined audit time period for the predetermined time, for each identifier for the merchant, and for each identifier corresponding to each charity to whom a donation was to be made as per the retrieved business rule, a determination may be made of a difference between: (i) the donation for the predetermined time period that was transmitted to the logical address of the merchant, and (ii) the sum of the currency amounts of the donation receipts received for the charity for the predetermined time period. Then, the determined difference is transmitted to the logical address for the merchant.

In various implementations, an account issued by an issuer to a consumer account holder can be a revolving credit account, a debit account, a checking account, a charge account, an Automatic Teller Machine (AMT) account, a stored value account, a prepaid account, a gift account, etc. In various implementations, deposits to and withdrawals from each said account may be any and all forms of currency, including cash, crypto-currency (e.g., 'bitcoin'), frequent flyer miles, cellular telephone usage units (e.g., air time, data transmission units), loyalty program points, etc. An identifier for the account may be digitally stored as electronically readable medium in storage associated with a credit card, a debit card, a gift card, a stored value card, a physical token having thereon an information bearing magnetic stripe, a physical token having therein a digital information storage device in electrical communication with an electrical conductor to communicate information stored therein, a physical token having therein a digital information storage device in electrical communication with an antennae to communicate information stored therein via a wireless communication technology, a cellular telephone, a smart phone, a web enabled portable electronic device having a wireless communication technology by which to communicate information stored therein, or a combination of the foregoing.

In other implementations, the charities to which the merchant donates can be limited to those within the merchant's or consumer's geographic community. In still further implementations, the consumer account holders can designate those charities to which the merchant is to make a donation. In yet other embodiments, an acquirer for the transaction between the merchant and the consumer account holder may make the donation on the merchant's behalf incident to clearing and settling the transaction with the issuer that issued the account to the consumer account holder.

In still further implementations, in an open loop cashless payment system for making charitable donations, the merchant funds and makes direct payment of all donations to the consumer's designated charities according to a merchant designated business rule, wherein, in a variation thereof, the merchant funds and makes direct payment of all donations to consumer's designated charities in the merchant geographically defined community.

In yet further aspects of embodiments described herein, in an open loop cashless payment system for making charitable donations, the merchant funds and the merchant's acquirer makes direct payment, incident to a process of closing and settlement, of all donations to all account holder designated charities for those transaction conducted by the account holder with the merchant on an account issued to the account holder by an issuer.

In still further implementations, in an open loop cashless payment system for making charitable donations, the merchant funds and the merchant's acquirer makes direct payment, incident to a process of closing and settlement, of all donations to all consumer account holders designated charities for those transaction conducted by the account holder with the merchant on a consumer account issued to the account holder by an issuer, wherein, in a variation thereof, the donations are made to those charities having a physical location within the merchant geographically defined community.

In yet further implementations, in an open loop cashless payment system for making charitable donations, the merchant funds and makes direct payment of all donations to all consumer account holder designated charities for those transactions conducted by the consumer account holder with the merchant on an account issued to the consumer account holder by an issuer.

In still further implementations, in an open loop cashless payment system for making charitable donations, the merchant funds and makes direct payment of all donations to all consumer account holder designated charities for those transactions conducted by the consumer account holder with the merchant on an account issued to the consumer account holder by an issuer, wherein, in a variation thereof, the donations are made to those charities having a physical location within the merchant geographically defined community.

In still further implementations, an open loop cashless payment system for making charitable donations, both the merchant and its acquirer fund donations to charities, incident to a process of closing and settlement, of all donations to all consumer account holder designated charities for those transaction conducted by the consumer account holder with the merchant on an account issued to the consumer account holder by an issuer, wherein, in a variation thereof, the donations are made to those charities having a physical location within the merchant geographically defined community, and wherein, in a still further variation thereof, a downward adjustment is made to an exchange fee assessed to the merchant by the merchant's acquirer such that the merchant is able to pay a lower exchange fee to compensate for the merchant's charitable contribution to the different consumer account holder designated charities, and the acquirer for the transaction also pays the same local charities a donation from the likely increased transaction volume.

In yet further implementations, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches the merchant's contribution to the charity by the account holder's issuer making direct payment to that charity incident to a process of closing and settlement such that the charge for the account holder's charitable donation is rendered as a statement debit on the account holder's periodic revolving credit account statement.

Cash Payments Implementations

As disclosed in U.S. patent application Ser. No. 14/646,235, filed on May 20, 2015, titled Systems, methods and devices for non-acquired account payment affinity donation, which is hereby incorporated by reference, in one computerized implementation, the Blockchain Implementations as depicted in FIGS. 3-7, can be operated in conjunction with a yet further implementation in which the transactions are not acquired transactions. Rather, a cash payment system incents a customer 326 to transact at a merchant's 326 brick and mortar store in the customer's local community by the merchant's agreement to make an auditable donation to a charity 318 serving the local community, where the charity is selected by the customer 326. Note here that, unlike other implementations, neither an issuer bank 326, nor an acquirer bank, nor a payment network 322 are involved. Rather, various merchant business rules limit the merchant's donations over specific calendar periods, which donations can be made directly by the merchant 326 to the charity 318, or indirectly to the charity by way of a blind donation made by the merchant to a donation disbursement agency acting on the merchant's behalf to satisfy the merchant's commitment to donate.

Implementations of the foregoing relate to a computer-implemented systems and methods where, for each transaction there is received a transaction time stamp and respective merchant 326, account holder 326, and offer identifiers, as well as indicia that payment for the transaction paid for on an non-acquired account (e.g., paper currency, coins, check, etc.). In accordance with some embodiments, for each transaction, systems and methods may also receive indicia that the transaction occurred within the merchant's 326 physical store (instead of an e-commerce transaction).

In accordance with some implementation, computer-implemented systems and methods may use the respective merchant and account holder identifiers, to retrieve the respective merchant and account holder geographic locations. For each transaction, a determination is made, using the respective merchant and account holder geographic locations, whether the merchant and the account holder have a geographical location in common. A determination is also made as to whether the transaction is being conducted within a predetermined time period by use of the transaction time stamp and the offer identifier.

For each transaction for which the transaction is conducted within the predetermined time period and the merchant 326 and the account holder 326 have a geographical location in common, the merchant identifier is used to retrieve a merchant donation business rule for the merchant to make a donation to an affinity entity 318, where the affinity entity 318 has a geographical location in common with that of the respective merchant 326 and account holder 326 geographic locations and an affinity entity identifier. A donation to be made by the merchant 326 to the affinity entity 318 for the predetermined time period is derived using the merchant donation business rule, and a message containing the donation is sent to one or more of the merchant 326, account holder 326 and the affinity entity 318.

In accordance with some implementations, within a predetermined audit time period for the predetermined time period, donation receipts are received that each include a currency amount the respective merchant and affinity entity identifiers. For each identifier for the merchant, the sum of the currency amounts of the donation receipts for each affinity entity identifier is calculated to determine whether the merchant has satisfied its commitment to make all donations to all affinity entities.

Variations on the foregoing implementations may include allowing the customer to specify one or more affinity entities in their local community to which donations may be made by merchants with whom the customer conducts cash transaction. In such implementations, each merchant may be given notice of its total periodic donations. Such notice, however, may be given without providing the merchant with any notice or knowledge as to the specific identity of those affinity entities that are to be its recipients. Such implementations leave direction of merchant's donations fully within the discretion of the merchant's customers, limited only by the restriction that the customer can only select affinity entities from among those that serve the local community in common to both the merchant and the customer, while leaving the actual amount of the merchant's donation fully within the discretion of the merchant.

Still further variations on the foregoing implementations may include deriving a donation to be made by the merchant to the affinity entity for the predetermined time period by using the merchant donation business rule as well as donation rules previously specified by the account holder who conducts the cash transaction with the merchant. By way of example, and not by way of limitation, the merchant's donation business rule might choose the amount of the donation whereas the account holder's rule might choose the affinity entity in the community to which the merchant's donation is to be directed.

In yet further computer-implemented methods and computer-system implemented methods of the foregoing, a business process is applicable, without an issuer 326 or acquirer 326, to a registered member 326 who pays with cash and resides in a community or neighborhood where a registered merchant's 326 store is also located. The member receives the merchant's offer bearing an identifier which the member shows to the merchant when paying for a transaction in cash, cheque or other non-acquired account. The merchant's Point of Sale Terminal (POS) may execute software to acquire indicia identifying the member's cash payment and the identifier for the offer, which may include an identifier for the member. The POS may transmit a time stamp for the transaction with the offer identifier and the cash payment amount, for example. Upon receipt by a server in communication with a network with which the POS is also in communication, a verification may be made as to non-expiration of the merchant's offer, optionally, 'lift and shift' day-of-week and time-of-day terms of the merchant e-offer by comparison to the time stamp of the transaction; and identifiers for the of both merchant and member. Upon verification, the server electronically transmits a real time acknowledgement to the respective logical addresses of member and merchant; and the server commits the merchant to make a donation to an affinity entity providing charitable goods and/or service to the community where the registered member resides and the registered merchant's store is located. The server receives subsequent transmission from the affinity entity as to merchant donations received from which the server can ascertain the absence of noncompliance by the registered merchant as to required affinity entity donations.

Client Acquisition System Implementations

As disclosed in U.S. patent application Ser. No. 11/760,516, filed on Jun. 8, 2007, titled Method, system and computer program for client acquisition, now U.S. Pat. No. 7,857,210, which is hereby incorporated by reference, in one computerized implementation, the Blockchain Implementations as depicted in FIGS. 3-7, can be operated in conjunction with a yet further implementation in which there are provided method, system and computer program for enabling a loyalty program to be linked to one or more card issuers, and thereby their cardholders. A loyalty system is provided that is operable to enable the creation, implementation and management of one or more loyalty programs that provide benefits to members of the loyalty programs in connection with transactions between the members and one or more merchants associated with the loyalty system. The method includes registering on the loyalty system one or more card issuers; the operator of the loyalty system, the one or more card issuers, and the merchants establishing the rules for accrual and processing of benefits from the merchants to cardholders associated with the one or more card issuers in connection with transactions between the cardholders and the merchants with the loyalty system; registering on the loyalty system one or more merchant acquirers associated with the one or more card issuers; registering a plurality of the cardholders as members of the loyalty program; and applying the rules to accrue and process the benefits of cardholders in connection with the transactions between the cardholders and the merchants, by operation of the loyalty system. Implementations provide a method for increasing transactions within a loyalty system, as well as a method for card issuers and merchants to share the risk and costs associated with directing loyalty programs to cardholders. The method also involves connecting the loyalty system to systems associated with the card issuers and one or more associated merchant acquirers. On this basis, the method enables merchants to direct the loyalty programs or aspects thereof to specific cardholders based on BIN ranges, and based on geographic and/or time based parameters. System and computer programs for implementing the method are also provided.

In this implementation, a method is provided for enabling a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system, the method comprising the steps of: (a) Registering on the loyalty system one or more card issuers; (b) The operator of the loyalty system, the one or more card issuers, and the merchants establishing the rules for accrual and processing of benefits from the merchants to cardholders associated with the one or more card issuers in connection with transactions between the cardholders and the merchants with the loyalty system; (c) Registering on the loyalty system one or more merchant acquirers associated with the one or more card issuers; (d) Registering a plurality of the cardholders as members of the loyalty program; (e) Applying the rules to accrue and process the benefits of cardholders in connection with the transactions between the cardholders and the merchants, by operation of the loyalty system.

Other Client Acquisition System Implementations

As disclosed in U.S. patent application Ser. No. 12/663,533, filed on Jun. 8, 2008, titled Method, system and computer program for client acquisition and surveying, now U.S. Pat. No. 8,577,722, which is hereby incorporated by reference, in one computerized implementation, the Blockchain Implementations as depicted in FIGS. 3-7, can be operated in conjunction with a yet further implementation in which there are provided method, system and computer program for enabling a loyalty program to be linked to one or more card issuers, and thereby their cardholders. A loyalty system is provided that is operable to enable the creation, implementation and management of one or more loyalty programs that provide benefits to members of the loyalty programs in connection with transactions between the members and one or more merchants associated with the loyalty system. The method includes registering on the loyalty system one or more card issuers; the operator of the loyalty system, the one or more card issuers, and the merchants establishing the rules for accrual and processing of benefits from the merchants to cardholders associated with the one or more card issuers in connection with transactions between the cardholders and the merchants with the loyalty system; registering on the loyalty system one or more merchant acquirers associated with the one or more card issuers; registering a plurality of the cardholders as members of the loyalty program; and applying the rules to accrue and process the benefits of cardholders in connection with the transactions between the cardholders and the merchants, by operation of the loyalty system. Implementations provide a method for increasing transactions within a loyalty system, as well as a method for card issuers and merchants to share the risk and costs associated with directing loyalty programs to cardholders. The method also involves connecting the loyalty system to systems associated with the card issuers and one or more associated merchant acquirers. On this basis, the method enables merchants to direct the loyalty programs or aspects thereof to specific cardholders based on BIN ranges, and based on geographic and/or time based parameters. System and computer programs for implementing the method are also provided.

In this implementation, a method enables a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system, the method comprising the steps of: (a) Registering on the loyalty system one or more card issuers; (b) The operator of the loyalty system, the one or more card issuers, and the merchants establishing the rules for accrual and processing of benefits from the merchants to cardholders associated with the one or more card issuers in connection with transactions between the cardholders and the merchants with the loyalty system; (c) Registering on the loyalty system one or more merchant acquirers associated with the one or more card issuers; (d) Registering a plurality of the cardholders as members of the loyalty program; (e) Applying the rules to accrue and process the benefits of cardholders in connection with the transactions between the cardholders and the merchants, by operation of the loyalty system.

Still Other Client Acquisition System Implementations

As disclosed in U.S. patent application Ser. No. 14/071,062, filed on Nov. 4, 2013, titled Method, system and computer program for client acquisition and surveying, which is hereby incorporated by reference, in one computerized implementation, the Blockchain Implementations as depicted in FIGS. 3-7, can be operated in conjunction with a yet further implementation in which there are provided a method, system and computer program for enabling a loyalty system to be linked to one or more card issuers, cardholders, merchants, and thereby their cardholders. A system operable to create, implement and manage one or more loyalty programs that provide benefits to members of the loyalty programs in connection with transactions between the members and one or more merchants associated with the loyalty system. The method includes registering on the loyalty system one or more card issuers; one or more merchant acquirers associated with the one or more card issuers; a plurality of cardholders as members of the loyalty program. Establishing and applying rules for accrual and processing of benefits from the merchants to cardholders associated with the one or more card issuers in connection with transactions between the cardholders and the merchants with the loyalty system. Defining a rule based survey utility operable to issue surveys to members of the loyalty system on a transaction and non-transaction basis.

An aspect of this implementation is a method for enabling a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system. The method comprises the steps of: registering on the loyalty system one or more card issuers; registering on the loyalty system one or more merchant acquirers associated with the one or more care issuers; registering a plurality of the cardholders as members of the loyalty program; the operator of the loyalty system, the one or more card issuers, and the merchants establishing the rules for accrual and processing of benefits from the merchants to cardholders associated with the one or more card issuers in connection with transaction between the cardholders and the merchants with the loyalty system; applying the rules to accrue and process the benefits of cardholders in connection with the transactions between the cardholders and the merchants, by operation of the loyalty system; and defining a survey utility function capable to issue surveys to members of the loyalty system.

A further aspect of this implementation involves a method enabling a loyalty program to provide a survey utility function that allows participating groups, including merchants, sponsors/manufacturers and financial institutions to prepare questions that may be posed to a member wherein the questions are compiled into a survey and the survey utility function further comprising: maintaining a database of members' answers to the survey questions for future retrieval wherein the answers are recorded in association with the member who gave the answer; and compiling reports for the merchants, sponsors/manufacturers and financial institutions based on their particular survey questions and the survey responses received by the members.

Charity Implementations

As disclosed in U.S. patent application Ser. No. 11/746,502, filed on May 9, 2007, titled Method, system and computer program for providing a loyalty engine for dynamic administration of charity donations, which is hereby incorporated by reference, in one computerized implementation, the Blockchain Implementations as depicted in FIGS. 3-7, can be operated in conjunction with a yet further implementation in which there are provided method, system and computer program for providing a loyalty engine enabling dynamic administration of charity donations. The method includes a merchant creating by operation of the loyalty engine a customized loyalty program defined by a plurality of rules for administering their loyalty program; the operator of the loyalty engine registers one or more charities on the loyalty engine; the merchant also defines on the loyalty engine the rules under which, as part of their loyalty program, they will make a donation to the one or more charities in connection with one or more transactions with a member that is associated to the loyalty program; the member optionally selects, as part of their participation in the loyalty program, the one or more charities to whom the merchant shall make a donation based on transactions between the member and merchant, and further based on the applicable rules defined by the merchant. The loyalty engine tracks applicable transactions, applies the donation rules, accrues the applicable donations. The loyalty engine can also be provided with a transaction utility that is operable to process donation payments between the merchants and the charities. A system is also provided that consists of the loyalty engine, including a charity utility that provides the functions of the method, linked to a server computer that is connected to the Internet. The computer program is a web application that enables the members, charities, and merchants to access various functions via a browser. A reporting facility is also described that allows merchants, charities and members to track their donation activity in connection with the operation of the loyalty engine.

In this implementation, a method, system and computer program is provided that enables a loyalty program to be linked to charitable donations, involving a loyalty program platform or loyalty engine or loyalty system. The loyalty program platform provides to a plurality of merchants tools to customize one or more loyalty programs made available to members of the loyalty program platform (customer and potential customers of the merchants). The operator of the loyalty program platform establishes relationships with one or more charities, such relationships determining certain rules under which the plurality of merchants may make donations to the one or more charities based on the activities of members in connection with the loyalty programs. By operation of the loyalty engine, the operator and each participating merchant establish rules for each participating merchant to make donations to the one or more charities, in conformity with the rules established between the operator and the one or more charities. The loyalty program platform operator in provides members the option of selecting one or more charities from a list of charities provided by the loyalty program platform. The loyalty system applies the aforementioned rules as they apply to each participating member so as to process donations based on their applicable transactions within the loyalty system. The loyalty program platform enables each of the merchants, members and charities to track the donation activity.

In one particular aspect of this implementation, there are provided a method, system and computer program for enabling a loyalty program linked to charitable donations, in which charitable donations are increased overall by enabling participating merchants to adjust the parameters of their charitable donations to their business objectives at the time by permitting the merchants to dynamically modify the rules of the loyalty program as they relate to charitable donations. More specifically, the method, system and computer program in accordance with this aspect enables merchants to customize their loyalty program dynamically, including as it relates to charitable donations, based on effectiveness and incremental cost. This generally results in enhanced donation levels to the participating charities.

In another aspect of this implementation, the method, system and computer program for providing a loyalty program linked to charitable donations provides transparency by enabling the tracking of donations made to the one or more charities of the consumer's choice, thereby encouraging charity and member participation.

In yet another aspect of this implementation, a method, system and computer program for providing a loyalty program linked to charitable donations is provided that permits a merchant to associate with a plurality of charities (including charities with similar purposes), and charities to associate loosely with a plurality of merchants, where the members, by selecting one or more charities and then by engaging in consumer behavior in connection with a loyalty program associated with a plurality of merchants, ultimately determine the donations flowing from the merchants to the charity.

In a still other aspect of this implementation, a method, system and computer program for providing a loyalty program linked to charitable donations is provided that is based on the method, system and computer program described in the Co-Pending Patent Application. Specifically, registration of members to the loyalty program platform involves members providing financial card data for one or more financial cards of each of the one or more participants, and financial data is collected corresponding to transactions between the members and merchants, said financial data being provided to a loyalty engine that is part of the loyalty program platform. The loyalty engine includes a charity utility that is operable to administer a charity account for each member who has selected one or more participating charities to receive donations from merchants. The charity utility is thereby operable to track transactions between members and merchants and credit the charity account with an applicable charitable donation credit, to the name of the applicable charity or charities. The operator of the loyalty program platform, or its agent, on a periodic basis processes donations from the applicable merchants to the applicable charities based on the information in the charity account.

In another method for providing a loyalty program linked to charitable donations for this implementation, there are included the steps of: each of a plurality of merchants creating a customized loyalty program defined by a plurality of rules for administering their loyalty program; a) linking one or more charities with the loyalty programs; b) the plurality of merchants defining the rules under which, as part of their loyalty program, they will make a donation to one or more charities in connection with one or more transactions with a member that is associated to the loyalty program (donation rules); c) the member optionally selecting one or more charities presented to the member that, as part of their participation in the loyalty program, the plurality of merchants shall make a donation to the selected charities in connection with transactions between the member and the plurality of merchants; and i) tracking the transactions subject to the member's selection, applying the donation rules, and ii) making the applicable donations available to the one or more charities.

In yet another implementation, a system provides a loyalty program that is presented by a plurality of merchants to a plurality of members registered with the loyalty program, the loyalty program being linked to charitable donations, the system including: a) a server computer connected to the Internet; and b) a web application linked to the server, the web application defining a loyalty engine that enables a plurality of merchants to create and manage customized loyalty programs defined by a plurality of rules defined by the loyalty engine for administering their loyalty programs; c) the loyalty engine including a charity utility, the charity utility being operable to enable the operator of the loyalty engine to register one or more charities thereon, the charity utility enabling the plurality of merchants to optionally define the rules under which, as part of their loyalty program, they will make a donation to one or more charities in connection with one or more transactions with a member that is associated with the loyalty program (donation rules); and d) based on a member optionally selecting one or more of the charities, the charity utility being further operable, based on such selection and the donation rules to: i) track transactions between the merchants and the member subject to member's selection for donations; ii) apply the donation rules; and iii) accrue donations to be made by the plurality of merchants to the applicable charities based on one or more transactions between the plurality of merchants and the member.

In another aspect of this implementation, a computer program comprises computer instructions which when loaded on a server computer connected to the Internet are operable to include: a) A web application defining a loyalty engine that enables a plurality of merchants to create and manage customized loyalty programs defined by a plurality of rules defined by the loyalty engine for administering their loyalty programs; b) the loyalty engine including a charity utility, the charity utility being operable to enable the operator of the loyalty engine to register one or more charities thereon, the charity utility enabling the plurality of merchants to optionally define the rules under which, as part of their loyalty program, they will make a donation to the one or more charities in connection with one or more transactions with a member that is associated with the loyalty program (donation rules); c) based on a member optionally selecting one or more of the charities, the charity utility being further operable, based on such selection and the donation rules to: i) track transactions between the merchants and the member subject to member's selection for donations; ii) apply the donation rules; and iii) accrue donations to be made by the plurality of merchants to the applicable charities based on one or more transactions between the plurality of merchants and the member.

Automated Cause Marketing Implementations

As disclosed in U.S. patent application Ser. No. 12/118,923, filed on May 12, 2008, titled Method, system, and computer program for providing a loyalty engine for automated cause management, which is hereby incorporated by reference, in one computerized implementation, the Blockchain Implementations as depicted in FIGS. 3-7, can be operated in conjunction with a yet further implementation in which there are provided method, system and computer program for providing a loyalty engine for automated cause marketing. The method includes a charity linking merchants and sponsors to the loyalty system. Members register with the loyalty engine through the loyalty system which is accessible via the Internet. Once the merchants and the sponsors are linked and the members are registered, by operation of the loyalty engine, the merchants can create a customized loyalty program defined by a plurality of merchant defined rules for administering their loyalty program. The merchant defined rules instruct the loyalty engine as to the level of donations in connection with one or more transactions by a member that is associated to the loyalty program. The loyalty system includes a reporting facility to allow the merchant to track transactions with members in a number of ways. A system is also provided that consists of a server computer including the loyalty engine and the charity utility. The charity utility provides the functions of the method and is linked to a server computer that is connected to the Internet. The computer program is a web application that enables the members, sponsors, merchants, and the charity to access various functions via a web browser.

In this implementation, a method for provides a loyalty program for promoting charitable donations that comprises the steps of: (a) an administrator establishing and administering the loyalty program; (b) linking each of a plurality of member purchasers to the loyalty program; (c) linking each of a plurality of merchants to the loyalty program; (d) linking one or more charities to the loyalty program, each creating one or more customized loyalty programs, each said customized loyalty program defined by rules for administering the customized loyalty program, including the rules under which each of the plurality of merchants will make donations of money, goods or services to the one or more charities, based on one or more purchases made by members from the plurality of merchants; (e) the loyalty program accumulating the donations of money, goods or services; and (f) the loyalty program directing the donations to the one or more charities based on associated rules defined by the loyalty program.

In an alternative of this implementation, a system provides a loyalty program linked to charitable donations presented by a plurality of merchants, a plurality of members, and one or more charities registered with the loyalty program. Here, the system comprises: (a) a server computer connected to the Internet; and (b) a web application linked to the server, the web application defining a loyalty engine that enables a plurality of merchants, one or more charities, and a plurality of members to create and manage customized loyalty programs defined by a plurality of rules interpreted by the loyalty engine for administering at least one loyalty program; wherein the loyalty engine includes a charity utility operable to enable the one or more charities to link the one or more charities, a plurality of merchants, one or more sponsors, and a plurality of members with the loyalty program, each said member being linked to the one or more charities by registering a financial transaction identification means using the charity utility; wherein the loyalty engine includes a merchant utility enabling the plurality of merchants to optionally define the rules under which as part of their loyalty program, they will make donations to the one or more charities based on one or more purchases made by members from the plurality of merchants; wherein the charity utility enables the loyalty program to keep track of the accumulating donations to the one or more charities based on one or more purchases made by members from the plurality of merchants; wherein the loyalty program includes a member utility enabling the plurality of members to keep track of the purchases made at the plurality of merchants; and wherein the loyalty program includes a sponsor utility enabling the plurality of sponsors to keep track of the purchases made by some of the plurality of members.

Other Automated Cause Marketing Implementations

As disclosed in U.S. patent application Ser. No. 13/756,120, filed on Jan. 31, 2013, titled Automated cause management, which is hereby incorporated by reference, in one computerized implementation, the Blockchain Implementations as depicted in FIGS. 3-7, can be operated in conjunction with a yet further implementation in which there are provided method, system and computer program for providing a loyalty engine for automated cause marketing. The method can include a charity linking merchants and sponsors to the loyalty system. Once the merchants and the sponsors are linked and the members are registered, merchant defined rules can instruct a loyalty engine as to the level of donations in connection with one or more transactions by a member that is associated to the loyalty program. The loyalty system can include a reporting facility to allow the merchant to track transactions with members in a number of ways. A system is also provided that can consist of a server including the loyalty engine and the charity utility. The charity utility can provide the functions of the method and can be linked to the networked server.

In one implementation, a method provides for: receiving, for each of a plurality of charities, charity information from a logical address of the charity, wherein the charity information includes a geographic address of the charity; receiving, for each of a plurality of merchants, merchant information from a logical address of the merchant, wherein the merchant information includes a geographic address of the merchant and a donation formula; receiving, for each of a plurality of sponsors, sponsor information from a logical address of the sponsor; receiving, for each of a plurality of members, member information from a logical address of the member, wherein the member information includes stored value card information corresponding to one said sponsor and a currency amount; and for each said merchant: receiving from the logical address of the merchant: the merchant information of the merchant; and the member information from one said member pertaining to the stored value card information corresponding to one said sponsor; and a currency amount of a sale by the merchant to the one said member; updating the currency amount for the stored value card in the member information for the one said member using: the current value of the currency amount for the stored value card; and the currency amount of the sale by the merchant to the one said member; and if the geographic address of one said charity is within a predetermined distance from the geographic address of the merchant, updating a donation currency amount of the merchant for the one said charity using: the currency amount of the sale by the merchant to the one said member; the donation formula in the merchant information for the merchant; and the current value of the donation currency amount for the merchant for the one said charity.

Still Other Automated Cause Marketing Implementations

As disclosed in U.S. patent application Ser. No. 12/525,326, filed on Feb. 1, 2008, titled Method, system and computer program for providing a loyalty engine for automated cause marketing, which is hereby incorporated by reference, in one computerized implementation, the Blockchain Implementations as depicted in FIGS. 3-7, can be operated in conjunction with a yet further implementation in which there are provided method, system and computer program for providing a loyalty engine for automated cause marketing. The method includes a loyalty program system administrator linking merchants and charities to the loyalty system. Members register with the loyalty engine through loyalty system which is accessible via the Internet. Once the merchants and the charities are linked and the members are registered, by operation of the loyalty engine, the merchants can create a customized loyalty program defined by a plurality of merchant defined rules for administering their loyalty program. The merchant defined rules instruct the loyalty engine as to which charities should receive in-kind donations in connection with one or more transactions by a member that is associated to the loyalty program. Once a loyalty system defined time period or donation threshold has been achieved, the loyalty system releases the donation in-kind to the specific charity. A system is also provided that consists of a server computer including the loyalty engine and the charity utility. The charity utility provides the functions of the method and is linked to a server computer that is connected to the Internet. The computer program is a web application that enables the members, charities, and merchants to access various functions via a web browser.

In this implementation, there is provided, a method for providing a loyalty program linked to charitable in-kind donations, the method characterized by: (a) linking one or more charities with the loyalty program; (b) linking one or more member purchasers with the loyalty program; (c) each of a plurality of merchants linked to the loyalty program creating a customized loyalty program defined by a plurality of rules for administering their loyalty program, including the rules under which each of the plurality of merchants will make in-kind donations of goods or services to the one or more charities based on one or more purchases made by members from the plurality of merchants; and (d) the loyalty program accumulating the in-kind donation of goods or services and providing means to the one or more charities to distribute the in-kind donations to one or more beneficiaries.

In another aspect of this implementation, there is provided a system for providing a loyalty program linked to charitable in-kind donations presented by a plurality of merchants, a plurality of members, and a plurality of charities registered with the loyalty program is provided, characterized in that the system comprises: (a) a server computer connected to the Internet; and (b) a web application linked to the server, the web application defining a loyalty engine that enables a plurality of merchants, of charities, of members and a loyalty system administrator to create and manage customized loyalty programs defined by a plurality of rules interpreted by the loyalty engine for administering at least one loyalty program; wherein the loyalty engine includes a charity utility being operable to enable the loyalty system administrator to link one or more charities, a plurality of merchants and one or more members with the loyalty program; wherein the loyalty engine includes a charity utility enabling the plurality of merchants to optionally define the rules under which as part of their loyalty program, they will make in-kind donations to one or more charities based on one or more purchases made by members from the plurality of merchants; wherein a charity utility enables the loyalty program to keep track of the accumulating in-kind donations to one or more charities based on one or more purchases made by members from the plurality of merchants; and wherein the loyalty program includes a programmed stored value card for redemption of goods and services of in-kind donations.

In yet another aspect of this implementation, a computer program is provided, the computer program characterized by: computer instructions which when loaded on a server computer connected to the Internet are operable to provide a web application defining a loyalty engine that enables a plurality of merchants, charities, members and loyalty system administrator to create and manage customized loyalty programs defined by a plurality of rules interpreted by the loyalty engine for administering their loyalty programs; wherein the loyalty engine includes a charity utility being operable to enable the loyalty system administrator of the loyalty engine to register one or more charities, a plurality of merchants and one or more members associated with the loyalty program; wherein the charity utility enables the plurality of merchants to optionally define the rules under which, as part of their loyalty program, they shall make an in-kind donation to the one or more charities in connection with one or more purchases made by members from the plurality of merchants; and wherein based on a member optionally selecting one or more of the charities, the charity utility being further operable, based on such selection and the donation rules to: (a) track transactions between the merchants and the member; (b) apply the donation rules; and (c) accrue donations to be made by the plurality of merchants to the applicable charities based on one or more transactions between the plurality of merchants and the member.

Other Automated Merchant Boarding Implementations

As disclosed in U.S. patent application Ser. No. 13/168, 488, filed on Jun. 24, 2011, titled Program, system and method for linking community programs and merchants in a marketing program, now U.S. Pat. No. 9,105,050, which is hereby incorporated by reference, in one computerized implementation, the Blockchain Implementations as depicted in FIGS. 3-7, can be operated in conjunction with a yet further implementation in which there a provided a system, data access management utility and a method of generating links between local merchants and a marketing system such as is disclosed in PCT Patent Application No. PCT/CA2009/001605 which is hereby incorporated by reference. This implementation may be operable to register members, merchants, community programs, intermediaries and other entities with the marketing system. Implementations may be operable to quickly and efficiently register multiple members and/or multiple merchant store types virtually simultaneously to the marketing system. An automated registration and/or boarding process may be operated to undertake such registration and/or boarding of members, merchants, community programs, intermediaries and other entities with the marketing system, including automated boarding of merchants.

In this implementation, a marketing system is operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions occurring between the one or more merchants and the one or more members.

In another aspect of this implementation, a marketing program method comprises the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Next Generation Loyalty Implementations

As disclosed in U.S. patent application Ser. No. 13/508, 084, filed on Nov. 6, 2009, titled Method, system, and computer program for attracting local and regional businesses to an automated cause marketing environment, now U.S. Pat. No. 8,756,102, which is hereby incorporated by reference, in one computerized implementation, the Blockchain Implementations as depicted in FIGS. 3-7, can be operated in conjunction with a yet further implementation in which there are provided system, method and computer program for enabling local or regional merchants to participate in an automated cause marketing (ACM) program. The ACM program that may provide benefits to several parties involved in fundraising for one or more supported organizations, including one or more supported organizations, advertising providers, merchants, and individuals. Merchants are able to access enhanced analytics regarding their transactions with members and non-members of the ACM program and can use these registration-enhanced analytics to realize an increased number of or revenue from transactions with members. Implementations also teach a system and method for enabling advertising providers to acquire and analyze data associated with consumers-merchant transactions. Implementations provide the above advantages optimally using a mobile device. Furthermore, implementations may enable a member to disseminate its charitable preferences to members of its electronic social networks.

This implementation provides a computer network implementable method for providing a loyalty program for promoting contributions to one or more supported organizations, the method characterized by: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling, or facilitating the enabling, by one or more computer processors, each of the one or more local or regional merchants to access analytic information relating to the plurality of transactions and to increase the number of or revenue from future transactions based on the analytic information.

This implementation also provides a system for providing a loyalty program for promoting contributions to supported organizations, the system characterized by: (a) a web server; (b) a loyalty engine linked to the web server, the loyalty engine established by an administrator; (c) one or more point of sale facilities for accepting payment, each linked to one or more merchants that are linked to the loyalty program; (d) a means for associating a plurality of transactions occurring at the one or more point of sale facilities with the loyalty engine; (e) a database enabling the recording of information for each of the plurality of transactions, the loyalty engine defining rules for making contributions to the one or more supported organizations based on the transactions and directing contributions to the one or more supported organizations based on the rules; and (f) an interface for enabling each of the one or more merchants to access analytic information relating to the plurality of transactions.

This implementation further provides a computer program comprising computer instructions which when loaded on a server computer connected to the Internet are operable to provide a web application defining a loyalty engine for promoting contributions to supported organizations, characterized in that the loyalty engine is operable to define a loyalty program by performing the steps of: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling each of the one or more local or regional merchants to access analytic information relating to the plurality of transactions and to increase the number of or revenue from future transactions based on the analytic information.

Other Next Generation Loyalty Implementations

As disclosed in U.S. patent application Ser. No. 14/283,632, filed on May 21, 2014, titled Method, system, and computer program for attracting local and regional businesses to an automated cause marketing environment, which is hereby incorporated by reference, in one computerized implementation, the Blockchain Implementations as depicted in FIGS. 3-7, can be operated in conjunction with a yet further implementation in which there are provided a system, method and computer program for enabling local or regional merchants to participate in an automated cause marketing (ACM) program. The ACM program that may provide benefits to several parties involved in fundraising for one or more supported organizations, including one or more supported organizations, advertising providers, merchants, and individuals. Merchants are able to access enhanced analytics regarding their transactions with members and non-members of the ACM program and can use these enhanced analytics to realize an increased number of or revenue from transactions with members. Implementations also teach a system and method for enabling advertising providers to acquire and analyze data associated with consumers-merchant transactions. Implementations provide the above advantages optimally using a mobile device. Furthermore, implementations may enable a member to disseminate its charitable preferences to members of its electronic social networks.

This implementation provides a computer network implementable method for providing a loyalty program for promoting contributions to one or more supported organizations, the method characterized by: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling, or facilitating the enabling, by one or more computer processors, each of the one or more local or regional merchants to access analytic information relating to the plurality of transactions and to increase the number of or revenue from future transactions based on the analytic information.

This implementation also provides a system for providing a loyalty program for promoting contributions to supported organizations, the system characterized by: (a) a web server; (b) a loyalty engine linked to the web server, the loyalty engine established by an administrator; (c) one or more point of sale facilities for accepting payment, each linked to one or more merchants that are linked to the loyalty program; (d) a means for associating a plurality of transactions occurring at the one or more point of sale facilities with the loyalty engine; (e) a database enabling the recording of information for each of the plurality of transactions, the loyalty engine defining rules for making contributions to the one or more supported organizations based on the transactions and directing contributions to the one or more supported organizations based on the rules; and (f) an interface for enabling each of the one or more merchants to access analytic information relating to the plurality of transactions.

This implementation further provides a computer program comprising computer instructions which when loaded on a server computer connected to the Internet are operable to provide a web application defining a loyalty engine for promoting contributions to supported organizations, characterized in that the loyalty engine is operable to define a loyalty program by performing the steps of: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling each of the one or more local or regional merchants to access analytic information relating to the plurality of transactions and to increase the number of or revenue from future transactions based on the analytic information.

Yet Other Next Generation Loyalty Implementations

As disclosed in U.S. patent application Ser. No. 14/672,756, filed on Mar. 30, 2015, titled Method, system, and computer program for automated cause marketing using mobile devices, which is hereby incorporated by reference, in one computerized implementation, the Blockchain Implementations as depicted in FIGS. 3-7, can be operated in conjunction with a yet further implementation in which there are provide a system, method and computer program for enabling local or regional merchants to participate in an automated cause marketing (ACM) program using mobile devices. The ACM program that may provide benefits to several parties involved in fundraising for one or more supported organizations, including one or more supported organizations, advertising providers, merchants, and individuals. Merchants are able to access enhanced analytics regarding their transactions with members and non-members of the ACM program and can use these enhanced analytics to realize an increased number of or revenue from transactions with members. Implementations also teach a system and method for enabling advertising providers to acquire and analyze data associated with consumers-merchant transactions. Implementations provide the above features optimally using mobile devices. Furthermore, implementations may enable a member to disseminate its charitable preferences and contribution notifications to members of its electronic social networks.

This implementation provides a computer network implementable method for providing a loyalty program for promoting contributions to one or more supported organizations, the method characterized by: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling, or facilitating the enabling, by one or more computer processors, each of the one or more local or regional merchants to access analytic information relating to the plurality of transactions and to increase the number of or revenue from future transactions based on the analytic information.

This implementation also provides a system for providing a loyalty program for promoting contributions to supported organizations, the system characterized by: (a) a web server; (b) a loyalty engine linked to the web server, the loyalty engine established by an administrator; (c) one or more point of sale facilities for accepting payment, each linked to one or more merchants that are linked to the loyalty program; (d) a means for associating a plurality of transactions occurring at the one or more point of sale facilities with the loyalty engine; (e) a database enabling the recording of information for each of the plurality of transactions, the loyalty engine defining rules for making contributions to the one or more supported organizations based on the transactions and directing contributions to the one or more supported organizations based on the rules; and (f) an interface for enabling each of the one or more merchants to access analytic information relating to the plurality of transactions.

This implementation further provides a computer program comprising computer instructions which when loaded on a server computer connected to the Internet are operable to provide a web application defining a loyalty engine for promoting contributions to supported organizations, characterized in that the loyalty engine is operable to define a loyalty program by performing the steps of: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling each of the one or more local or regional merchants to access analytic information relating to the plurality of transactions and to increase the number of or revenue from future transactions based on the analytic information.

In another aspect of this implementation, there is provided a system for providing a loyalty program, the system comprising: a loyalty engine comprising a data storage device and a processor for configuring a loyalty program, wherein the loyalty program generates one or more member profiles and one or more merchant profiles, wherein each of the one or more member profiles defines demographic data, financial card data, supported organization data, a member identification, and mobile device information, wherein each merchant profile defines a merchant identification and a location, wherein the loyalty engine creates rewards for members of the loyalty program using the demographic data, the supported organization data, and the locations associated with the merchants; a mobile device utility providing an interface between the loyalty engine and one or more mobile devices to enable optimal transacting between the loyalty engine and the one or more mobile devices, wherein the mobile device utility is configured to: interface with location tracking hardware of a mobile device of the one or more mobile devices to determine that the mobile device location is within a predefined distance of a location identified in a merchant profile of the one or more merchant profiles, wherein the mobile device is identified by mobile device information defined in a member profile of the one or more member profiles, wherein a member is identified by member identification in the member profile; transmit a reward of the rewards of the loyalty program to the mobile device at approximately a time when the mobile device is within the predefined distance of the location identified in a merchant profile, wherein the reward relates to a merchant identified by merchant identification in the merchant profile identifying the location, wherein the reward comprises a machine readable code, wherein the reward triggers contributions to the one or more supported organizations based on a transaction between the member and the merchant; wherein the loyalty engine: receives transaction data for a transaction between the member and the merchant, the transaction processing at a point of sale facility at the location, the transaction data indicating the merchant identification, a transaction amount, a date, a time, an indication that payment for the transaction involved the mobile device, and an indication of the reward; determines, using the transaction data, that the transaction involved redemption of the reward initiated via the machine readable code; and generates signals for directing a contribution amount for a contribution to the one or more supported organizations based on the reward redemption.

Still Other Automated Merchant Boarding Implementations

As disclosed in U.S. patent application Ser. No. 14/686,247, filed on Apr. 14, 2015, titled Systems and methods for loyalty programs, which is hereby incorporated by reference, in one computerized implementation, the Blockchain Implementations as depicted in FIGS. 3-7, can be operated in conjunction with a yet further implementation in which there are provided methods, devices and media for a pre-enrollment registration system. The method includes: receiving signals representing pre-enrollment data, the pre-enrollment data including profile information associated with at least one prospective member; generating, with the at least one processor, a registration identifier for each of the at least one prospective members; storing each of the registration identifiers in association with the respective prospective member profile information; receiving, at the at least one processor, signals representing a registration request including the registration identifier associated with a requesting prospective member; generating, with the at least one processor, signals for displaying an interface, the interface including a plurality of profile fields, wherein at least one of the profile fields are pre-populated with at least a portion of the profile information associated with the requesting prospective member; and receiving signals for modifying or confirming the pre-populated profile fields.

In accordance with one aspect of this implementation, there is provided a method for a pre-enrollment registration system. The method includes: receiving, at at least one processor, signals representing pre-enrollment data, the pre-enrollment data including profile information associated with at least one prospective member; generating, with the at least one processor, a registration identifier for each of the at least one prospective members; storing each of the registration identifiers in association with the respective prospective member profile information; receiving, at the at least one processor, signals representing a registration request including the registration identifier associated with a requesting prospective member; generating, with the at least one processor, signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

In accordance with another aspect of this implementation, there is provided a computing device for a pre-enrollment registration system. The computing device includes: at least one processor configured for: receiving signals representing pre-enrollment data, the pre-enrollment data including profile information associated with at least one prospective member; generating a registration identifier for each of the at least one prospective members; storing each of the registration identifiers in association with the respective prospective member profile information; receiving signals representing a registration request including the registration identifier associated with a requesting prospective member; generating signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

In accordance with another aspect of this implementation, there is provided a non-transitory computer-readable medium or media having instructions stored thereon. The instructions when executed by at least one processor, configure the at least one processor for: receiving signals representing pre-enrollment data, the pre-enrollment data including profile information associated with at least one prospective member; generating a registration identifier for each of the at least one prospective members; storing each of the registration identifiers in association with the respective prospective member profile information; receiving signals representing a registration request including the registration identifier associated with a requesting prospective member; generating signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

Golfing Card Implementations

As disclosed in U.S. patent application Ser. No. 10/855,327, filed on May 28, 2004, title Method, system and computer program for providing a loyalty engine enabling dynamic administration of loyalty programs, which is hereby incorporated by reference, in one computerized implementation, the Blockchain Implementations as depicted in FIGS. 3-7, can be operated in conjunction with a yet further implementation in which there are provided method, computer system, and computer program product for encouraging customer loyalty. The method includes the steps of: (1) one or more members defining a loyalty program, the loyalty program defining loyalty reward points associated with one or more activities; (2) registering one or more participants with the loyalty program, whereby their registration includes the provision of financial card data for one or more financial cards of each of the one or more participants; (3) collecting financial data corresponding to transactions of the one or more participants associated with the one or more members, and providing said financial data to a loyalty engine; (4) providing access to the loyalty engine to the one or more members, the loyalty engine permitting the one or more members: (a) to define the rules defining the loyalty program, including accumulation of loyalty reward points, and redemption of loyalty reward points; (b) monitoring the effectiveness of the loyalty program; and (c) modifying the loyalty program to enhance its effectiveness. The computer system includes the loyalty engine. The computer program product consists of a server application that includes the loyalty engine. Members access a number of software utilities linked to the loyalty engine to assess the effectiveness of the loyalty programs and customize the attributes of the loyalty programs on the fly to improve effectiveness. Participants access the loyalty engine to access a virtual real time loyalty reward point account, and redeem loyalty reward points for prizes.

One aspect of this implementation is a method of encouraging customer loyalty, including the steps of: (1) One or more members defining a loyalty program, the loyalty program defining loyalty rewards associated with one or more activities; (2) Registering one or more participants with the loyalty program, whereby their registration includes the provision of financial card data for one or more financial cards of each of the one or more participants; (3) Collecting financial data corresponding to transactions of the one or more participants associated with the one or more members, and providing said financial data to a loyalty engine; (4) Providing access to the loyalty engine to the one or more members, the loyalty engine permitting the one or more members: (a) To define the rules defining the loyalty program, including accumulation of loyalty reward points, and redemption of loyalty reward points; (b) Monitoring the effectiveness of the loyalty program; and (c) Modifying the loyalty program to enhance its effectiveness.

Another aspect of this implementation is a computer system that includes the described loyalty engine. Another aspect is a computer program product consisting of the loyalty engine.

In a particular aspect of this implementation, the completion of a survey is linked to the accumulation of loyalty reward points.

In yet another particular aspect of this implementation, loyalty reward points are redeemed by the participant printing a coupon displayed by the loyalty engine, and presenting the coupon at a location of the applicable member.

In a still other aspect of this implementation, a method, computer system, and computer program product is provided that enables a plurality of members to co-operate to provide loyalty benefits jointly, by operation of the loyalty engine.

Click2Sale Implementations

As disclosed in U.S. patent application Ser. No. 12/944,474, filed on Nov. 11, 2010, titled Program, system and method for linking community programs and merchants in a marketing program, now U.S. Pat. No. 9,111,295, which is hereby incorporated by reference, in one computerized implementation, the Blockchain Implementations as depicted in FIGS. 3-7, can be operated in conjunction with a yet further implementation in which there are provided a system, data access management utility and a method of generating links between local merchants and community programs, whereby the merchant may provide incentives to customers in relation to community programs. Implementations may track community programs, as well as both online and offline customer transactions between participants that make use of the incentive. Implementations may include as participants, customers, merchants, community organizations, intermediaries, and other groups or individuals. Participants may have participant identifiers, which may be linked to a payment source. Data may be collected about all participants, either expressly, or from offline or online transactions between participants utilizing a participant identifier, and said data may be stored in a data storage area. All data in the data storage area may be utilized by a logic tool, which may provide information, such as details of consumer behavior and analytic reporting. Matches between transactions and members and/or member activities may be identified by the system, and a level of certainty that the match is accurate may be determined.

In this implementation, a marketing system is operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions, for example the number or value of the transactions, occurring between the one or more merchants and the one or more members.

In another aspect of this implementation, a marketing program method comprises the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Other Click2Sale Implementations

As disclosed in U.S. patent application Ser. No. 14/480,721, filed on Sep. 9, 2014, titled Program, system and method for linking community programs and merchants in a marketing program, which is hereby incorporated by reference, in one computerized implementation, the Blockchain Implementations as depicted in FIGS. 3-7, can be operated in conjunction with a yet further implementation in which there are provide a system, data access management utility and a method of generating links between local merchants and community programs, whereby the merchant may provide incentives to customers in relation to community programs. This implementation may track community programs, as well as both online and offline customer transactions between participants that make use of the incentive. This implementation may include as participants, customers, merchants, community organizations, intermediaries, and other groups or individuals. Participants may have participant identifiers, which may be linked to a payment source. Data may be collected about all participants, either expressly, or from offline or online transactions between participants utilizing a participant identifier, and said data may be stored in a data storage area. All data in the data storage area may be utilized by a logic tool, which may provide information, such as details of consumer behavior and analytic reporting. Matches between transactions and members and/or member activities may be identified by the system, and a level of certainty that the match is accurate may be determined.

In one aspect, this implementation relates to a marketing system operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions, for example the number or value of the transactions, occurring between the one or more merchants and the one or more members.

In another aspect of this implementation, a marketing program method comprises the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Still Other Click2Sale Implementations

As disclosed in U.S. patent application Ser. No. 14/755,444, filed on Jun. 30, 2015, titled Program, system and method for linking community programs and merchants in a marketing program, now U.S. Pat. No. 9,230,263, which is hereby incorporated by reference, in one computerized implementation, the Blockchain Implementations as depicted in FIGS. 3-7, can be operated in conjunction with a yet further implementation in which there are provided a system, a data access management utility, and a method of generating links between local merchants and community programs. In this implementation, the merchant may provide incentives to customers in relation to community programs. This implementation may track community programs, as well as both online and offline customer transactions between participants that make use of the incentive. This implementation may include as participants, customers, merchants, community organizations, intermediaries, and other groups or individuals. Participants may have participant identifiers, which may be linked to a payment source. Data may be collected about all participants, either expressly, or from offline or online transactions between participants utilizing a participant identifier, and said data may be stored in a data storage area. All data in the data storage area may be utilized by a logic tool, which may provide information, such as details of consumer behavior and analytic reporting. Matches between transactions and members and/or member activities may be identified by the system, and a level of certainty that the match is accurate may be determined.

In one aspect, this implementation relates to a marketing system operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions, for example the number or value of the transactions, occurring between the one or more merchants and the one or more members.

In another aspect, this implementation relates to a marketing program method comprising the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Voice Ordered Rewards Implementations

As disclosed in U.S. patent application Ser. No. 14/647,119, filed on May 25, 2015, titled Customer voice order triggered mutual affinity merchant donation, which is hereby incorporated by reference, in one computerized implementation, the Blockchain Implementations as depicted in FIGS. 3-7, can be operated in conjunction with a yet further implementation in which a customer uses a mobile device to verbally request an offer that includes an incentive to transact at a merchant's brick and mortar store in the customer's local community in exchange for the merchant's agreement to make an auditable donation to a charity serving the local community. Business rules limit the merchant's charitable donations over calendar periods, which donations can be made directly by the merchant to the community charity, or indirectly to the charity by way of a blind donation made by the merchant to a donation disbursement agency acting on the merchant's behalf to satisfy the merchant's commitment to donate.

In this implementation, a consumer using a mobile application to verbally request offers, receive the requested offers, select an offer from among received offers, and confirm the selected offer, where the consumer is incented to the selected offer by terms and conditions that include the selected merchant in the customer's residential community making a donation to an entity to which both the merchant and the consumer have an affinity after the consumer conducts a timely transaction in the selected merchant's physical store.

Embodiments of this implementation relate to a computer-implemented method and server-implemented methods where there is received, from a transmitter, an account holder identifier and digitized audio data containing a request for an offer from a local merchant to local customers to make a purchase from the local merchant in exchange for the local merchant making a donation to a local charity. The request may be derived from the digitized audio data. The derived request may be used to access and retrieve offers each being from a local merchant to local customers to make a purchase from the local merchant in exchange for the local merchant making a donation to a local charity. The retrieved offers may be converted into a digitized audio file and transmitted back to the transmitter. In response, there may be received a digitized audio data containing a selection of one of the retrieved offers. The selected offer is derived from the digitized audio data. Upon receiving information derived from an authorization response for a transaction between the account holder and the local merchant making the selected offer, a message may be sent that contains the donation to be made to the local charity by the local merchant who made the selected offer. After several such message have been sent, each containing the donation to be made to the local charity by local merchant making the selected offer, a calculation may be made of the sum of the donations in the messages. Information may also be received from the local charity as to the total donations that have been made so far by the local merchant who made the selected offers. Any difference between what the local merchant making the selected offers was to donate to the local charity and the local merchant's actual donations may be transmitted for follow up. In some implementations, the donation to be made to the local charity by local merchant making the selected offer is a function, at least in part, of a currency amount of the transaction.

Variations on the foregoing implementations include allowing the customer to specify one or more affinity entities (e.g., charities) providing goods and/or services in their local community to which donations are to be made by merchants with whom the customer conducts transactions. In such implementations, each merchant may be given notice of its total periodic obligatory donations. Such notice, however, may be given without providing the merchant with any notice or knowledge as to the specific identity of those affinity entities that are to be its recipients. Such implementations may leave direction of merchants donations fully within the discretion of the merchants customers, limited only by the restriction that the customer can only select affinity entities from among those that serve the local community in common to both the merchant and the customer, while leaving the actual amount of the merchants donation fully within the discretion of the merchant.

Still further variations on the foregoing implementations include deriving a donation to be made by the merchant to the affinity entity for a predetermined time period by using a merchant donation business rule as well as a rule previously specified by the account holder who conducts the transaction with the merchant. By way of example, and not by way of limitation, the merchant's donation business rule may choose the amount of the donation whereas the account holder's rule might choose the affinity entity in the community to which the merchant's donation is to be directed.

In still further implementations, a consumer uses a mobile application to verbally request offers, receive the requested offers, select an offer from among received offers, and confirm the selected offer, where the consumer is incented to the selected offer by terms and conditions that include the selected merchant in the customer's residential community making a donation to an entity to which both the merchant and the consumer have an affinity after the consumer conducts a timely transaction in the selected merchant's physical store.

Still further implementations relate to a computer-implemented method and server-implemented methods where there is received, from a transmitter, an account holder identifier and digitized audio data containing a request for an offer from a local merchant to local customers to make a purchase from the local merchant in exchange for the local merchant making a donation to a local charity. The request may be derived from the digitized audio data. The derived request may be used to access and retrieve offers each being from a local merchant to local customers to make a purchase from the local merchant in exchange for the local merchant making a donation to a local charity. The retrieved offers may be converted into a digitized audio file and transmitted back to the transmitter. In response, there may be received a digitized audio data containing a selection of one of the retrieved offers. The selected offer is derived from the digitized audio data. Upon receiving information derived from an authorization response for a transaction between the account holder and the local merchant making the selected offer, a message may be sent that contains the donation to be made to the local charity by the local merchant who made the selected offer. After several such message have been sent, each containing the donation to be made to the local charity by local merchant making the selected offer, a calculation may be made of the sum of the donations in the messages. Information may also be received from the local charity as to the total donations that have been made so far by the local merchant who made the selected offers. Any difference between what the local merchant making the selected offers was to donate to the local charity and the local merchant's actual donations may be transmitted for follow up. In some implementations, the donation to be made to the local charity by local merchant making the selected offer is a function, at least in part, of a currency amount of the transaction.

Variations on the foregoing implementations include allowing the customer to specify one or more affinity entities (e.g., charities) providing goods and/or services in their local community to which donations are to be made by merchants with whom the customer conducts transactions. In such implementations, each merchant may be given notice of its total periodic obligatory donations. Such notice, however, may be given without providing the merchant with any notice or knowledge as to the specific identity of those affinity entities that are to be its recipients. Such implementations may leave direction of merchants donations fully within the discretion of the merchants customers, limited only by the restriction that the customer can only select affinity entities from among those that serve the local community in common to both the merchant and the customer, while leaving the actual amount of the merchants donation fully within the discretion of the merchant.

Still further variations on the foregoing implementations include deriving a donation to be made by the merchant to the affinity entity for a predetermined time period by using a merchant donation business rule as well as a rule previously specified by the account holder who conducts the transaction with the merchant. By way of example, and not by way of limitation, the merchant's donation business rule may choose the amount of the donation whereas the account holder's rule might choose the affinity entity in the community to which the merchant's donation is to be directed.

In yet other implementations, an offer may be provided as a token to customer device 48 for provision to merchant to redeem the offer. The transaction may be completed remotely using the customer device 48. The token may include one or more of a bar code, a QR code, a file, an identifier, the account identifier issued to the customer by the issuer bank so that the token is sufficient to complete the purchase with the merchant. Alternatively, a facial recognition database can be accessed in order to associate a captured image of the customer's face with the account identifier issued to the customer by the issuer bank so that the captured image of the customer's face is sufficient to complete the purchase with the merchant.

Loyalty Program Implementations

As disclosed in U.S. patent application Ser. No. 14/315,641, filed on Jun. 26, 2014, titled Systems and methods for loyalty programs, which is hereby incorporated by reference, in one computerized implementation, the Blockchain Implementations as depicted in FIGS. 3-7, can be operated in conjunction with a yet further implementation in which there are provided methods and systems for generating alerts or recommend incentives for a loyalty program that provides incentives to cardholders in connection with transactions between the cardholders and merchants. A merchant is identified. Transaction data reflective of completed transactions are received by way of a network. The transaction data is processed to generate an alert notifying the identified merchant of an event or trend, or to generate a recommended incentive that defines a benefit to be provided by the identified merchant to a cardholder upon the occurrence of an anticipated transaction.

In an aspect of this implementation, there is provided a computer-implemented method of generating alerts for a loyalty program that provides incentives to cardholders in connection with transactions between the cardholders and merchants. The method includes: storing, in an electronic data store, a plurality of rules, each rule of the plurality of rules defining at least one condition for generating an alert; receiving, by way of a network, transaction data reflective of completed transactions; identifying a merchant; identifying an event or trend by applying at least one rule of the plurality of rules to the received transaction data; and generating an alert to notify the identified merchant of the identified event or trend.

In another aspect of this implementation, there is provided a system for generating alerts for a loyalty program that provides incentives to cardholders in connection with transactions between the cardholders and merchants. The system includes at least one processor; an electronic data store storing a plurality of rules, each rule of the plurality of rules defining at least one condition for generating an alert; a network interface; memory storing instructions executable at the at least one processor to cause the system to: receive, by way of the network interface, transaction data reflective of completed transactions; identify a merchant; identify an event or trend by applying at least one rule of the plurality of rules to the received transaction data; and generate an alert notifying the identified merchant of the identified event or trend.

In a further aspect of this implementation, there is provided a computer-implemented method of generating recommended incentives to cardholders in connection with transactions between the cardholders and merchants. The method includes: receiving, by way of a network, transaction data reflective of completed transactions; processing the received transaction data to identify at least one cardholder attribute; identifying a merchant; identifying at least one cardholder; identifying an anticipated transaction between the merchant and the at least one cardholder; and generating a recommended incentive for the identified at least one cardholder based on the at least one cardholder attribute, wherein the recommended incentive defines a benefit to be provided by the identified merchant to the identified at least one cardholder upon the occurrence of the anticipated transaction.

In yet another aspect, there is provided a system for generating recommended incentives to cardholders in connection with transactions between the cardholders and merchants. The system includes: at least one processor; a network interface; memory storing instructions executable at the at least one processor to cause the system to: receive, by way of the network interface, transaction data reflective of completed transactions; process the received transaction data to identify at least one cardholder attribute; identify a merchant; identify at least one cardholder; identify an anticipated transaction between the merchant and the at least one cardholder; and generate a recommended incentive for the identified at least one cardholder based on the at least one cardholder attribute, wherein the recommended incentive defines a benefit to be provided by the identified merchant to the identified at least one cardholder upon the occurrence of the anticipated transaction.

In a yet further aspect of this implementation, there is provided a computer-implemented method of providing charitable incentives. The method includes: identifying a charity and a plurality of donors associated with the charity, wherein the plurality of donors comprise cardholders or potential cardholders for a loyalty program; identifying a merchant; identifying an anticipated transaction between the merchant and a donor of the plurality of donors; and selecting an incentive based on the charity, attributes of the plurality of donors, the identified merchant, and the identified anticipated transaction, wherein the incentive defines a benefit to be provided by the merchant to the charity upon the occurrence of the anticipated transaction.

Transaction Verification Implementations

As disclosed in U.S. patent application Ser. No. 14/554,907, filed on Nov. 26, 2014, titled Systems and methods for transaction verification, which is hereby incorporated by reference, in one computerized implementation, the Blockchain Implementations as depicted in FIGS. 3-7, can be operated in conjunction with a yet further implementation in which there are provided methods, systems and device for verifying a transaction in a loyalty or advertising system. One such method includes: receiving, at least one processor, transaction data associated with a transaction between a customer and a merchant; determining, at the at least one processor, from the transaction data whether the customer and the merchant are associated with the loyalty or advertising system; and upon determining from the transaction data whether the transaction corresponds to a reward or advertisement, triggering the redemption of the reward or advertisement.

In accordance with one aspect of this implementation, there is provided a method for verifying a transaction in a loyalty or advertising system. The method includes: receiving, at least one processor, transaction data associated with a transaction between a customer and a merchant; determining, at the at least one processor, from the transaction data whether the customer and the merchant are associated with the loyalty or advertising system; and upon determining from the transaction data whether the transaction corresponds to a reward or advertisement, triggering the redemption of the reward or advertisement.

In accordance with another aspect of this implementation, there is provided a loyalty program device comprising at least one processor. The at least one processor is configured to: receive transaction data associated with a transaction between a customer and a merchant; determine, at the at least one processor, from the transaction data whether the customer and the merchant are associated with the loyalty or advertising system; and upon determining from the transaction data whether the transaction corresponds to a reward or advertisement, trigger the redemption of the reward or advertisement.

In accordance with another aspect of this implementation, there is provided a non-transitory, computer readable medium or media having stored thereon computer readable instructions. The instructions, when executed by at least one processor, configure the at least one processor to: receive transaction data associated with a transaction between a customer and a merchant; determine, at the at least one processor, from the transaction data whether the customer and the merchant are associated with the loyalty or advertising system; and upon determining from the transaction data whether the transaction corresponds to a reward or advertisement, trigger the redemption of the reward or advertisement.

Interchange Fees Implementations

As disclosed in U.S. patent application Ser. No. 14/612,823, filed on Feb. 3, 2015, titled Systems and methods for loyalty programs, which is hereby incorporated by reference, in one computerized implementation, the Blockchain Implementations as depicted in FIGS. 3-7, can be operated in conjunction with a yet further implementation in which there are provide systems, devices and methods for a loyalty system. A method includes receiving, at least one processor associated with a transaction processing system, transaction data associated with a transaction between a customer and a merchant; upon or concurrently with clearing the transaction, determining, with the at least one processor, a membership classification for the transaction; and generating, at the at least one processor, signals for accruing an interchange fee based on the membership classification and the transaction data.

In accordance with aspects of this implementation, there is provided a method for a loyalty system. The method includes: receiving, at least one processor associated with a transaction processing system, transaction data associated with a transaction between a customer and a merchant; upon or concurrently with clearing the transaction, determine, with the at least one processor, a membership classification for the transaction; and generating, at the at least one processor, signals for accruing an interchange fee based on the membership classification and the transaction data.

In accordance with aspects of this implementation, there is provided a transaction processing system comprising: a communication interface for communicating with a transaction initiating device; and at least one processor. The at least one processor is configured to: receive transaction data associated with a transaction between a customer and a merchant; upon or concurrently with clearing the transaction, determine a membership classification for the transaction; and generate signals for accruing an interchange fee based on the membership classification and the transaction data.

Personas Implementations

As disclosed in U.S. patent application Ser. No. 14/858,447, filed on Sep. 18, 2015, titled Systems and methods for loyalty programs, which is hereby incorporated by reference, in one computerized implementation, the Blockchain Implementations as depicted in FIGS. 3-7, can be operated in conjunction with a yet further implementation in which there are provided systems, methods, devices and computer-readable media for generating incentives for a loyalty system. A method includes: receiving, at at least one processor, data reflective of transactions conducted by a plurality of customers; processing, at the at least one processor, the data to determine a set of attributes for each of the plurality of customers; classifying, at the at least one processor, each of the plurality of customers according to at least one of a plurality of customer groups based on the determined set of attributes; and generating, at the at least one processor, an incentive targeting customers in at least one of the plurality of customer groups.

In accordance with one aspect of this implementation, there is provided a method for generating incentives for a loyalty system. The method includes: receiving, at at least one processor, data reflective of transactions conducted by a plurality of customers; processing, at the at least one processor, the data to determine a set of attributes for each of the plurality of customers; classifying, at the at least one processor, each of the plurality of customers according to at least one of a plurality of customer groups based on the determined set of attributes; and generating, at the at least one processor, an incentive targeting customers in at least one of the plurality of customer groups.

In accordance with another aspect of this implementation, there is provided a method of generating incentives for a loyalty system. The method includes: receiving, at at least one processor, data reflective of transactions conducted by a plurality of customers; processing, at the at least one processor, the data to generate an incentive targeting at least one of the plurality of customers; and presenting the generated incentive in an electronic financial card statement issued to the at least one of the plurality of customers.

In accordance with another aspect of this implementation, there is provided a method of generating incentives for a loyalty system. The method includes: defining a group of customers; generating an incentive targeting the group of customers, the incentive offering a reward when a number of customers responding to the incentive exceeds a pre-defined threshold; transmitting notification of said incentive to the group of customers; monitoring the number of customers who respond to the incentive; in response to the monitoring, providing the offered reward when the number of customers who respond to the incentive exceeds the pre-defined threshold.

In accordance with another aspect of this implementation, there is provided a method of generating incentives for a loyalty system. The method includes: receiving, at at least one processor associated with a transaction processing system, transaction data associated with a transaction between a customer and a merchant; upon or concurrently with clearing the transaction, determine, with the at least one processor, a membership classification for the transaction; generate, at the at least one processor, signals for accruing an interchange fee based on the membership classification and the transaction data.

Rescue, Relief, Recover Implementations

As disclosed in U.S. patent application Ser. No. 14/879,328, filed on Oct. 9, 2015, titled Systems and methods for changing operation modes in a loyalty program, which is hereby incorporated by reference, in one computerized implementation, the Blockchain Implementations as depicted in FIGS. 3-7, can be operated in conjunction with a yet further implementation in which a method is provided for changing operation modes includes receiving disaster information from trending data, a newsfeed, or an alert message; upon detecting at least one redirection trigger from the disaster information, configuring a loyalty system to operate in a redirection mode; receiving or accessing data associated with a transaction between a customer and a merchant; determining, from at least one of customer information and merchant information in the data associated with the transaction, a donation amount and a location associated with the transaction; when the loyalty system is configured to operate in a redirection mode, generating signals to cause accrual of at least a portion of the donation amount to a redirection account based on the location associated with the transaction; and generating signals to cause accrual of any remaining portion of the donation amount to one or more defined donation accounts based on charity catchment area parameters.

In accordance with one aspect of this implementation, there is provided a system for changing operation modes for a loyalty program. The system includes: at least one memory; and at least one processor. The at least one processor is configured to: receive disaster information from trending data, a newsfeed, or an alert message; upon detecting at least one redirection trigger from the disaster information, configure the system to operate in a redirection mode; receive or access data associated with a transaction between a customer and a merchant; determine, from at least one of customer information and merchant information in the data associated with the transaction, a donation amount and a location associated with the transaction; when the system is configured to operate in a redirection mode, generate signals to cause accrual of at least a portion of the donation amount to a redirection account based on the location associated with the transaction; and generate signals to cause accrual of any remaining portion of the donation amount to one or more defined donation accounts based on charity catchment area parameters.

In accordance with another aspect of this implementation, there is provided a method for changing operation modes in a loyalty system. The method includes: receiving disaster information from trending data, a newsfeed, or an alert message; upon detecting, by at least one processor, at least one redirection trigger from the disaster information, configuring the loyalty system to operate in a redirection mode; receiving or accessing data associated with a transaction between a customer and a merchant; determining, from at least one of customer information and merchant information in the data associated with the transaction, a donation amount and a location associated with the transaction; when the loyalty system is configured to operate in a redirection mode, generating signals to cause accrual of at least a portion of the donation amount to a redirection account based on the location associated with the transaction; and generating signals to cause accrual of any remaining portion of the donation amount to one or more defined donation accounts based on charity catchment area parameters.

In accordance with another aspect of this implementation, there is provided a computer-readable medium or media having stored thereon computer-readable instructions. When executed by at least one processor, the computer-readable instructions configure the at least one processor for: receiving disaster information from trending data, a newsfeed, or an alert message; upon detecting, by the at least one processor, at least one redirection trigger from the disaster information, configuring a loyalty system to operate in a redirection mode; receiving or accessing data associated with a transaction between a customer and a merchant; determining, from at least one of customer information and merchant information in the data associated with the transaction, a donation amount and a location associated with the transaction; when the loyalty system is configured to operate in a redirection mode, generating signals to cause accrual of at least a portion of the donation amount to a redirection account based on the location associated with the transaction; and generating signals to cause accrual of any remaining portion of the donation amount to one or more defined donation accounts based on charity catchment area parameters.

Siri-Surview Implementations

As disclosed in U.S. patent application Ser. No. 14/973,918, filed on Dec. 18, 2015, titled Devices, systems and methods for managing feedback in a network of computing resources, which is hereby incorporated by reference, in one computerized implementation, the Blockchain Implementations as depicted in FIGS. 3-7, can be operated in conjunction with a yet further implementation in which a network communication system is provided for exchanging feedback data between merchant systems and cardholder devices. Cardholder devices receive and process speech signals for feedback requests and generate speech signals for feedback responses. A feedback component has a text to speech processor for generating the speech signals for the feedback requests using feedback request data records, and a speech to text processor for generating feedback response data records by transforming the speech signals for feedback responses. A notification management processor manages transmissions of the speech signals for feedback requests by determining, for each feedback request, a respective delivery notification delay.

In accordance with one aspect of this implementation, there is provided a network communication system for feedback that has one or more merchant systems. Each merchant system has a transaction processing device for triggering transmission of a transaction notification alert, and a location device for generating and transmitting location data for the one or more merchant systems. The network communication system has a transaction notification system for collecting transaction notification alerts from the one or more merchant systems and transmitting a transaction notification data feed compiling the collected transaction notification alerts. The network communication system has one or more cardholder devices configured to receive and process speech signals for feedback requests and generate speech signals for feedback responses, wherein the cardholder devices comprise location detection hardware for generating location data for the one or more cardholder devices. The network communication system has a feedback component that has a text to speech processor for generating the speech signals for the feedback requests using feedback request data records. The feedback component has a speech to text processor for generating feedback response data records by transforming the speech signals for feedback responses received from the one or more cardholder's devices. The feedback component has notification management processor for managing transmissions of the speech signals for feedback requests by determining, for each feedback request, a respective delivery notification delay. The feedback component has a transceiver for transmitting and receiving the feedback request data records and the feedback response data records. The transceiver transmits a portion of the feedback request data records or the speech signals for feedback requests after expiration of the respective determined delivery delay in response to a location notification. The feedback component has a network interface for connecting to the one or more merchant systems, one or more cardholder devices and the transaction notification system for data exchange. The feedback component has location tracking hardware for correlating the location data for the one or more cardholder devices to the location data for the one or more merchant systems to generate the location notification to trigger the transmission of the speech signals for feedback requests. The feedback component has one or more data stores for storing feedback request data records and the feedback response data records.

In accordance with another aspect of this implementation, there is provided a method for managing feedback communications in a network of computing resources. The method includes: receiving, by at least one processor, at least one transaction communication, the at least one transaction communication including data associated with an electronic transaction involving a payment identifier associated with a customer profile; initiating signals to cause a trigger handler to establish a trigger condition for initiating a feedback acquisition based on the data associated with the electronic transaction; and upon detection of the trigger condition, initiating signals to cause a input device to receive feedback input.

In accordance with another aspect of this implementation, there is provided a non-transitory, computer readable medium or media having stored thereon computer-interpretable instructions. When executed by at least one processor, the computer-interpretable instructions configure the at least one processor for: receiving at least one transaction communication, the at least one transaction communication including data associated with an electronic transaction involving a payment identifier associated with a customer profile; initiating signals to cause a trigger handler to establish a trigger condition for initiating a feedback acquisition based on the data associated with the electronic transaction; and upon detection of the trigger condition, initiating signals to cause a input device to receive feedback input.

Emotional/Biometric Rewards Implementations

As disclosed in U.S. patent application Ser. No. 14/757,622 filed on Dec. 23, 2015, titled System and methods for dynamically generating loyalty program communications based on a monitored physiological state, which is hereby incorporated by reference, in one computerized implementation, the Blockchain Implementations as depicted in FIGS. 3-7, can be operated in conjunction with a yet further implementation in which a method is provided for dynamically generating a loyalty program communication based on a monitored physiological state. The method includes monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

In accordance with one aspect of this implementation, there is provided a method of dynamically generating loyalty program communications based on a monitored physiological state. The method includes: monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

In accordance with another aspect of this implementation, there is provided a system for dynamically generating loyalty program communications based on a monitored physiological state. The system includes at least one processor configured for: monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

In accordance with another aspect of this implementation, there is provided a non-transitory computer-readable medium or media having stored thereon computer interpretable instructions. When executed by at least one processor, the instructions configure the at least one processor for: monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

Colored Hearts and National Pride Implementations

As disclosed in U.S. patent application Ser. No. 15/437,221, filed on Feb. 20, 2017, titled Loyalty program incenting merchant transaction with consumer affinity, which is hereby incorporated by reference, in one computerized implementation, the Blockchain Implementations as depicted in FIGS. 3-7, can be operated in conjunction with a yet further implementation in which a method is provided for dynamically displaying visual identifiers. The method includes receiving transaction data associated with a transaction between a registered customer and a registered merchant; based on a customer identifying data in the transaction data, determine a heart group associated with a customer profile of the registered customer; update a heart group score for a merchant profile of the registered merchant based on the received transaction data; and controlling display of a visual identifier associated with the heart group at a display associated with the merchant based on the heart group score.

In accordance with one aspect of this implementation, there is provided a method of dynamically displaying a visual identifier on a device associated with a registered customer. The method includes receiving transaction data associated with a transaction between the registered customer and a registered merchant, determining, from identifying data in the transaction data, each of one or more affinities associated with a customer profile of the registered customer and a merchant profile of the registered merchant, when a request is received from the device associated with the registered customer for a display a web page having a display information associated with the registered merchant, and when one said affinity is determined to be associated with both the customer profile of the registered customer and the merchant profile of the registered merchant, sending, in response to the request, rendering information to enhance a rendering of the requested web page on the device associated with the registered customer, wherein the rendering information includes the visual identifier associated with the one said affinity.

Artificial Intelligence Implementations

As disclosed in U.S. Patent Application Ser. No. 62/472,697, filed on Mar. 13, 2017, titled Artificial intelligence engine incenting merchant transaction with consumer affinity, which is hereby incorporated by reference, in one computerized implementation, the Blockchain Implementations as depicted in FIGS. 3-7, can be operated in conjunction with a yet further implementation in which a loyalty program method incents a registered customer to conduct a transaction with a registered merchant. The method data mines transaction data between registered merchants and registered customers with an artificial intelligence engine operated by a supercomputer. The method predicts the likelihood that an offer having an incentive will be accepted by a registered customer by conducting a transaction with the registered merchant. The incentive can be a donation by the merchant to an entity with which the registered customer has an affinity in exchange for the registered customer by conducting a transaction with the registered merchant.

In this implementation, there is provided a method of using an artificial intelligence engine to predict an offer that is likely to incent a loyalty program member to conduct a transaction with a merchant on an account associated with a financial card registered with a loyalty program, where the predicted offer includes an incentive from the merchant to donate to an entity with which the loyalty program member is likely to have an affinity.

In accordance with another aspect of this implementation, there is provided a method of performing data mining with an artificial intelligence engine upon transaction data between merchants and loyalty program members to predict an offer that is likely to incent one or more such loyalty program members to conduct transactions with a merchant registered with a loyalty program on their respective accounts registered with the loyalty program, where the predicted offer include an incentive from the registered merchant to donate to an entity with which each such loyalty program member is likely to have an affinity.

In accordance with yet another aspect of this implementation, there is provided a loyalty program method for incenting a registered customer to conduct a transaction with a registered merchant, where the method performs data mining upon transaction data between registered merchants and registered customers with an artificial intelligence engine operated by a supercomputer, and where the method predicts the likelihood that an offer having an incentive will be accepted by a registered customer by conducting a transaction with the registered merchant.

In accordance with still another aspect of this implementation, there is provided a loyalty program method for incenting a registered customer to conduct a transaction with a registered merchant, where the method performs an artificial intelligence algorithm the purpose of which is to reduce fraud and the risk of fraud, wherein data mined from the artificial intelligence algorithm is shared with and among various participants such as payment networks and issuers so that members can enhance their respective and/or collective data points for fraud analysis.

In accordance with yet another aspect of this implementation, there is provided a loyalty program method for incenting a registered customer to conduct a transaction with a registered merchant by the merchant's agreement to make donation to an affinity entity of the customer's choice. In this method, data mining is performed upon data collections regarding customers who, in the past, have been so incented to transact with merchants who agreed to make donation to an affinity entity of the customer's choice. The mined data is subjected to artificial intelligence algorithms the purpose of which is to identify new customers who are likely to be similarly incented. Examples of the types of data being mined include active and passively collected voice, facial recognition, and image capture data (e.g., internet-connected smart home appliance customer input-output data, internet-of-things (IOT) appliance customer input-output data, internet-connected Amazon Echo and Amazon Echo Camera data, geographic location data, social-economic demographics data, customer satisfaction survey data, customer input-output social network data, customer input-output search engine data, customer transaction data. In such implementations, measured results for such data that pertains to each such customer that participated can be assessed in order to rate or grade each customer relative to that customers likelihood of influencing others to participate in begin or increase participation. The effect of a customer achieving a high rating or grade can be that the customer will be issued an account by an issuer that has special benefits, or that the customer's future transactions will result in increased merchant donations to the customer's charities of choice, or other such customer benefit. As more customers reach high ratings or grades, the overall increase in customer participation will increase as those highly rated or graded customers influence others to participate.

Blockchain Loyalty Program Implementation

In accordance an implementation, there is provided a loyalty program method for incenting a registered customer to conduct a transaction with a registered merchant by the merchant's agreement to make donation to an affinity entity of the customer's choice. In this method, a loyalty program is provided that allows processes for exchanging points via various systems and redemption options among loyalty program partners by way of blockchain technology that enables a ledger of transactions to be shared across a network of loyalty program participants. In various alternatives of this implementation, a digital ledger is maintained in which transactions that are made in loyalty points, issue currency coins, bitcoins, or another cryptocurrency, are recorded chronologically and publicly. When a new digital transaction occurs for which any of the foregoing loyalty currencies is generated (for example, a loyalty point is issued, redeemed, or exchanged), a unique algorithm-generated token is created and assigned to that transaction. Tokens are grouped into blocks (for example, every seven minutes) and distributed across the network, updating every ledger at once. New transaction blocks are validated and linked to older blocks, creating a strong, secure, and verifiable record of all transactions, without the need for intermediaries or centralized databases. As such, consumers, via the blockchain, are provided with instant redemption and exchange for multiple loyalty point currencies on a single platform. Each customer can then be allowed to deal with one (1) account for loyalty points for each of the loyalty program's options, limitations, and redemption rules.

Spot Credit Loyalty Program Implementation

In accordance an implementation, there is provided a loyalty program method for incenting a registered customer to conduct a transaction with a registered merchant by the merchant's agreement to make donation to an affinity entity of the customer's choice. In this method, a loyalty program is provided that allows for the issuance of a spot credit account by an issuer to a customer. By way of example, most issuers issue only revolving credit accounts to consumers, the token for which is typically a plastic magstripe or EMV credit card. An issuer bank can implement a system that facilitates on-the-fly issuance of spot credit as an alternative form of credit at the physical or virtual point of sale at which a customer is transacting with a merchant. An example of such a system is the "Marqeta" system which is a payments platform that sets up new customer payment cards, configures multiple funding types, and defines how and where cards can be used in real time. For instance, if the card holder is already over the issuer's assigned credit limit but the customer still wants to make an addition credit purchase from the merchant, the issuer, during the authentication cycle as shown in FIGS. 1-3, issues, on-the-fly, a one-time-only 'spot credit' to the card holder. As such, the merchant makes the sale to the customer, the customer completes and takes delivery of the goods and/or services from the merchant, the issue and acquired banks realize interchange revenue, and the customer is not denied credit at the physical or virtual point of sale at which the customer is transacting with the merchant. Still further, this implementation alternative facilitates the merchant making a special, enhanced donation to the customer's charity of choice if the issuer issues 'spot credit' at the POS in order to authorize the purchase. Alternatives would include better donations if spot credit were issued during special calendar periods (e.g., Black Friday, Cyber Monday, slow sales periods).

In at least some implementations, the system may include one or more processors (e.g., digital signal processors, microprocessors, etc.), each being adapted to execute instructions to perform at least some of the methods, operations, and processes described herein with respect to the figures. Such instructions may be stored or held in storage media as instructions. Moreover, a non-transient computer readable medium can include such software as instructions executed by hardware to perform steps of methods described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described databases for storage media may comprise primary, secondary, and/or tertiary storage media. Primary storage media may include memory such as random access memory and/or read-only memory, for example. Secondary storage media may include a mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in non-transitory computer readable medium that can be loaded onto a general-purpose computer, a special purpose computer, or other programmable apparatus.

In the preceding detailed description, numerous specific details have been set forth to provide a thorough understanding of claimed subject matter. However, it will be understood by those skilled in the art that claimed subject matter may be practiced without these specific details. In other instances, methods and systems that would be known by one of ordinary skill have not been described in detail so as not to obscure claimed subject matter.

What is claimed is:

1. An Internet server executing software to perform a method comprising plurality of steps for a transaction between a merchant and an account holder for a purchase, wherein:

the transaction was conducted on an account issued to the account holder by an issuer;

a transaction processing system is coupled to a payment processing system;

the transaction is at least one of a credit transaction and a debit transaction;

the payment processing system is adapted to process each said credit transaction and debit transaction;

the merchant is obligated to make a donation to a charity as a condition of the account holder conducting the transaction with the merchant;

and the steps include:

receiving data fields, by the transaction processing system, that include:

first data for the transaction defined using a first merchant account;

and second, different data for the same transaction defined using a second merchant account, wherein the received data fields are derived from the transaction and include a request for transaction information relating to the received data fields from a financing bank computer after the financing bank computer is notified of the transaction between the account holder and the merchant;

determining and providing, by the transaction processing system, the received data fields to the financing bank computer;

creating a first block from the first data for the transaction defined using the first merchant account;

adding the first block to a first blockchain that uses the first merchant account to track transactions;

creating a second block from the second data for the transaction defined using the second merchant account without including the first data for the transaction defined using the first merchant account;

adding the second block to a second, separate blockchain that uses the second merchant account to track transactions, wherein the first and second blockchains each track different transaction data fields;

validating the transaction between the merchant and the account holder by:

receiving a Globally Unique IDentifer (GUID) for the transaction;

using the GUID to identify indices in the first and second blockchains;

retrieving encrypted blocks from the first and second blockchains of the identified indices;

verifying a hash associated with the encrypted blocks; and decrypting at least one of the encrypted blocks using a private key; and transmitting information sufficient to facilitate the donation to the charity, wherein:
the donation is a percentage of the currency amount of the transaction;
is facilitated by a predetermined smart contract having an Internet computer protocol operating so as to digitally facilitate the performance of the donation according to terms and conditions of the predetermined smart contract; and
the currency of the donation to the charity is a cryptocurrency;

and for one or more of said transactions:
receiving usage information from one or more operations performed by an Internet-of-Things (IOT) enabled system the purchase of which was funded by one or more said donations to the charity; and
transmitting at least a portion of the receiving usage information to a logical address corresponding to a web-enabled mobile computing device associated with at least one of the account holder and the merchant.

2. An Internet server system configured for:

processing a transaction between a merchant and an account holder for a purchase, wherein:
the transaction was conducted on an account issued to the account holder by an issuer;
a transaction processing system is coupled to a payment processing system;
the transaction is at least one of a credit transaction and a debit transaction;
the payment processing system is adapted to process each said credit transaction and debit transaction;
the merchant is obligated to make a donation to a charity as a condition of the account holder conducting the transaction with the merchant;

receiving data fields, by the transaction processing system, that include:
first data for the transaction defined using a first merchant account; and
second, different data for the same transaction defined using a second merchant account, wherein the received data fields are derived from the transaction and include a request for transaction information relating to the received data fields from a financing bank computer after the financing bank computer is notified of the transaction between the account holder and the merchant;

determining and providing, by the transaction processing system, the received data fields to the financing bank computer;

creating a first block from the first data for the transaction defined using the first merchant account;

adding the first block to a first blockchain that uses the first merchant account to track transactions;

creating a second block from the second data for the transaction defined using the second merchant account without including the first data for the transaction defined using the first merchant account;

adding the second block to a second, separate blockchain that uses the second merchant account to track transactions, wherein the first and second blockchains each track different transaction data fields;

validating the transaction between the merchant and the account holder by:
receiving a Globally Unique IDentifer (GUID) for the transaction;
using the GUID to identify indices in the first and second blockchains;
retrieving encrypted blocks from the first and second blockchains of the identified indices;
verifying a hash associated with the encrypted blocks; and
decrypting at least one of the encrypted blocks using a private key; and
transmitting information sufficient to facilitate the donation to the charity, wherein:
the donation is a percentage of the currency amount of the transaction;
is facilitated by a predetermined smart contract having an Internet computer protocol operating so as to digitally facilitate the performance of the donation according to terms and conditions of the predetermined smart contract; and
the currency of the donation to the charity is a cryptocurrency, and for one or more of said transactions:
receiving usage information from one or more operations performed by an Internet-of-Things (IOT) enabled system the purchase of which was funded by one or more said donations to the charity; and
transmitting at least a portion of the receiving usage information to a logical address corresponding to a web-enabled mobile computing device associated with at least one of the account holder and the merchant.

3. A non-transitory computer-readable medium or media having stored thereon computer interpretable instructions which when executed by an Internet server, configure the Internet server for:

processing a transaction between a merchant and an account holder for a purchase, wherein:
the transaction was conducted on an account issued to the account holder by an issuer;
a transaction processing system is coupled to a payment processing system;
the transaction is at least one of a credit transaction and a debit transaction;
the payment processing system is adapted to process each said credit transaction and debit transaction;
the merchant is obligated to make a donation to a charity as a condition of the account holder conducting the transaction with the merchant;

receiving data fields, by the transaction processing system, that include:
first data for the transaction defined using a first merchant account; and
second, different data for the same transaction defined using a second merchant account, wherein the received data fields are derived from the transaction and include a request for transaction information relating to the received data fields from a financing bank computer after the financing bank computer is notified of the transaction between the account holder and the merchant;

determining and providing, by the transaction processing system, the received data fields to the financing bank computer;

creating a first block from the first data for the transaction defined using the first merchant account;

adding the first block to a first blockchain that uses the first merchant account to track transactions;

creating a second block from the second data for the transaction defined using the second merchant account without including the first data for the transaction defined using the first merchant account;

adding the second block to a second, separate blockchain that uses the second merchant account to track transactions, wherein the first and second blockchains each track different transaction data fields;

validating the transaction between the merchant and the account holder by:
  receiving a Globally Unique IDentifer (GUID) for the transaction;
  using the GUID to identify indices in the first and second blockchains;
  retrieving encrypted blocks from the first and second blockchains of the identified indices;
  verifying a hash associated with the encrypted blocks; and
  decrypting at least one of the encrypted blocks using a private key; and
  transmitting information sufficient to facilitate the donation to the charity, wherein:
    the donation is a percentage of the currency amount of the transaction;
    is facilitated by a predetermined smart contract having an Internet computer protocol operating so as to digitally facilitate the performance of the donation according to terms and conditions of the predetermined smart contract; and
    the currency of the donation to the charity is a cryptocurrency;

and for one or more of said transactions:
  receiving usage information from one or more operations performed by an Internet-of-Things (IOT) enabled system the purchase of which was funded by one or more said donations to the charity; and
  transmitting at least a portion of the receiving usage information to a logical address corresponding to a web-enabled mobile computing device associated with at least one of the account holder and the merchant.

* * * * *